US012009003B2

(12) United States Patent
Atti et al.

(10) Patent No.: US 12,009,003 B2
(45) **Date of Patent: *Jun. 11, 2024**

(54) DEVICE AND METHOD FOR GENERATING A HIGH-BAND SIGNAL FROM NON-LINEARLY PROCESSED SUB-RANGES

(71) Applicant: QUALCOMM Incorporated, San Diego, CA (US)

(72) Inventors: Venkatraman Atti, San Diego, CA (US); Venkata Subrahmanyam Chandra Sekhar Chebiyyam, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,967

(22) Filed: Aug. 19, 2022

(65) Prior Publication Data

US 2022/0406319 A1 Dec. 22, 2022

Related U.S. Application Data

(63) Continuation of application No. 17/083,254, filed on Oct. 28, 2020, now Pat. No. 11,437,049, which is a
(Continued)

(51) Int. Cl.
*G10L 19/087* (2013.01)
*G10L 19/02* (2013.01)
(Continued)

(52) U.S. Cl.
CPC ........ *G10L 19/087* (2013.01); *G10L 19/0204* (2013.01); *G10L 19/03* (2013.01);
(Continued)

(58) Field of Classification Search
CPC ... G10L 19/087; G10L 19/0204; G10L 19/03; G10L 19/167; G10L 19/24; G10L 19/08; G10L 21/0388; G10L 21/038; G10L 19/18
See application file for complete search history.

(56) References Cited

U.S. PATENT DOCUMENTS 4,797,926 A 1/1989 Bronson et al.
5,265,167 A 11/1993 Akamine et al.
(Continued)

FOREIGN PATENT DOCUMENTS

CA 2908576 A1 6/2010
CN 101226746 A 7/2008
(Continued)

OTHER PUBLICATIONS

Atti V., et al., "Improved Error Resilience for Volte and VoIP with 3GPP EVS Channel Aware Coding," 2015 IEEE International Conference on Acoustics, Speech and Signal Processing (ICASSP), Apr. 1, 2015 (Apr. 1, 2015), pp. 6713-5717, XP055255936, DOI: 10.1109/ICASSP.2015.7179066 ISBN: 978-1-4673-6997-8.
(Continued)

*Primary Examiner* — Michael N Opsasnick
(74) *Attorney, Agent, or Firm* — QUALCOMM Incorporated

(57) ABSTRACT

A device for signal processing includes a memory and a processor. The memory is configured to store a parameter associated with a bandwidth-extended audio stream. The processor is configured to select a plurality of non-linear processing functions based at least in part on a value of the parameter. The processor is also configured to generate a high-band excitation signal based on the plurality of non-linear processing functions.

25 Claims, 27 Drawing Sheets

Related U.S. Application Data continuation of application No. 15/164,583, filed on May 25, 2016, now Pat. No. 10,847,170.

(60) Provisional application No. 62/241,065, filed on Oct. 13, 2015, provisional application No. 62/181,702, filed on Jun. 18, 2015.

(51) Int. Cl.
*G10L 19/03* (2013.01)
*G10L 19/08* (2013.01)
*G10L 19/16* (2013.01)
*G10L 19/24* (2013.01)
*G10L 21/0388* (2013.01)

(52) U.S. Cl.
CPC ............ *G10L 19/167* (2013.01); *G10L 19/24* (2013.01); *G10L 19/08* (2013.01); *G10L 21/0388* (2013.01)

(56) References Cited

U.S. PATENT DOCUMENTS 5,455,888 A 10/1995 Iyengar et al.
6,047,254 A 4/2000 Ireton et al.
6,138,093 A 10/2000 Ekudden et al.
6,208,957 B1 3/2001 Nomura
6,226,616 B1 5/2001 You et al.
6,233,550 B1 5/2001 Gersho et al.
6,675,144 B1 1/2004 Tucker et al.
6,680,972 B1 1/2004 Liljeryd et al.
6,795,805 B1 9/2004 Bessette et al.
6,810,381 B1 10/2004 Sasaki et al.
7,191,123 B1 3/2007 Bessette et al.
7,191,136 B2 3/2007 Sinha et al.
7,260,523 B2 * 8/2007 Paksoy ................ G10L 21/038 704/229
7,330,814 B2 * 2/2008 McCree .............. G10L 19/0208 704/223
7,461,003 B1 12/2008 Tanrikulu
8,140,324 B2 3/2012 Vos et al.
8,364,494 B2 1/2013 Vos et al.
8,438,015 B2 5/2013 Schnell et al.
8,929,568 B2 1/2015 Grancharov et al.
8,996,362 B2 3/2015 Nagel et al.
9,208,792 B2 * 12/2015 Rajendran ............. G10L 19/028
9,294,060 B2 3/2016 Myllyla et al.
9,324,333 B2 * 4/2016 Rajendran ............... G10L 19/24
9,336,789 B2 * 5/2016 Rajendran ............... G10L 19/07
9,837,089 B2 12/2017 Atti et al.
10,847,170 B2 * 11/2020 Atti ....................... G10L 19/167
11,437,049 B2 * 9/2022 Atti ......................... G10L 19/03
2001/0044722 A1 11/2001 Gustafsson et al.
2002/0007280 A1 1/2002 McCree
2002/0049583 A1 4/2002 Bruhn et al.
2002/0072899 A1 6/2002 Paksoy et al.
2003/0009327 A1 1/2003 Nilsson et al.
2003/0033140 A1 2/2003 Taori et al.
2003/0093278 A1 5/2003 Malah
2004/0019492 A1 1/2004 Tucker et al.
2004/0138876 A1 7/2004 Kallio et al.
2004/0181411 A1 9/2004 Gao
2004/0243400 A1 12/2004 Klinke
2004/0254786 A1 12/2004 Kirla et al.
2005/0004793 A1 1/2005 Ojala et al.
2005/0065783 A1 3/2005 Ojala et al.
2005/0143985 A1 6/2005 Sung et al.
2005/0171771 A1 8/2005 Yasunaga et al.
2005/0187759 A1 8/2005 Malah et al.
2006/0074642 A1 4/2006 You
2006/0149538 A1 7/2006 Lee et al.
2006/0206317 A1 9/2006 Morii et al.
2006/0271354 A1 11/2006 Sun et al.
2006/0277038 A1 * 12/2006 Vos ....................... G10L 21/038 704/219
2006/0277039 A1 12/2006 Vos et al.
2006/0277042 A1 12/2006 Vos et al.
2007/0005351 A1 1/2007 Sathyendra et al.
2007/0067163 A1 3/2007 Kabal et al.
2007/0088542 A1 4/2007 Vos et al.
2007/0088558 A1 * 4/2007 Vos ....................... G10L 19/038 704/275
2007/0124140 A1 5/2007 Iser et al.
2007/0147518 A1 6/2007 Bessette
2007/0282599 A1 12/2007 Choo et al.
2008/0027717 A1 1/2008 Rajendran et al.
2008/0059155 A1 3/2008 Iser et al.
2008/0126086 A1 * 5/2008 Vos ....................... G10L 21/038 704/E21.011
2008/0130793 A1 6/2008 Rajendran et al.
2008/0219344 A1 9/2008 Suzuki et al.
2008/0249766 A1 10/2008 Ehara
2009/0198498 A1 8/2009 Ramabadran et al.
2009/0228285 A1 9/2009 Schnell et al.
2009/0310799 A1 12/2009 Suzuki et al.
2009/0319262 A1 12/2009 Gupta et al.
2010/0094620 A1 4/2010 Hardwick
2010/0198587 A1 8/2010 Ramabadran et al.
2010/0250265 A1 9/2010 Taleb
2011/0099004 A1 4/2011 Krishnan et al.
2011/0099018 A1 4/2011 Neuendorf et al.
2011/0137659 A1 6/2011 Honma et al.
2011/0202353 A1 8/2011 Neuendorf et al.
2011/0202358 A1 8/2011 Neuendorf et al.
2011/0295598 A1 12/2011 Yang et al.
2012/0195442 A1 8/2012 Villemoes et al.
2012/0257607 A1 10/2012 Moeller et al.
2012/0265525 A1 10/2012 Moriya et al.
2012/0281859 A1 11/2012 Villemoes et al.
2013/0290003 A1 10/2013 Choo
2014/0214413 A1 * 7/2014 Atti ......................... G10L 19/09 704/219
2014/0236583 A1 * 8/2014 Rajendran ............. G10L 19/005 704/219
2015/0106084 A1 4/2015 Atti et al.
2015/0149156 A1 5/2015 Atti et al.
2015/0221318 A1 8/2015 Gao et al.
2015/0235653 A1 8/2015 Liu et al.
2016/0140979 A1 5/2016 Disch et al.
2016/0196829 A1 7/2016 Liu et al.
2016/0275959 A1 9/2016 Choo et al.
2016/0372125 A1 12/2016 Atti et al.
2016/0372126 A1 12/2016 Atti et al.
2021/0065727 A1 3/2021 Atti et al.

FOREIGN PATENT DOCUMENTS

CN 101401153 A 4/2009
CO 5560091 A1 9/2005
EP 1367566 B1 8/2005
EP 1947644 A1 7/2008
EP 1686564 B1 4/2009
EP 2620941 A1 7/2013
EP 2628156 A1 8/2013
EP 2709106 A1 3/2014
JP S60239800 A 11/1985
JP 8248997 A 9/1996
JP 2006349848 A 12/2006
JP 2011527449 A 10/2011
JP 2012515362 A 7/2012
RU 2420815 C2 6/2011
RU 2449386 C2 4/2012
RU 2455710 C2 7/2012
RU 2552184 C2 6/2015
RU 2568278 C2 11/2015
WO 2006107836 10/2006
WO 2006107837 10/2006
WO 2006107840 10/2006
WO 2006130221 12/2006
WO 2011047886 A1 4/2011
WO 2011050347 4/2011

(56) References Cited

FOREIGN PATENT DOCUMENTS

| | | | |
|---|---|---|---|
| WO | 2015043161 | A1 | 4/2015 |
| WO | 2015123210 | | 8/2015 |

OTHER PUBLICATIONS

Atti V., et al., "Super-Wideband Bandwidth Extension for Speech in the 3GPP EVS Codes," 2015 IEEE International Conference on Acoustics, Speech and Signal Processing (ICASSP), Apr. 1, 2015 (Apr. 1, 2015), pp. 5927-5931, XP055297165, DOI: 10.1109/ICASSP.2015.7179109 ISBN: 978-1-4673-6997-8.

Berisha V., et al., "A Scalable Bandwidth Extension Algorithm", 2007 IEEE International Conference on Acoustics, Speech and Signal Processing, Apr. 15, 2007, IV-601~IV-604, pp. 4541-4544.

Disch S., et al., "3DA Phase 2 Core Experiment on Optimizations and Improvements for Low Bitrate Coding," 112, Mpeg Meeting; Jun. 22, 2015-Jun. 26, 2015; Warsaw; (Motion Picture Expert Group or ISO/IEC JTC1/SC29/WG11), No. m36530, Jun. 18, 2015 (Jun. 18, 2015), XP030064898, 36 Pages.

Frederik N., et al., "A Harmonic Bandwidth Extension Method for Audio Codecs", IEEE International Conference on Acoustics, Speech and Signal Processing 2009 (ICASSP 2009), 2009, pp. 145-148.

Geiser B., et al., "Bandwidth Extension for Hierarchical Speech and Audio Coding in ITU-T Rec. G.729.1", IEEE Transactions on Audio, Speech and Language Processing, IEEE Service Center, New York, NY, USA, vol. 15, No. 8, Nov. 1, 2007 (Nov. 1, 2007), pp. 2496-2509, XP011192970, ISSN: 1558-7916, DOI: 10.1109/TASL.2007.907330.

International Preliminary Report on Patentability—PCT/US2016/034444, The International Bureau of WIPO—Geneva, Switzerland, dated Sep. 13, 2017.

International Preliminary Report on Patentability—PCT/US2016/034453, The International Bureau of WIPO—Geneva, Switzerland, dated Sep. 11, 2017.

International Search Report and Written Opinion—PCT/US2016/034444—ISA/EPO—dated Oct. 5, 2016.

International Search Report and Written Opinion—PCT/US2016/034453—ISA/EPO—dated Sep. 7, 2016.

Kawanishi T., et al., "Ultra-Wide-Band Signal Generation Using High-Speed Optical Frequency-Shift-Keying Technique", 2004 IEEE International Topical Meeting on Microwave Photonics (IEEE Cat. No. 04EX859), 2004, pp. 48-51.

Norimatsu T., et al., "Audio Signal Coding Integrating Voice and Musical Sound (Unified Speech and Audio Coding)", The Acoustic Society of Japan, Mar. 1, 2012, vol. 68, The Third Issue, pp. 123-128.

Taiwan Search Report—TW105117336—TIPO—dated Jun. 15, 2019.

Taiwan Search Report—TW105117344—TIPO—dated Mar. 15, 2018.

"Text of ISO/IEC 23008-3:201x/PDAM 3, MPEG-H 3D Audio Phase", 112. MPEG Meeting; Jun. 22, 2015-Jun. 26, 2015; Warsaw; (Motion Picture Expert Group or ISO/IEC JTC1/SC29/WG11), No. N15399, Jul. 27, 2015 (Jul. 27, 2015), XP030022119, 104 pages.

* cited by examiner

DEVICE AND METHOD FOR GENERATING A HIGH-BAND SIGNAL FROM NON-LINEARLY PROCESSED SUB-RANGES

I. CROSS-REFERENCE TO RELATED APPLICATIONS

This application is a continuation of U.S. Non-Provisional Application No. 17/083,254, filed Oct. 28, 2020, and entitled "HIGH-BAND SIGNAL GENERATION" , issued as U.S. Pat. No. 11,437,049; which is a continuation of U.S. Non-Provisional Application No. 15/164,583, filed May 25, 2016, and entitled "DEVICE AND METHOD FOR GENERATING A HIGH-BAND SIGNAL FROM NON-LINEARLY PROCESSED SUB-RANGES" , issued as U.S. Pat. No. 10,847,170; which claims the benefit of and priority to U.S. Provisional Application No. 62/181,702, filed Jun. 18, 2015 and entitled "HIGH-BAND SIGNAL GENERATION" , and U.S. Provisional Patent Application No. 62/241,065, filed Oct. 13, 2015 and entitled "HIGH-BAND SIGNAL GENERATION" ; the contents of each of the applications are expressly incorporated herein by reference in their entirety.

II. FIELD

The present disclosure is generally related to high-band signal generation.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Transmission of audio, such as voice, by digital techniques is widespread. If speech is transmitted by sampling and digitizing, a data rate on the order of sixty-four kilobits per second (kbps) may be used to achieve a speech quality of an analog telephone. Compression techniques may be used to reduce the amount of information that is sent over a channel while maintaining a perceived quality of reconstructed speech. Through the use of speech analysis, followed by coding, transmission, and re-synthesis at a receiver, a significant reduction in the data rate may be achieved.

Speech coders may be implemented as time-domain coders, which attempt to capture the time-domain speech waveform by employing high time-resolution processing to encode small segments of speech (e.g., 5 millisecond (ms) sub-frames) at a time. For each sub-frame, a high-precision representative from a codebook space is found by means of a search algorithm.

One time-domain speech coder is the Code Excited Linear Predictive (CELP) coder. In a CELP coder, the short-term correlations, or redundancies, in the speech signal are removed by a linear prediction (LP) analysis, which finds the coefficients of a short-term formant filter. Applying the short-term prediction filter to the incoming speech frame generates an LP residue signal, which is further modeled and quantized with long-term prediction filter parameters and a subsequent stochastic codebook. Thus, CELP coding divides the task of encoding the time-domain speech waveform into the separate tasks of encoding the LP short-term filter coefficients and encoding the LP residue. Time-domain coding can be performed at a fixed rate (i.e., using the same number of bits, No, for each frame) or at a variable rate (in which different bit rates are used for different types of frame contents). Variable-rate coders attempt to use the amount of bits needed to encode the parameters to a level adequate to obtain a target quality.

Wideband coding techniques involve encoding and transmitting a lower frequency portion of a signal (e.g., 50 Hertz (Hz) to 7 kiloHertz (kHz), also called the "low-band"). In order to improve coding efficiency, the higher frequency portion of the signal (e.g., 7 kHz to 16 kHz, also called the "high-band") may not be fully encoded and transmitted. Properties of the low-band signal may be used to generate the high-band signal. For example, a high-band excitation signal may be generated based on a low-band residual using a non-linear model.

IV. SUMMARY

In a particular aspect, a device for signal processing includes a memory and a processor. The memory is configured to store a parameter associated with a bandwidth-extended audio stream. The processor is configured to select a plurality of non-linear processing functions based at least in part on a value of the parameter. The processor is also configured to generate a high-band excitation signal based on the plurality of non-linear processing functions.

In another particular aspect, a signal processing method includes selecting, at a device, a plurality of non-linear processing functions based at least in part on a value of a parameter. The parameter is associated with a bandwidth-extended audio stream. The method also includes generating, at the device, a high-band excitation signal based on the plurality of non-linear processing functions.

In another particular aspect, a computer-readable storage device stores instructions that, when executed by a processor, cause the processor to perform operations including selecting a plurality of non-linear processing functions based at least in part on a value of a parameter. The parameter is associated with a bandwidth-extended audio stream. The operations also include generating a high-band excitation signal based on the plurality of non-linear processing functions.

In another particular aspect, a device for signal processing includes a receiver and a high-band excitation signal generator. The receiver is configured to receive a parameter associated with a bandwidth-extended audio stream. The high-band excitation signal generator is configured to determine a value of the parameter. The high-band excitation signal generator is also configured to select, based on the value of the parameter, one of target gain information associated with the bandwidth-extended audio stream or filter information associated with the bandwidth-extended audio stream. The high-band excitation signal generator is further configured to generate a high-band excitation signal based on the one of the target gain information or the filter information.

In another particular aspect, a signal processing method includes receiving, at a device, a parameter associated with a bandwidth-extended audio stream. The method also includes determining, at the device, a value of the parameter. The method further includes selecting, based on the value of the parameter, one of target gain information associated with the bandwidth-extended audio stream or filter information associated with the bandwidth-extended audio stream. The method also includes generating, at the device, a high-band excitation signal based on the one of the target gain information or the filter information.

In another particular aspect, a computer-readable storage device stores instructions that, when executed by a processor, cause the processor to perform operations including receiving a parameter associated with a bandwidth-extended audio stream. The operations also include determining a value of the parameter. The operations further include selecting, based on the value of the parameter, one of target gain information associated with the bandwidth-extended audio stream or filter information associated with the bandwidth-extended audio stream. The operations also include generating a high-band excitation signal based on the one of the target gain information or the filter information.

In another particular aspect, a device includes an encoder and a transmitter. The encoder is configured to receive an audio signal. The encoder is also configured to generate a signal modeling parameter based on a harmonicity indicator, a peakiness indicator, or both. The signal modeling parameter is associated with a high-band portion of the audio signal. The transmitter is configured to transmit the signal modeling parameter in conjunction with a bandwidth-extended audio stream corresponding to the audio signal.

In another particular aspect, a device includes an encoder and a transmitter. The encoder is configured to receive an audio signal. The encoder is also configured to generate a high-band excitation signal based on a high-band portion of the audio signal. The encoder is further configured to generate a modeled high-band excitation signal based on a low-band portion of the audio signal. The encoder is also configured to select a filter based on a comparison of the modeled high-band excitation signal and the high-band excitation signal. The transmitter is configured to transmit filter information corresponding to the filter in conjunction with a bandwidth-extended audio stream corresponding to the audio signal.

In another particular aspect, a device includes an encoder and a transmitter. The encoder is configured to receive an audio signal. The encoder is also configured to generate a high-band excitation signal based on a high-band portion of the audio signal. The encoder is further configured to generate a modeled high-band excitation signal based on a low-band portion of the audio signal. The encoder is also configured to generate filter coefficients based on a comparison of the modeled high-band excitation signal and the high-band excitation signal. The encoder is further configured to generate filter information by quantizing the filter coefficients. The transmitter is configured to transmit the filter information in conjunction with a bandwidth-extended audio stream corresponding to the audio signal.

In another particular aspect, a method includes receiving an audio signal at a first device. The method also includes generating, at the first device, a signal modeling parameter based on a harmonicity indicator, a peakiness indicator, or both. The signal modeling parameter is associated with a high-band portion of the audio signal. The method further includes sending, from the first device to a second device, the signal modeling parameter in conjunction with a bandwidth-extended audio stream corresponding to the audio signal.

In another particular aspect, a method includes receiving an audio signal at a first device. The method also includes generating, at the first device, a high-band excitation signal based on a high-band portion of the audio signal. The method further includes generating, at the first device, a modeled high-band excitation signal based on a low-band portion of the audio signal. The method also includes selecting, at the first device, a filter based on a comparison of the modeled high-band excitation signal and the high-band excitation signal. The method further includes sending, from the first device to a second device, filter information corresponding to the filter in conjunction with a bandwidth-extended audio stream corresponding to the audio signal.

In another particular aspect, a method includes receiving an audio signal at a first device. The method also includes generating, at the first device, a high-band excitation signal based on a high-band portion of the audio signal. The method further includes generating, at the first device, a modeled high-band excitation signal based on a low-band portion of the audio signal. The method also includes generating, at the first device, filter coefficients based on a comparison of the modeled high-band excitation signal and the high-band excitation signal. The method further includes generating, at the first device, filter information by quantizing the filter coefficients. The method also includes sending, from the first device to a second device, the filter information in conjunction with a bandwidth-extended audio stream corresponding to the audio signal.

In another particular aspect, a computer-readable storage device stores instructions that, when executed by a processor, cause the processor to perform operations including generating a signal modeling parameter based on a harmonicity indicator, a peakiness indicator, or both. The signal modeling parameter is associated with a high-band portion of the audio signal. The operations also include causing the signal modeling parameter to be sent in conjunction with a bandwidth-extended audio stream corresponding to the audio signal.

In another particular aspect, a computer-readable storage device stores instructions that, when executed by a processor, cause the processor to perform operations including generating a high-band excitation signal based on a high-band portion of an audio signal. The operations further include generating a modeled high-band excitation signal based on a low-band portion of the audio signal. The operations also include selecting a filter based on a comparison of the modeled high-band excitation signal and the high-band excitation signal. The operations further include causing filter information corresponding to the filter to be sent in conjunction with a bandwidth-extended audio stream corresponding to the audio signal.

In another particular aspect, a computer-readable storage device stores instructions that, when executed by a processor, cause the processor to perform operations including generating a high-band excitation signal based on a high-band portion of an audio signal. The operations further include generating a modeled high-band excitation signal based on a low-band portion of the audio signal. The operations also include generating filter coefficients based on a comparison of the modeled high-band excitation signal and the high-band excitation signal. The operations further include generating filter information by quantizing the filter coefficients. The operations also include causing the filter information to be sent in conjunction with a bandwidth-extended audio stream corresponding to the audio signal.

In another particular aspect, a device includes a resampler and a harmonic extension module. The resampler is configured to generate a resampled signal based on a low-band excitation signal. The harmonic extension module is configured to generate at least a first excitation signal corresponding to a first high-band frequency sub-range and a second excitation signal corresponding to a second high-band frequency sub-range based on the resampled signal. The first excitation signal is generated based on application of a first function to the resampled signal. The second excitation signal is generated based on application of a second function to the resampled signal. The harmonic extension module is further configured to generate a high-band excitation signal based on the first excitation signal and the second excitation signal.

In another particular aspect, a device includes a receiver and a harmonic extension module. The receiver is configured to receive a parameter associated with a bandwidth-extended audio stream. The harmonic extension module is configured to select one or more non-linear processing functions based at least in part on a value of the parameter. The harmonic extension module is also configured to generate a high-band excitation signal based on the one or more non-linear processing functions.

In another particular aspect, a device includes a receiver and a high-band excitation signal generator. The receiver is configured to receive a parameter associated with a bandwidth-extended audio stream. The high-band excitation signal generator is configured to determine a value of the parameter. The high-band excitation signal generator is also configured, responsive to the value of the parameter, to generate a high-band excitation signal based on target gain information associated with the bandwidth-extended audio stream or based on filter information associated with the bandwidth-extended audio stream.

In another particular aspect, a device includes a receiver and a high-band excitation signal generator. The receiver is configured to filter information associated with a bandwidth-extended audio stream audio stream. The high-band excitation signal generator is configured to determine a filter based on the filter information and to generate a modified high-band excitation signal based on application of the filter to a first high-band excitation signal.

In another particular aspect, a device includes a high-band excitation signal generator configured to generate a modulated noise signal by applying spectral shaping to a first noise signal and to generate a high-band excitation signal by combining the modulated noise signal and a harmonically extended signal.

In another particular aspect, a device includes a receiver and a high-band excitation signal generator. The receiver is configured to receive a low-band voicing factor and a mixing configuration parameter associated with a bandwidth-extended audio stream. The high-band excitation signal generator is configured to determine a high-band mixing configuration based on the low-band voicing factor and the mixing configuration parameter. The high-band excitation signal generator is also configured to generate a high-band excitation signal based on the high-band mixing configuration.

In another particular aspect, a signal processing method includes generating, at a device, a resampled signal based on a low-band excitation signal. The method also includes generating, at the device, at least a first excitation signal corresponding to a first high-band frequency sub-range and a second excitation signal corresponding to a second high-band frequency sub-range based on the resampled signal. The first excitation signal is generated based on application of a first function to the resampled signal. The second excitation signal is generated based on application of a second function to the resampled signal. The method also includes generating, at the device, a high-band excitation signal based on the first excitation signal and the second excitation signal.

In another particular aspect, a signal processing method includes receiving, at a device, a parameter associated with a bandwidth-extended audio stream. The method also includes selecting, at the device, one or more non-linear processing functions based at least in part on a value of the parameter. The method further includes generating, at the device, a high-band excitation signal based on the one or more non-linear processing functions.

In another particular aspect, a signal processing method includes receiving, at a device, a parameter associated with a bandwidth-extended audio stream. The method also includes determining, at the device, a value of the parameter. The method further includes, responsive to the value of the parameter, generating a high-band excitation signal based on target gain information associated with the bandwidth-extended audio stream or based on filter information associated with the bandwidth-extended audio stream.

In another particular aspect, a signal processing method includes receiving, at a device, filter information associated with a bandwidth-extended audio stream audio stream. The method also includes determining, at the device, a filter based on the filter information. The method further includes generating, at the device, a modified high-band excitation signal based on application of the filter to a first high-band excitation signal.

In another particular aspect, a signal processing method includes generating, at a device, a modulated noise signal by applying spectral shaping to a first noise signal. The method also includes generating, at the device, a high-band excitation signal by combining the modulated noise signal and a harmonically extended signal.

In another particular aspect, a signal processing method includes receiving, at a device, a low-band voicing factor and a mixing configuration parameter associated with a bandwidth-extended audio stream. The method also includes determining, at the device, a high-band mixing configuration based on the low-band voicing factor and the mixing configuration parameter. The method further includes generating, at the device, a high-band excitation signal based on the high-band mixing configuration.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
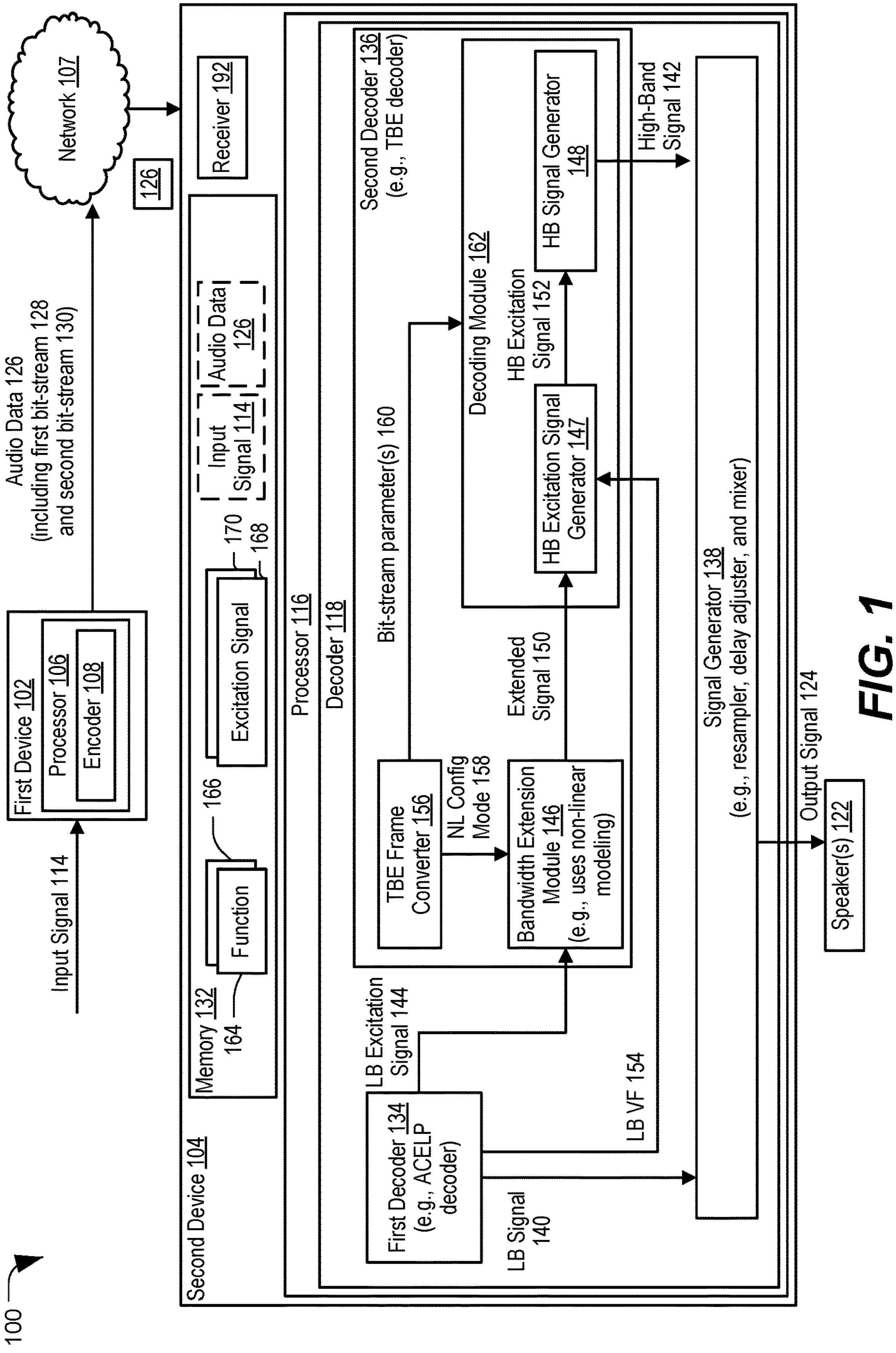
FIG. 1 is a block diagram of a particular illustrative aspect of a system that includes devices that are operable to generate a high-band signal.

Referring to FIG. 1, a particular illustrative aspect of a system that includes devices that are operable to generate a high-band signal is disclosed and generally designated 100.

The system 100 includes a first device 102 in communication, via a network 107, with a second device 104. The first device 102 may include a processor 106. The processor 106 may be coupled to or may include an encoder 108. The second device 104 may be coupled to or in communication with one or more speakers 122. The second device 104 may include a processor 116, a memory 132, or both. The processor 116 may be coupled to or may include a decoder 118. The decoder 118 may include a first decoder 134 (e.g., an algebraic code-excited linear prediction (ACELP) decoder) and a second decoder 136 (e.g., a time-domain bandwidth extension (TBE) decoder). In illustrative aspects, one or more techniques described herein may be included in an industry standard, including but not limited to a standard for moving pictures experts group (MPEG)-H three dimensional (3D) audio.

The second decoder 136 may include a TBE frame converter 156 coupled to a bandwidth extension module 146, a decoding module 162, or both. The decoding module 162 may include a high-band (HB) excitation signal generator 147, a HB signal generator 148, or both. The bandwidth extension module 146 may be coupled, via the decoding module to a signal generator 138. The first decoder 134 may be coupled to the second decoder 136, the signal generator 138, or both. For example, the first decoder 134 may be coupled to the bandwidth extension module 146, the HB excitation signal generator 147, or both. The HB excitation signal generator 147 may be coupled to the HB signal generator 148. The memory 132 may be configured to store instructions to perform one or more functions (e.g., a first function 164, a second function 166, or both). The first function 164 may include a first non-linear function (e.g., a square function) and the second function 166 may include a second non-linear function (e.g., an absolute value function) that is distinct from the first non-linear function. Alternatively, such functions may be implemented using hardware (e.g., circuitry) at the second device 104. The memory 132 may be configured to store one or more signals (e.g., a first excitation signal 168, a second excitation signal 170, or both). The second device 104 may further include a receiver 192. In a particular implementation, the receiver 192 may be included in a transceiver.

During operation, the first device 102 may receive (or generate) an input signal 114. The input signal 114 may correspond to speech of one or more users, background noise, silence, or a combination thereof. In a particular aspect, the input signal 114 may include data in the frequency range from approximately 50 hertz (Hz) to approximately 16 kilohertz (kHz). The low-band portion of the input signal 114 and the high-band portion of the input signal 114 may occupy non-overlapping frequency bands of 50 Hz-7 kHz and 7 kHz-16 kHz, respectively. In an alternate aspect, the low-band portion and the high-band portion may occupy non-overlapping frequency bands of 50 Hz-8 kHz and 8 kHz-16 kHz, respectively. In another alternate aspect, the low-band portion and the high-band portion may overlap (e.g., 50 Hz-8 kHz and 7 kHz-16 kHz, respectively).

The encoder 108 may generate audio data 126 by encoding the input signal 114. For example, the encoder 108 may generate a first bit-stream 128 (e.g., an ACELP bit-stream) based on a low-band signal of the input signal 114. The first bit-stream 128 may include low-band parameter information (e.g., low-band linear prediction coefficients (LPCs), low-band line spectral frequencies (LSFs), or both) and a low-band excitation signal (e.g., a low-band residual of the input signal 114).

In a particular aspect, the encoder 108 may generate a high-band excitation signal and may encode a high-band signal of the input signal 114 based on the high-band excitation signal. For example, the encoder 108 may generate a second bit-stream 130 (e.g., a TBE bit-stream) based on the high-band excitation signal. The second bit-stream 130 may include bit-stream parameters, as further described with reference to FIG. 3. For example, the bit-stream parameters may include one or more bit-stream parameters 160 as illustrated in FIG. 1, a non-linear (NL) configuration mode 158, or a combination thereof. The bit-stream parameters may include high-band parameter information. For example, the second bit-stream 130 may include at least one of high-band LPC coefficients, high-band LSF, high-band line spectral pair (LSP) coefficients, gain shape information (e.g., temporal gain parameters corresponding to sub-frames of a particular frame), gain frame information (e.g., gain parameters corresponding to an energy ratio of high-band to low-band for a particular frame), and/or other parameters corresponding to a high-band portion of the input signal 114. In a particular aspect, the encoder 108 may determine the high-band LPC coefficients using at least one of a vector quantizer, a hidden markov model (HMM), a gaussian mixture model (GMM), or another model or method. The encoder 108 may determine the high-band LSF, the high-band LSP, or both, based on the LPC coefficients.

The encoder 108 may generate high-band parameter information based on the high-band signal of the input signal 114. For example, a "local" decoder of the first device 102 may emulate the decoder 118 of the second device 104. The "local" decoder may generate a synthesized audio signal based on the high-band excitation signal. The encoder 108 may generate gain values (e.g., gain shape, gain frame, or both) based on a comparison of the synthesized audio signal and the input signal 114. For example, the gain values may correspond to a difference between the synthesized audio signal and the input signal 114. The audio data 126 may include the first bit-stream 128, the second bit-stream 130, or both. The first device 102 may transmit the audio data 126 to the second device 104 via the network 107.

The receiver 192 may receive the audio data 126 from the first device 102 and may provide the audio data 126 to the decoder 118. The receiver 192 may also store the audio data 126 (or portions thereof) in the memory 132. In an alternate implementation, the memory 132 may store the input signal 114, the audio data 126, or both. In this implementation, the input signal 114, the audio data 126, or both, may be generated by the second device 104. For example, the audio data 126 may correspond to media (e.g., music, movies, television shows, etc.) that is stored at the second device 104 or that is being streamed by the second device 104.

The decoder 118 may provide the first bit-stream 128 to the first decoder 134 and the second bit-stream 130 to the second decoder 136. The first decoder 134 may extract (or decode) low-band parameter information, such as low-band LPC coefficients, low-band LSF, or both, and a low-band (LB) excitation signal 144 (e.g., a low-band residual of the input signal 114) from the first bit-stream 128. The first decoder 134 may provide the LB excitation signal 144 to the bandwidth extension module 146. The first decoder 134 may generate a LB signal 140 based on the low-band parameters and the LB excitation signal 144 using a particular LB model. The first decoder 134 may provide the LB signal 140 to the signal generator 138, as shown.

The first decoder 134 may determine a LB voicing factor (VF) 154 (e.g., a value from 0.0 to 1.0) based on the LB parameter information. The LB VF 154 may indicate a voiced/unvoiced nature (e.g., strongly voiced, weakly voiced, weakly unvoiced, or strongly unvoiced) of the LB signal 140. The first decoder 134 may provide the LB VF 154 to the HB excitation signal generator 147.

The TBE frame converter 156 may generate bit-stream parameters by parsing the second bit-stream 130. For example, the bit-stream parameters may include the bit-stream parameters 160, the NL configuration mode 158, or a combination thereof, as further described with reference to FIG. 3. The TBE frame converter 156 may provide the NL configuration mode 158 to the bandwidth extension module 146, the bit-stream parameters 160 to the decoding module 162, or both.

The bandwidth extension module 146 may generate an extended signal 150 (e.g., a harmonically extended high-band excitation signal) based on the LB excitation signal 144, the NL configuration mode 158, or both, as described with reference to FIGS. 4-5. The bandwidth extension module 146 may provide the extended signal 150 to the HB excitation signal generator 147. The HB excitation signal generator 147 may synthesize a HB excitation signal 152 based on the bit-stream parameters 160, the extended signal 150, the LB VF 154, or a combination thereof, as further described with reference to FIG. 4. The HB signal generator 148 may generate an HB signal 142 based on the HB excitation signal 152, the bit-stream parameters 160, or a combination thereof, as further described with reference to FIG. 4. The HB signal generator 148 may provide the HB signal 142 to the signal generator 138.

The signal generator 138 may generate an output signal 124 based on the LB signal 140, the HB signal 142, or both. For example, the signal generator 138 may generate an upsampled HB signal by upsampling the HB signal 142 by a particular factor (e.g., 2). The signal generator 138 may generate a spectrally flipped HB signal by spectrally flipping the upsampled HB signal in a time-domain, as described with reference to FIG. 6. The spectrally flipped HB signal may correspond to a high-band (e.g., 32 kHz) signal. The signal generator 138 may generate an upsampled LB signal by upsampling the LB signal 140 by a particular factor (e.g., 2). The upsampled LB signal may correspond to a 32 kHz signal. The signal generator 138 may generate a delayed HB signal by delaying the spectrally flipped HB signal to time-align the delayed HB signal and the upsampled LB signal. The signal generator 138 may generate the output signal 124 by combining the delayed HB signal and the upsampled LB signal. The signal generator 138 may store the output signal 124 in the memory 132. The signal generator 138 may output, via the speakers 122, the output signal 124.

Figure 2:
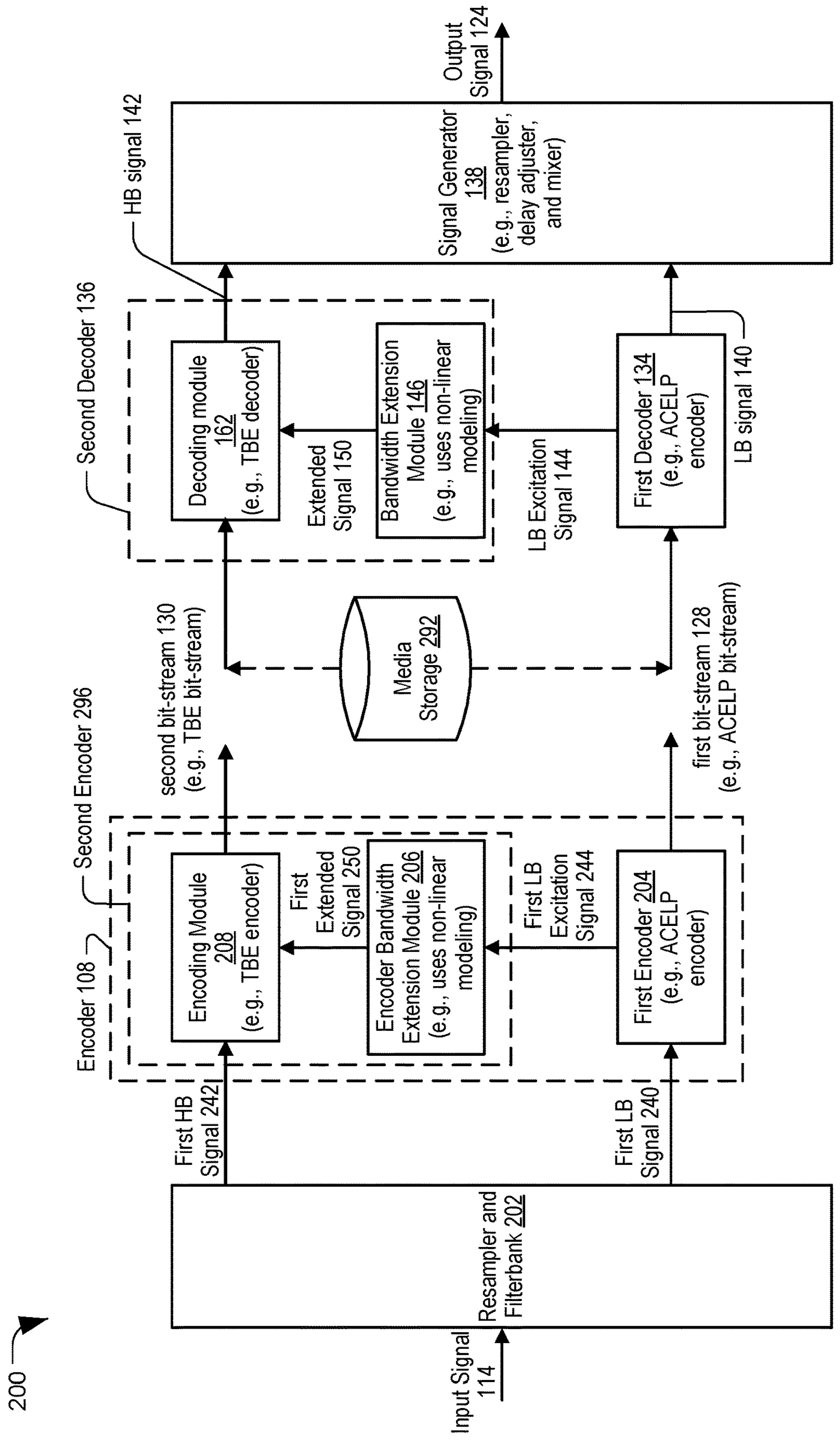
FIG. 2 is a diagram of another aspect of a system that includes devices that are operable to generate a high-band signal.

Referring to FIG. 2, a system is disclosed and generally designated 200. In a particular aspect, the system 200 may correspond to the system 100 of FIG. 1. The system 200 may include a resampler and filterbank 202, the encoder 108, or both. The resampler and filterbank 202, the encoder 108, or both, may be included in the first device 102 of FIG. 1. The encoder 108 may include a first encoder 204 (e.g., an ACELP encoder) and a second encoder 296 (e.g., a TBE encoder). The second encoder 296 may include an encoder bandwidth extension module 206, an encoding module 208 (e.g., a TBE encoder), or both. The encoder bandwidth extension module 206 may perform non-linear processing and modeling, as described with reference to FIG. 13. In a particular aspect, a receiving/decoding device may be coupled to or may include media storage 292. For example, the media storage 292 may store encoded media. Audio for the encoded media may be represented by an ACELP bit-stream and a TBE bit-stream. Alternatively, the media storage 292 may correspond to a network accessible server from which the ACELP bit-stream and the TBE bit-stream are received during a streaming session.

The system 200 may include the first decoder 134, the second decoder 136, the signal generator 138 (e.g., a resampler, a delay adjuster, and a mixer), or a combination thereof. The second decoder 136 may include the bandwidth extension module 146, the decoding module 162, or both. The bandwidth extension module 146 may perform non-linear processing and modeling, as described with reference to FIGS. 1 and 4.

During operation, the resampler and filterbank 202 may receive the input signal 114. The resampler and filterbank 202 may generate a first LB signal 240 by applying a low-pass filter to the input signal 114 and may provide the first LB signal 240 to the first encoder 204. The resampler and filterbank 202 may generate a first HB signal 242 by applying a high-pass filter to the input signal 114 and may provide the first HB signal 242 to the encoding module 208.

The first encoder 204 may generate a first LB excitation signal 244 (e.g., an LB residual), the first bit-stream 128, or both, based on the first LB signal 240. The first encoder 204 may provide the first LB excitation signal 244 to the encoder bandwidth extension module 206. The first encoder 204 may provide the first bit-stream 128 to the first decoder 134.

The encoder bandwidth extension module 206 may generate a first extended signal 250 based on the first LB excitation signal 244. The encoder bandwidth extension module 206 may provide the first extended signal 250 to the encoding module 208. The encoding module 208 may generate the second bit-stream 130 based on the first HB signal 242 and the first extended signal 250. For example, the encoding module 208 may generate a synthesized HB signal based on the first extended signal 250, may generate the bit-stream parameters 160 of FIG. 1 to reduce a difference between the synthesized HB signal and the first HB signal 242, and may generate the second bit-stream 130 including the bit-stream parameters 160.

The first decoder 134 may receive the first bit-stream 128 from the first encoder 204. The decoding module 162 may receive the second bit-stream 130 from the encoding module 208. In a particular implementation, the first decoder 134 may receive the first bit-stream 128, the second bit-stream 130, or both, from the media storage 292. For example, the first bit-stream 128, the second bit-stream 130, or both, may correspond to media (e.g., music or a movie) stored at the media storage 292. In a particular aspect, the media storage 292 may correspond to a network device that is streaming the first bit-stream 128 to the first decoder 134 and the second bit-stream 130 to the decoding module 162. The first decoder 134 may generate the LB signal 140, the LB excitation signal 144, or both, based on the first bit-stream 128, as described with reference to FIG. 1. The LB signal 140 may include a synthesized LB signal that approximates the first LB signal 240. The first decoder 134 may provide the LB signal 140 to the signal generator 138. The first decoder 134 may provide the LB excitation signal 144 to the bandwidth extension module 146. The bandwidth extension module 146 may generate the extended signal 150 based on the LB excitation signal 144, as described with reference to FIG. 1. The bandwidth extension module 146 may provide the extended signal 150 to the decoding module 162. The decoding module 162 may generate the HB signal 142 based on the second bit-stream 130 and the extended signal 150, as described with reference to FIG. 1. The HB signal 142 may include a synthesized HB signal that approximates the first HB signal 242. The decoding module 162 may provide the HB signal 142 to the signal generator 138. The signal generator 138 may generate the output signal 124 based on the LB signal 140 and the HB signal 142, as described with reference to FIG. 1.

Figure 3:
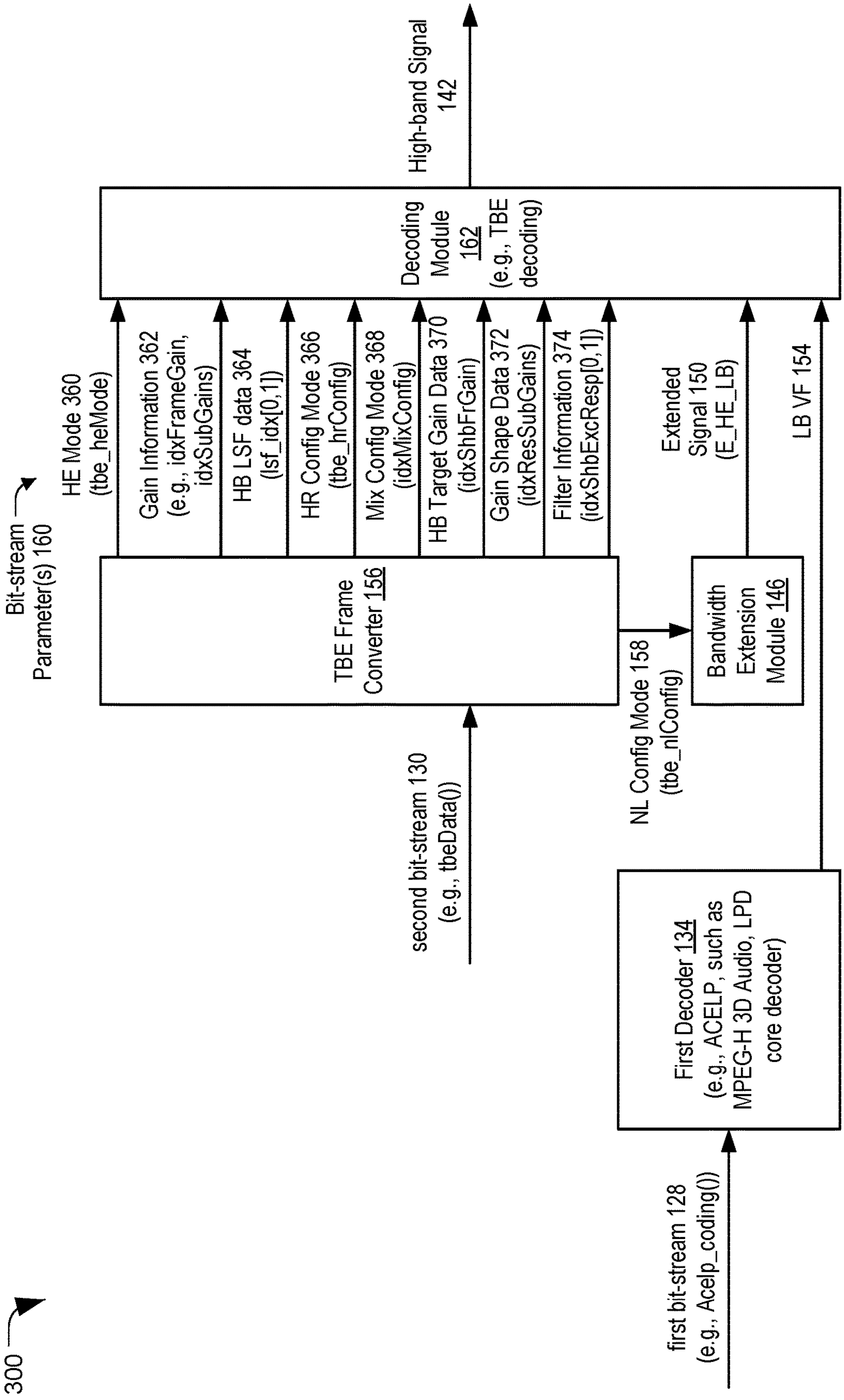
FIG. 3 is a diagram of another aspect of a system that includes devices that are operable to generate a high-band signal.

Referring to FIG. 3, a system is disclosed and generally designated 300. In a particular aspect, the system 300 may correspond to the system 100 of FIG. 1, the system 200 of FIG. 2, or both. The system 300 may include the first decoder 134, the TBE frame converter 156, the bandwidth extension module 146, the decoding module 162, or a combination thereof. The first decoder 134 may include an ACELP decoder, a MPEG decoder, an MPEG-H 3D audio decoder, a linear prediction domain (LPD) decoder, or a combination thereof.

During operation, the TBE frame converter 156 may receive the second bit-stream 130, as described with reference to FIG. 1. The second bit-stream 130 may correspond to a data structure tbe_data( ) illustrated in Table 1:

TABLE 1

| Syntax | No. of bits |
|---|---|
| tbe_data( ) | |
| { | |
| **tbe_heMode;** | 1 |
| **idxFrameGain;** | 5 |
| **idxSubGains;** | 5 |
| **lsf_idx[0];** | 7 |
| **lsf_idx[1];** | 7 |
| if (tbe_heMode==0) { | |
| **tbe_hrConfig;** | 1 |
| **tbe_nlConfig;** | 1 |
| **idxMixConfig;** | 2 |
| if (tbe_hrConfig==1) { | |
| **idxShbFrGain;** | 6 |
| **idxResSubGains;** | 5 |
| } else { | |
| **idxShbExcResp[0];** | 7 |
| **idxShbExcResp[1];** | 4 |
| } | |
| } | |
| } | |

The TBE frame converter 156 may generate the bit-stream parameters 160, the NL configuration mode 158, or a combination thereof, by parsing the second bit-stream 130. The bit-stream parameters 160 may include a high-efficiency (HE) mode 360 (e.g., tbe_heMode), gain information 362 (e.g., idxFrameGain and idxSubGains), HB LSF data 364 (e.g., lsf_idx[0,1]), a high resolution (HR) configuration mode 366 (e.g., tbe_hrConfig), a mix configuration mode 368 (e.g., idxMixConfig, alternatively referred to as a "mixing configuration parameter"), HB target gain data 370 (e.g., idxShbFrGain), gain shape data 372 (e.g., idxResSubGains), filter information 374 (e.g., idxShbExcResp[0,1]), or a combination thereof. The TBE frame converter 156 may provide the NL configuration mode 158 to the bandwidth extension module 146. The TBE frame converter 156 may also provide one or more of the bit-stream parameters 160 to the decoding module 162, as shown.

In a particular aspect, the filter information 374 may indicate a finite impulse response (FIR) filter. The gain information 362 may include HB reference gain information, temporal sub-frame residual gain shape information, or both. The HB target gain data 370 may indicate frame energy.

In a particular aspect, the TBE frame converter 156 may extract the NL configuration mode 158 from the second bit-stream 130 in response to determining that the HE mode 360 has a first value (e.g., 0). Alternatively, the TBE frame converter 156 may set the NL configuration mode 158 to a default value (e.g., 1) in response to determining that the HE mode 360 has a second value (e.g., 1). In a particular aspect, the TBE frame converter 156 may set the NL configuration mode 158 to the default value (e.g., 1) in response to determining that the NL configuration mode 158 has a first particular value (e.g., 2) and that the mix configuration mode 368 has a second particular value (e.g., a value greater than 1).

In a particular aspect, the TBE frame converter 156 may extract the HR configuration mode 366 from the second bit-stream 130 in response to determining that the HE mode 360 has the first value (e.g., 0). Alternatively, the TBE frame converter 156 may set the HR configuration mode 366 to a default value (e.g., 0) in response to determining that the HE mode 360 has the second value (e.g., 1). The first decoder 134 may receive the first bit-stream 128, as described with reference to FIG. 1.

Figure 4:
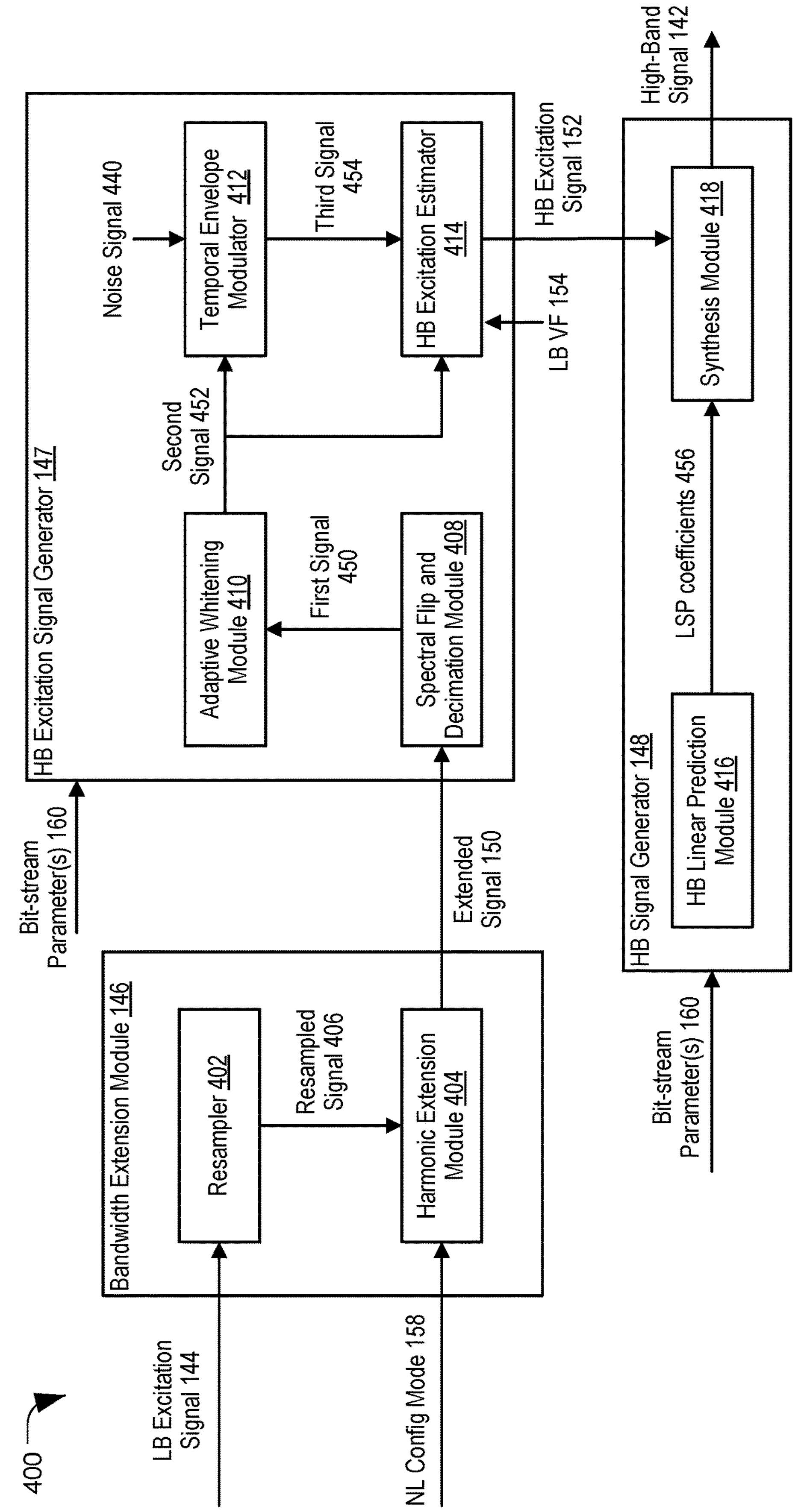
FIG. 4 is a diagram of another aspect of a system that includes devices that are operable to generate a high-band signal.

Referring to FIG. 4, a system is disclosed and generally designated 400. In a particular aspect, the system 400 may correspond to the system 100 of FIG. 1, the system 200 of FIG. 2, the system 300 of FIG. 3, or a combination thereof. The system 400 may include the bandwidth extension module 146, the HB excitation signal generator 147, the HB signal generator 148, or a combination thereof. The bandwidth extension module 146 may include a resampler 402, a harmonic extension module 404, or both. The HB excitation signal generator 147 may include a spectral flip and decimation module 408, an adaptive whitening module 410, a temporal envelope modulator 412, an HB excitation estimator 414, or a combination thereof. The HB signal generator 148 may include an HB linear prediction module 416, a synthesis module 418, or both.

During operation, the bandwidth extension module 146 may generate the extended signal 150 by extending the LB excitation signal 144, as described herein. The resampler 402 may receive the LB excitation signal 144 from the first decoder 134 of FIG. 1, such as ACELP decoder. The resampler 402 may generate a resampled signal 406 based on the LB excitation signal 144, as described with reference to FIG. 5. The resampler 402 may provide the resampled signal 406 to the harmonic extension module 404.

The harmonic extension module 404 may receive the NL configuration mode 158 from the TBE frame converter 156 of FIG. 1. The harmonic extension module 404 may generate the extended signal 150 (e.g., an HB excitation signal) by harmonically extending the resampled signal 406 in a time-domain based on the NL configuration mode 158. In a particular aspect, the harmonic extension module 404 may generate the extended signal 150 (EHE) based on Equation 1:

$$E_{HE} = \begin{cases} |E_{LB}|, \text{ if } tbe\_nlConfig = 1 \\ \varepsilon_N \text{sign}(E_{LB})E_{LB}^2, \text{ if } tbe\_nlConfig = 0 \\ H_{LP}(z)\varepsilon_N \text{sign}(E_{LB})E_{LB}^2 + H_{HP}|E_{LB}|, \\ \text{if } tbe\_nlConfig = 0 \text{ AND } idxMixConfig \leq 1 \end{cases}, \qquad \text{Equation 1}$$

where $E_{LB}$ corresponds to the resampled signal 406, $\varepsilon_N$ corresponds to an energy normalization factor between $E_{LB}$ and $E_{LB}^2$, and tbe_nlConfig corresponds to the NL configuration mode 158. The energy normalization factor may correspond to a ratio of frame energies of $E_{LB}$ and $E_{LB}^2$. $H_{LP}$ and $H_{HP}$ correspond to a low-pass filter and high-pass filter respectively, with a particular cut-off frequency (e.g., 3/4 $f_s$ or approximately 12 kHz). A transfer function of the $H_{LP}$ may be based on Equation 2:

$$H_{LP}(z) = \frac{0.57(1 + 2z^{-1} + z^{-2})}{1 + 0.94z^{-1} + 0.33z^{-2}}, \qquad \text{Equation 2}$$

A transfer function of the $H_{HP}$ may be based on Equation 3:

$$H_{HP}(z) = \frac{0.098(1 - 2z^{-1} + z^{-2})}{1 + 0.94z^{-1} + 0.33z^{-2}}, \qquad \text{Equation 3}$$

For example, the harmonic extension module 404 may select the first function 164, the second function 166, or both, based on a value of the NL configuration mode 158. To illustrate, the harmonic extension module 404 may select the first function 164 (e.g., a square function) in response to determining that the NL configuration mode 158 has a first value (e.g., NL_HARMONIC or 0). The harmonic extension module 404 may, in response to selecting the first function 164, generate the extended signal 150 by applying the first function 164 (e.g., the square function) to the resampled signal 406. The square function may preserve the sign information of the resampled signal 406 in the extended signal 150 and may square values of the resampled signal 406.

In a particular aspect, the harmonic extension module 404 may select the second function 166 (e.g., an absolute value function) in response to determining that the NL configuration mode 158 has a second value (e.g., NL_SMOOTH or 1). The harmonic extension module 404 may, in response to selecting the second function 166, generate the extended signal 150 by applying the second function 166 (e.g., the absolute value function) to the resampled signal 406.

In a particular aspect, the harmonic extension module 404 may select a hybrid function in response to determining that the NL configuration mode 158 has a third value (e.g., NL_HYBRID or 2). In this aspect, the TBE frame converter 156 may provide the mix configuration mode 368 to the harmonic extension module 404. The hybrid function may include a combination of multiple functions (e.g., the first function 164 and the second function 166).

The harmonic extension module 404 may, in response to selecting the hybrid function, generate a plurality of excitation signals (e.g., at least the first excitation signal 168 and the second excitation signal 170) corresponding to a plurality of high-band frequency sub-ranges based on the resampled signal 406. For example, the harmonic extension module 404 may generate the first excitation signal 168 by applying the first function 164 to the resampled signal 406 or a portion thereof. The first excitation signal 168 may correspond to a first high-band frequency sub-range (e.g., approximately 8-12 kHz). The harmonic extension module 404 may generate the second excitation signal 170 by applying the second function 166 to the resampled signal 406 or a portion thereof. The second excitation signal 170 may correspond to a second high-band frequency sub-range (e.g., approximately 12-16 kHz).

The harmonic extension module 404 may generate a first filtered signal by applying a first filter (e.g., a low-pass filter, such as a 8-12 kHz filter) to the first excitation signal 168 and may generate a second filtered signal by applying a second filter (e.g., a high-pass filter, such as a 12-16 kHz filter) to the second excitation signal 170. The first filter and the second filter may have a particular cut-off frequency (e.g., 12 kHz). The harmonic extension module 404 may generate the extended signal 150 by combining the first filtered signal and the second filtered signal. The first high-band frequency sub-range (e.g., approximately 8-12 kHz) may correspond to harmonic data (e.g., weakly voiced or strongly voiced). The second high-band frequency sub-range (e.g., approximately 12-16 kHz) may correspond to noise-like data (e.g., weakly unvoiced or strongly unvoiced).

The harmonic extension module 404 may thus use distinct non-linear processing functions for distinct bands in the spectrum.

In a particular implementation, the harmonic extension module 404 may select the second function 166 in response to determining that the NL configuration mode 158 has the second value (e.g., NL_SMOOTH or 1) and that the mix configuration mode 368 has a particular value (e.g., a value greater than 1). Alternatively, the harmonic extension module 404 may select the hybrid function in response to determining that the NL configuration mode 158 has the second value (e.g., NL_SMOOTH or 1) and that the mix configuration mode 368 has another particular value (e.g., a value less than or equal to 1).

In a particular aspect, the harmonic extension module 404 may, in response to determining that the HE mode 360 has the first value (e.g., 0), generate the extended signal 150 (e.g., an HB excitation signal) by harmonically extending the resampled signal 406 in a time-domain based on the NL configuration mode 158. The harmonic extension module 404 may, in response to determining that the HE mode 360 has the second value (e.g., 1), generate the extend signal 150 (e.g., an HB excitation signal) by harmonically extending the resampled signal 406 in a time-domain based on the gain information 362 (e.g., idxSubGains). For example, the harmonic extension module 404 may generate the extended signal 150 using the tbe_nlConfig=1 configuration (e.g., $E_{HE}=|E_{LB}|$) in response to determining that the gain information 362 (e.g., idxSubGains) corresponds to a particular value (e.g., an odd value) and may generate the extended signal 150 using the tbe_nlConfig=0 configuration (e.g., $E_{HE}=\varepsilon_N \text{sign}(E_{LB})E_{LB}^2$) otherwise. To illustrate, the harmonic extension module 404 may, in response to determining that the gain information 362 (e.g., idxSubGains) does not correspond to the particular value (e.g., an odd value) or that the gain information 362 (e.g., idxSubGains) corresponds to another value (e.g., an even value), may generate the extended signal 150 using the tbe_nlConfig=0 configuration (e.g., $E_{HE}=\varepsilon_N \text{sign}(E_{LB})E_{LB}^2$).

The harmonic extension module 404 may provide the extended signal 150 to the spectral flip and decimation module 408. The spectral flip and decimation module 408 may generate a spectrally flipped signal by performing spectral flipping of the extended signal 150 in the time-domain based on Equation 4:

$$E_{HE}^{f}(n)=(-1)^n E_{HE}(n),\ n=0, 1, 2, \ldots, N-1, \quad \text{Equation 4}$$

where $E_{HE}^{f}(n)$ corresponds to the spectrally flipped signal and N (e.g., 512) corresponds to a number of samples per frame.

The spectral flip and decimation module 408 may generate a first signal 450 (e.g., a HB excitation signal) by decimating the spectrally flipped signal based on a first all-pass filter and a second all-pass filter. The first all-pass filter may correspond to a first transfer function indicated by Equation 5:

$$H_{AP1}(z)=\left(\frac{a_{0,1}+z^{-1}}{1+a_{0,1}z^{-1}}\right)\left(\frac{a_{1,1}+z^{-1}}{1+a_{1,1}z^{-1}}\right)\left(\frac{a_{2,1}+z^{-1}}{1+a_{2,1}z^{-1}}\right). \quad \text{Equation 5}$$

The second all-pass filter may correspond to a second transfer function indicated by Equation 6:

$$H_{AP2}(z)=\left(\frac{a_{0,2}+z^{-1}}{1+a_{0,2}z^{-1}}\right)\left(\frac{a_{1,2}+z^{-1}}{1+a_{1,2}z^{-1}}\right)\left(\frac{a_{2,2}+z^{-1}}{1+a_{2,2}z^{-1}}\right). \quad \text{Equation 6}$$

Exemplary values of the all-pass filter coefficients are provided in Table 2 below:

TABLE 2

| | |
|---|---|
| $a_{0,1}$ | 0.06056541924291 |
| $a_{1,1}$ | 0.42943401549235 |
| $a_{2,1}$ | 0.80873048306552 |
| $a_{0,2}$ | 0.22063024829630 |
| $a_{1,2}$ | 0.63593943961708 |
| $a_{2,2}$ | 0.94151583095682 |

The spectral flip and decimation module 408 may generate a first filtered signal by applying the first all-pass filter to filter even samples of the spectrally flipped signal. The spectral flip and decimation module 408 may generate a second filtered signal by applying the second all-pass filter to filter odd samples of the spectrally flipped signal.

The spectral flip and decimation module 408 may generate the first signal 450 by averaging the first filtered signal and the second filtered signal.

The spectral flip and decimation module 408 may provide the first signal 450 to the adaptive whitening module 410. The adaptive whitening module 410 may generate a second signal 452 (e.g., an HB excitation signal) by flattening a spectrum of the first signal 450 by performing fourth-order LP whitening of the first signal 450. For example, the adaptive whitening module 410 may estimate auto-correlation coefficients of the first signal 450. The adaptive whitening module 410 may generate first coefficients by applying bandwidth expansion to the auto-correlation coefficients based on multiplying the auto-correlation coefficients by an expansion function. The adaptive whitening module 410 may generate first LPCs by applying an algorithm (e.g., a Levinson-Durbin algorithm) to the first coefficients. The adaptive whitening module 410 may generate the second signal 452 by inverse filtering the first LPCs.

In a particular implementation, the adaptive whitening module 410 may modulate the second signal 452 based on normalized residual energy in response to determining that the HR configuration mode 366 has a particular value (e.g., 1). The adaptive whitening module 410 may determine the normalized residual energy based on the gain shape data 372. Alternatively, the adaptive whitening module 410 may filter the second signal 452 based on a particular filter (e.g., a FIR filter) in response to determining that the HR configuration mode 366 has a first value (e.g., 0). The adaptive whitening module 410 may determine (or generate) the particular filter based on the filter information 374. The adaptive whitening module 410 may provide the second signal 452 to the temporal envelope modulator 412, the HB excitation estimator 414, or both.

The temporal envelope modulator 412 may receive the second signal 452 from the adaptive whitening module 410, a noise signal 440 from a random noise generator, or both. The random noise generator may be coupled to or may be included in the second device 104. The temporal envelope modulator 412 may generate a third signal 454 based on the noise signal 440, the second signal 452, or both. For example, the temporal envelope modulator 412 may generate a first noise signal by applying temporal shaping to the noise signal 440. The temporal envelope modulator 412 may generate a signal envelope based on the second signal 452 (or the LB excitation signal 144). The temporal envelope modulator 412 may generate the first noise signal based on the signal envelope and the noise signal 440. For example, the temporal envelope modulator 412 may combine the signal envelope and the noise signal 440. Combining the signal envelope and the noise signal 440 may modulate amplitude of the noise signal 440. The temporal envelope modulator 412 may generate the third signal 454 by applying spectral shaping to the first noise signal. In an alternate implementation, the temporal envelope modulator 412 may generate the first noise signal by applying spectral shaping to the noise signal 440 and may generate the third signal 454 by applying temporal shaping to the first noise signal. Thus, spectral and temporal shaping may be applied in any order to the noise signal 440. The temporal envelope modulator 412 may provide the third signal 454 to the HB excitation estimator 414.

The HB excitation estimator 414 may receive the second signal 452 from the adaptive whitening module 410, the third signal 454 from the temporal envelope modulator 412, or both. The HB excitation estimator 414 may generate the HB excitation signal 152 by combining the second signal 452 and the third signal 454.

In a particular aspect, the HB excitation estimator 414 may combine the second signal 452 and the third signal 454 based on the LB VF 154. For example, the HB excitation estimator 414 may determine a HB VF based on one or more LB parameters. The HB VF may correspond to a HB mixing configuration. The one or more LB parameters may include the LB VF 154. The HB excitation estimator 414 may determine the HB VF based on application of a sigmoid function on the LB VF 154. For example, the HB excitation estimator 414 may determine the HB VF based on Equation 7:

$$VF_i = \frac{1}{1+e^{-4\alpha_i}},\ i = 1, 2, 3, 4, \qquad \text{Equation 7}$$

where $VF_i$ may correspond to a HB VF corresponding to a sub-frame i, and $\alpha_i$ may correspond to a normalized correlation from the LB. In a particular aspect, $\alpha_i$ may correspond to the LB VF 154 for the sub-frame i. The HB excitation estimator 414 may "smoothen" the HB VF to account for sudden variations in the LB VF 154. For example the HB excitation estimator 414 may reduce variations in the HB VF based on the mix configuration mode 368 in response to determining that the HR configuration mode 366 has a particular value (e.g., 1). Modifying the HB VF based on the mix configuration mode 368 may compensate for a mismatch between the LB VF 154 and the HB VF. The HB excitation estimator 414 may power normalize the third signal 454 so that the third signal 454 has the same power level as the second signal 452.

The HB excitation estimator 414 may determine a first weight (e.g., HB VF) and a second weight (e.g., 1−HB VF). The HB excitation estimator 414 may generate the HB excitation signal 152 by performing a weighted sum of the second signal 452 and the third signal 454, where the first weight is assigned to the second signal 452 and the second weight is assigned to the third signal 454. For example, the HB excitation estimator 414 may generate sub-frame (i) of the HB excitation signal 152 by mixing sub-frame (i) of the second signal 452 that is scaled based on $VF_i$ (e.g., scaled based on a square root of $VF_i$) and sub-frame (i) of the third signal 454 that is scaled based on $(1-VF_i)$ (e.g., scaled based on a square root of $(1-VF_i)$). The HB excitation estimator 414 may provide the HB excitation signal 152 to the synthesis module 418.

The HB linear prediction module 416 may receive the bit-stream parameters 160 from the TBE frame converter 156. The HB linear prediction module 416 may generate LSP coefficients 456 based on the HB LSF data 364. For example, the HB linear prediction module 416 may determine LSFs based on the HB LSF data 364 and may convert the LSFs to the LSP coefficients 456. The bit-stream parameters 160 may correspond to a first audio frame of a sequence of audio frames. The HB linear prediction module 416 may interpolate the LSP coefficients 456 based on second LSP coefficients associated with another frame in response to determining that the other frame corresponds to a TBE frame. The other frame may precede the first audio frame in the sequence of audio frames. The LSP coefficients 456 may be interpolated over a particular number of (e.g., four) sub-frames. The HB linear prediction module 416 may refrain from interpolating the LSP coefficients 456 in response to determining that the other frame does not correspond to a TBE frame. The HB linear prediction module 416 may provide the LSP coefficients 456 to the synthesis module 418.

The synthesis module 418 may generate the HB signal 142 based on the LSP coefficients 456, the HB excitation signal 152, or both. For example, the synthesis module 418 may generate (or determine) high-band synthesis filters based on the LSP coefficients 456. The synthesis module 418 may generate a first HB signal by applying the high-band synthesis filters to the HB excitation signal 152. The synthesis module 418 may, in response to determining that the HR configuration mode 366 has a particular value (e.g., 1), perform a memory-less synthesis to generate the first HB signal. For example, the first HB signal may be generated with past LP filter memories set to zero. The synthesis module 418 may match energy of the first HB signal to target signal energy indicated by the HB target gain data 370. The gain information 362 may include frame gain information and gain shape information. The synthesis module 418 may generate scaled HB signal by scaling the first HB signal based on the gain shape information. The synthesis module 418 may generate the HB signal 142 by multiplying the scaled HB signal by gain frame indicated by the frame gain information. The synthesis module 418 may provide the HB signal 142 to the signal generator 138 of FIG. 1.

In a particular implementation, the synthesis module 418 may modify the HB excitation signal 152 prior to generating the first HB signal. For example, the synthesis module 418 may generate a modified HB excitation signal based on the HB excitation signal 152 and may generate the first HB signal by applying the high-band synthesis filters to the modified HB excitation signal. To illustrate, the synthesis module 418 may, in response to determining that the HR configuration mode 366 has a first value (e.g., 0), generate a filter (e.g., a FIR filter) based on the filter information 374. The synthesis module 418 may generate the modified HB excitation signal by applying the filter to at least a portion (e.g., a harmonic portion) of the HB excitation signal 152. Applying the filter to the HB excitation signal 152 may reduce distortion between the HB signal 142 generated at the second device 104 and an HB signal of the input signal 114. Alternatively, the synthesis module 418 may, in response to determining that the HR configuration mode 366 has a second value (e.g., 1), generate the modified HB excitation signal based on target gain information. The target gain information may include the gain shape data 372, the HB target gain data 370, or both.

In a particular implementation, the HB excitation estimator 414 may modify the second signal 452 prior to generating the HB excitation signal 152. For example, the HB excitation estimator 414 may generate a modified second signal based on the second signal 452 and may generate the HB excitation signal 152 by combining the modified second signal and the third signal 454. To illustrate, the HB excitation estimator 414 may, in response to determining that the HR configuration mode 366 has a first value (e.g., 0), generate a filter (e.g., a FIR filter) based on the filter information 374. The HB excitation estimator 414 may generate the modified second signal by applying the filter to at least a portion (e.g., a harmonic portion) of the second signal 452. Alternatively, the HB excitation estimator 414 may, in response to determining that the HR configuration mode 366 has a second value (e.g., 1), generate the modified second signal based on target gain information. The target gain information may include the gain shape data 372, the HB target gain data 370, or both.

Figure 5:
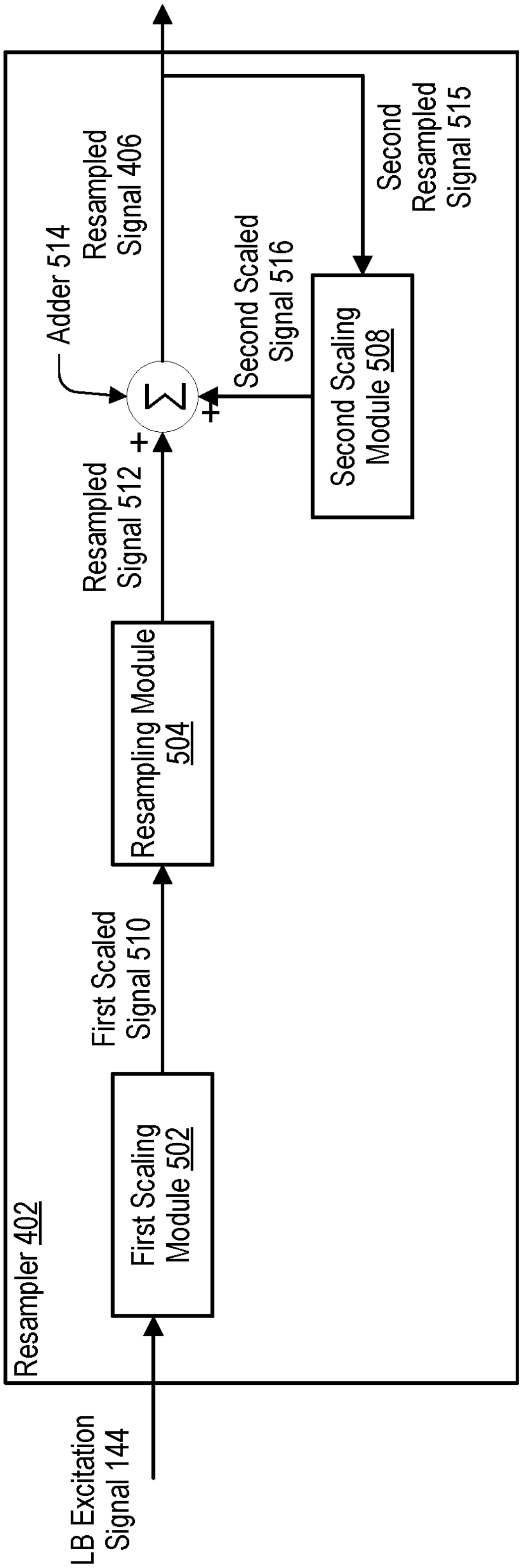
FIG. 5 is a diagram of a particular illustrative aspect of a resampler that may be included in one or more of the systems of FIGS. 1-4.

Referring to FIG. 5, the resampler 402 is shown. The resampler 402 may include a first scaling module 502, a resampling module 504, an adder 514, a second scaling module 508, or a combination thereof.

During operation, the first scaling module 502 may receive the LB excitation signal 144 and may generate a first scaled signal 510 by scaling the LB excitation signal 144 based on a fixed codebook (FCB) gain ($g_c$). The first scaling module 502 may provide the first scaled signal 510 to the resampling module 504. The resampling module 504 may generate a resampled signal 512 by upsampling the first scaled signal 510 by a particular factor (e.g., 2). The resampling module 504 may provide the resampled signal 512 to the adder 514. The second scaling module 508 may generate a second scaled signal 516 by scaling a second resampled signal 515 based on a pitch gain ($g_p$). The second resampled signal 515 may correspond to a previous resampled signal. For example, the resampled signal 406 may correspond to an nth audio frame of a sequence of frames. The previous resampled signal may correspond to the (n−1)th audio frame of the sequence of frames. The second scaling module 508 may provide the second scaled signal 516 to the adder 514. The adder 514 may combine the resampled signal 512 and the second scaled signal 516 to generate the resampled signal 406. The adder 514 may provide the resampled signal 406 to the second scaling module 508 to be used during processing of the (n+1)th audio frame. The adder 514 may provide the resampled signal 406 to the harmonic extension module 404 of FIG. 4.

Figure 6:
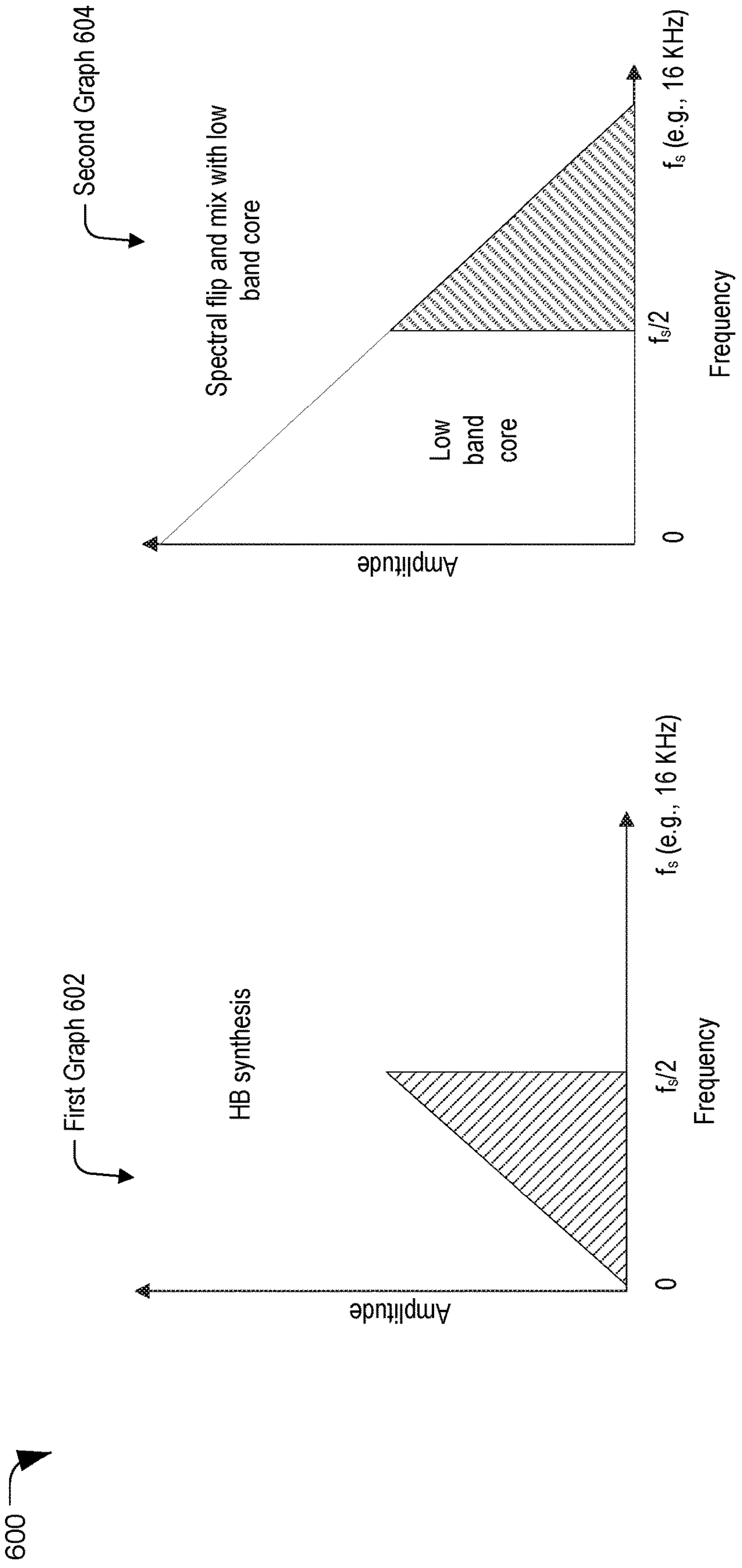
FIG. 6 is a diagram of a particular illustrative aspect of spectral flipping of a signal that may be performed by one or more of the systems of FIGS. 1-4.

Referring to FIG. 6, a diagram is shown and generally designated 600. The diagram 600 may illustrate spectral flipping of a signal. The spectral flipping of the signal may be performed by one or more of the systems of FIGS. 1-4. For example, the signal generator 138 may perform a spectral flipping of the high-band signal 142 in the time-domain, as described with reference to FIG. 1. The diagram 600 includes a first graph 602 and a second graph 604.

The first graph 602 may correspond to a first signal prior to spectral flipping. The first signal may correspond to the high-band signal 142. For example, the first signal may include an upsampled HB signal generated by upsampling the high-band signal 142 by a particular factor (e.g., 2), as described with reference to FIG. 1. The second graph 604 may correspond to a spectrally flipped signal generated by spectrally flipping the first signal. For example, the spectrally flipped signal may be generated by spectrally flipping the upsampled HB signal in a time-domain. The first signal may be flipped at a particular frequency (e.g., $f_s/2$ or approximately 8 kHz). Data of the first signal in a first frequency range (e.g., $0-f_s/2$) may correspond to second data of the spectrally flipped signal in a second frequency range (e.g., $f_s-f_s/2$).

Figure 7:
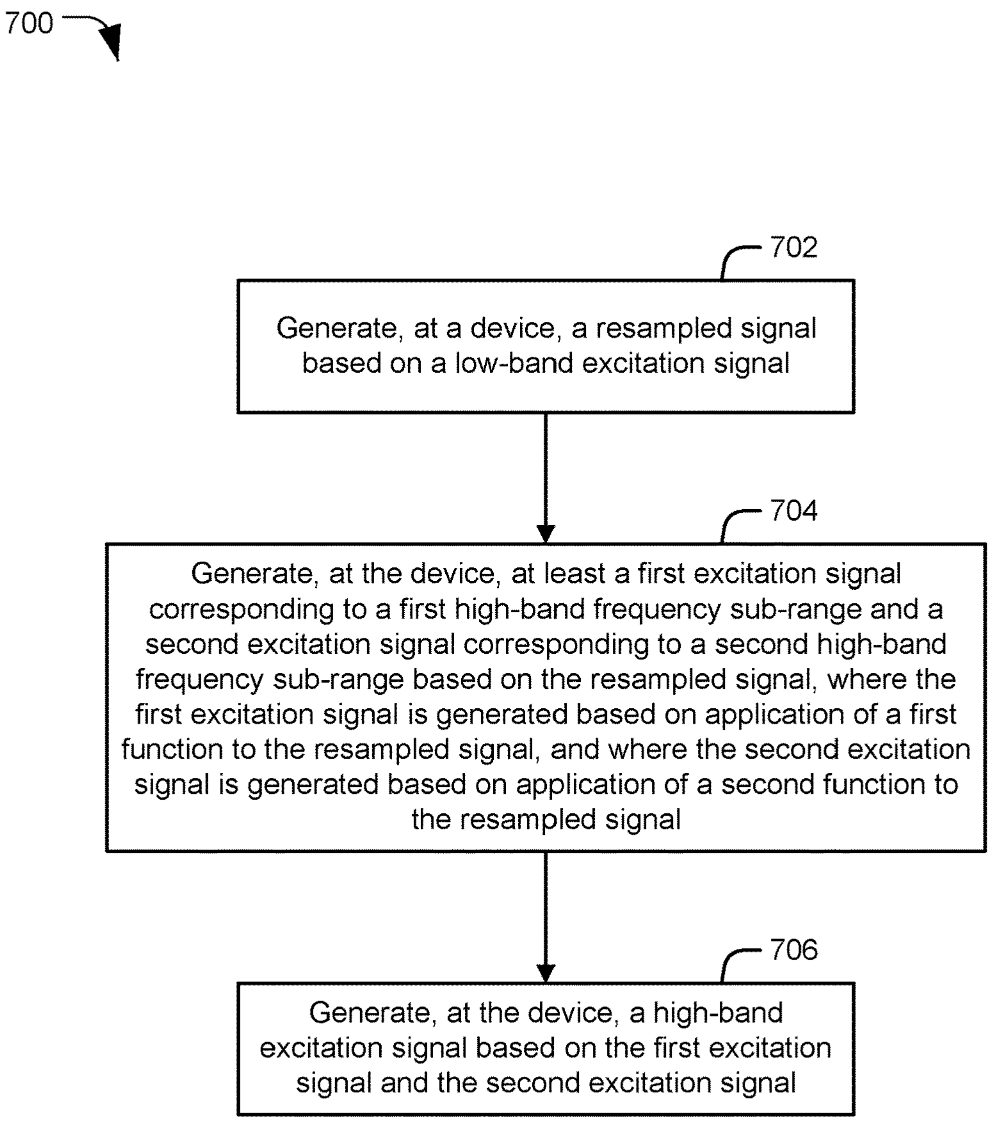
FIG. 7 is a flowchart to illustrate an aspect of a method of high band signal generation.

Referring to FIG. 7, a flowchart of an aspect of a method of high band signal generation is shown and generally designated 700. The method 700 may be performed by one or more components of the systems 100-400 of FIGS. 1-4. For example, the method 700 may be performed by the second device 104, the bandwidth extension module 146 of FIG. 1, the resampler 402, the harmonic extension module 404 of FIG. 4, or a combination thereof.

The method 700 includes generating, at a device, a resampled signal based on a low-band excitation signal, at 702. For example, the resampler 402 may generate the resampled signal 406, as described with reference to FIG. 4.

The method 700 also includes generating, at the device, at least a first excitation signal corresponding to a first high-band frequency sub-range and a second excitation signal corresponding to a second high-band frequency sub-range based on the resampled signal, at 704. For example, the harmonic extension module 404 may generate at least the first excitation signal 168 and the second excitation signal 170 based on the resampled signal 406, as described with reference to FIG. 4. The first excitation signal 168 may correspond to a first high-band frequency sub-range (e.g., 8-12 kHz). The second excitation signal 170 may correspond to a second high-band frequency sub-range (e.g., 12-16 kHz). The harmonic extension module 404 may generate the first excitation signal 168 based on application of the first function 164 to the resampled signal 406. The harmonic extension module 404 may generate the second excitation signal 170 based on application of the second function 166 to the resampled signal 406.

The method 700 further includes generating, at the device, a high-band excitation signal based on the first excitation signal and the second excitation signal, at 706. For example, the harmonic extension module 404 may generate the extended signal 150 based on the first excitation signal 168 and the second excitation signal 170, as described with reference to FIG. 4.

Figure 8:
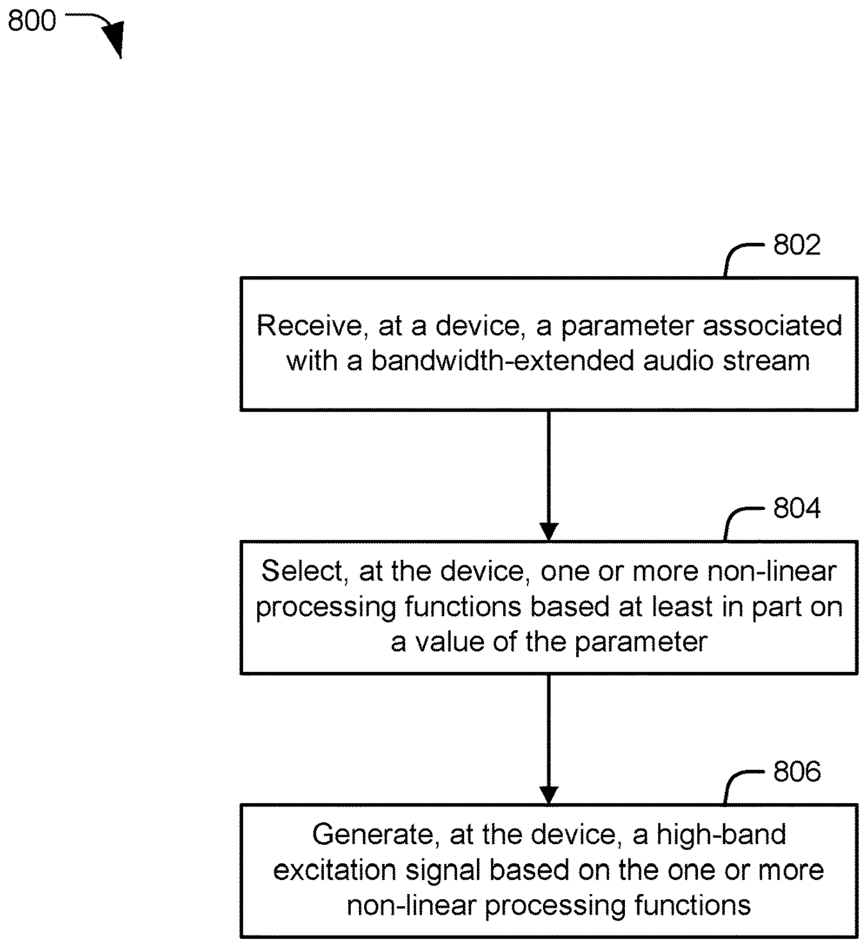
FIG. 8 is a flowchart to illustrate another aspect of a method of high band signal generation.

Referring to FIG. 8, a flowchart of an aspect of a method of high band signal generation is shown and generally designated 800. The method 800 may be performed by one or more components of the systems 100-400 of FIGS. 1-4. For example, the method 800 may be performed by the second device 104, the receiver 192, the bandwidth extension module 146 of FIG. 1, the harmonic extension module 404 of FIG. 4, or a combination thereof.

The method 800 includes receiving, at a device, a parameter associated with a bandwidth-extended audio stream, at 802. For example, the receiver 192 may receive the NL configuration mode 158 associated with the audio data 126, as described with reference to FIGS. 1 and 3.

The method 800 also includes selecting, at the device, one or more non-linear processing functions based at least in part on a value of the parameter, at 804. For example, the harmonic extension module 404 may select the first function 164, the second function 166, or both, based at least in part on a value of the NL configuration mode 158.

The method 800 further includes generating, at the device, a high-band excitation signal based on the one or more non-linear processing functions, at 806. For example, the harmonic extension module 404 may generate the extended signal 150 based on the first function 164, the second function 166, or both.

Figure 9:
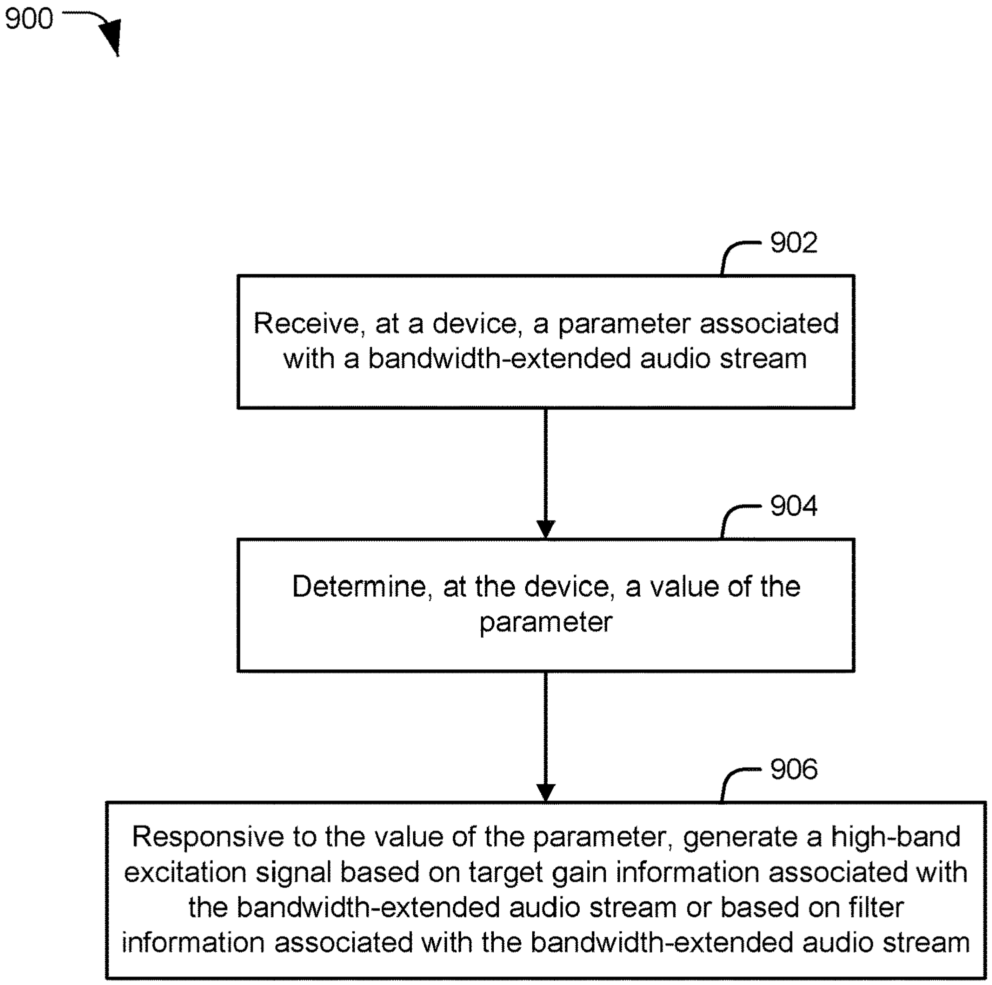
FIG. 9 is a flowchart to illustrate another aspect of a method of high band signal generation.

Referring to FIG. 9, a flowchart of an aspect of a method of high band signal generation is shown and generally designated 900. The method 900 may be performed by one or more components of the systems 100-400 of FIGS. 1-4. For example, the method 900 may be performed by the second device 104, the receiver 192, the HB excitation signal generator 147, the decoding module 162, the second decoder 136, the decoder 118, the processor 116 of FIG. 1, or a combination thereof.

The method 900 includes receiving, at a device, a parameter associated with a bandwidth-extended audio stream, at 902. For example, the receiver 192 may receive the HR configuration mode 366 associated with the audio data 126, as described with reference to FIGS. 1 and 3.

The method 900 also includes determining, at the device, a value of the parameter, at 904. For example, the synthesis module 418 may determine a value of the HR configuration mode 366, as described with reference to FIG. 4.

The method 900 further includes, responsive to the value of the parameter, generating a high-band excitation signal based on target gain information associated with the bandwidth-extended audio stream or based on filter information associated with the bandwidth-extended audio stream, at 906. For example, when the value of the HR configuration mode 366 is 1, the synthesis module 418 may generate a modified excitation signal based on target gain information, such as one or more of the gain shape data 372, the HB target gain data 370, or the gain information 362, as described with reference to FIG. 4. When the value of the HR configuration mode 366 is 0, the synthesis module 418 may generate the modified excitation signal based on the filter information 374, as described with reference to FIG. 4.

Figure 10:
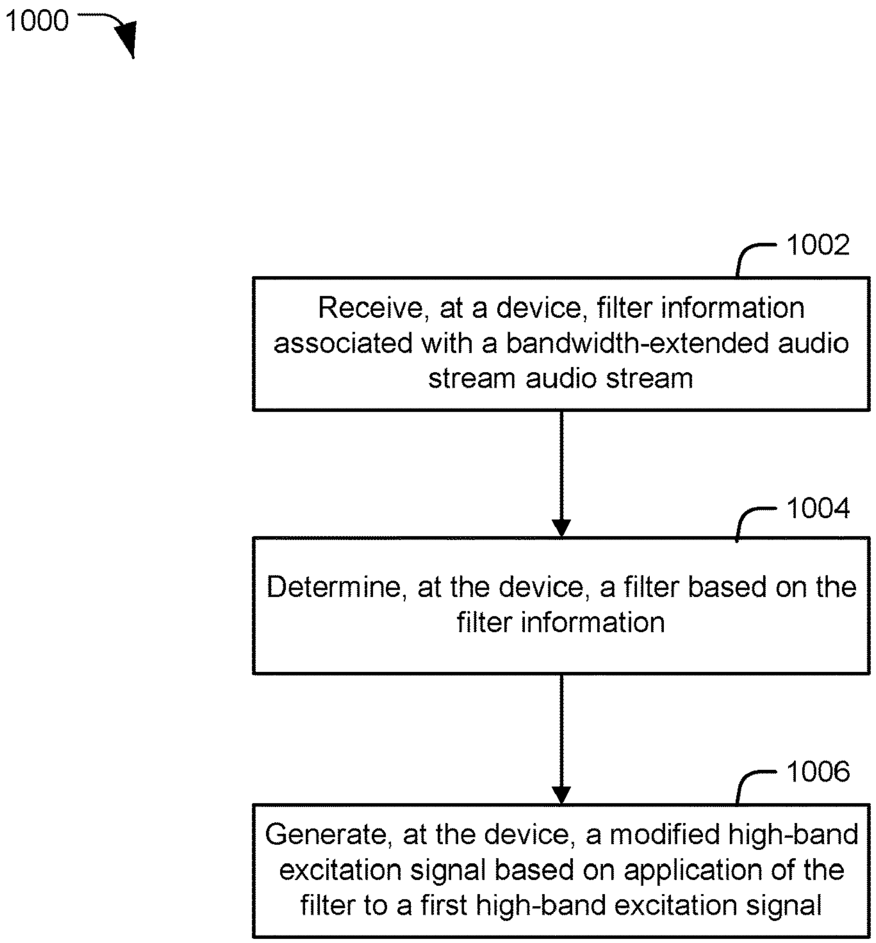
FIG. 10 is a flowchart to illustrate another aspect of a method of high band signal generation.

Referring to FIG. 10, a flowchart of an aspect of a method of high band signal generation is shown and generally designated 1000. The method 1000 may be performed by one or more components of the systems 100-400 of FIGS. 1-4. For example, the method 1000 may be performed by the second device 104, the receiver 192, the HB excitation signal generator 147 of FIG. 1, or a combination thereof.

The method 1000 includes receiving, at a device, filter information associated with a bandwidth-extended audio stream audio stream, at 1002. For example, the receiver 192 may receive the filter information 374 associated with the audio data 126, as described with reference to FIGS. 1 and 3.

The method 1000 also includes determining, at the device, a filter based on the filter information, at 1004. For example, the synthesis module 418 may determine a filter (e.g., FIR filter coefficients) based on the filter information 374, as described with reference to FIG. 4.

The method 1000 further includes generating, at the device, a modified high-band excitation signal based on application of the filter to a first high-band excitation signal, at 1006. For example, the synthesis module 418 may generate a modified high band excitation signal based on application of the filter to the HB excitation signal 152, as described with reference to FIG. 4.

Figure 11:
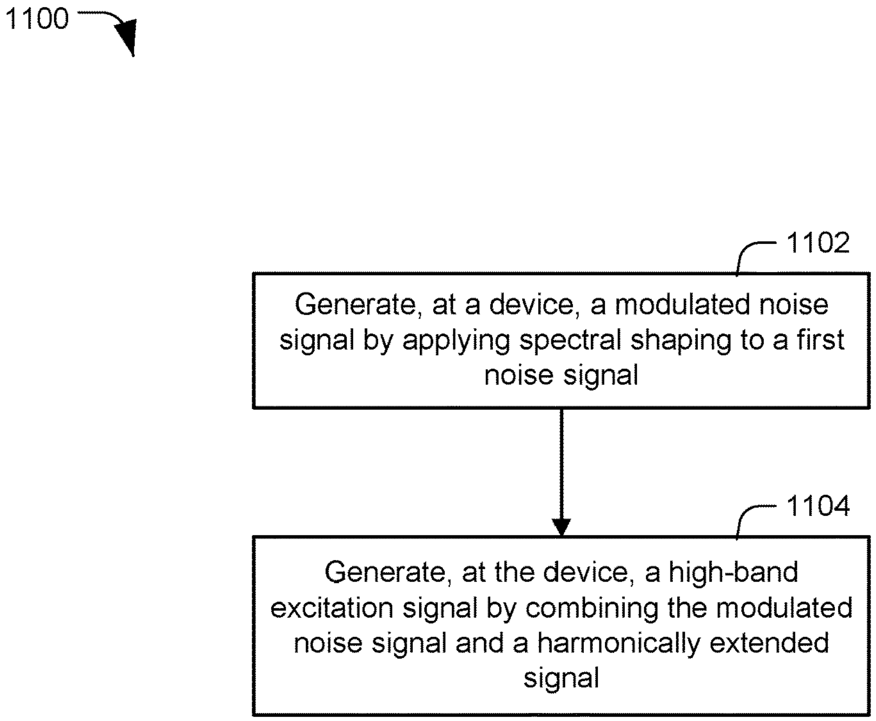
FIG. 11 is a flowchart to illustrate another aspect of a method of high band signal generation.

Referring to FIG. 11, a flowchart of an aspect of a method of high band signal generation is shown and generally designated 1100. The method 1100 may be performed by one or more components of the systems 100-400 of FIGS. 1-4. For example, the method 1100 may be performed by the second device 104, the HB excitation signal generator 147 of FIG. 1, or both.

The method 1100 includes generating, at a device, a modulated noise signal by applying spectral shaping to a first noise signal, at 1102. For example, the HB excitation estimator 414 may generate a modulated noise signal by applying spectral shaping to a first signal, as described with reference to FIG. 4. The first signal may be based on the noise signal 440.

The method 1100 also includes generating, at the device, a high-band excitation signal by combining the modulated noise signal and a harmonically extended signal, at 1104. For example, the HB excitation estimator 414 may generate the HB excitation signal 152 by combining the modulated noise signal and the second signal 442. The second signal 442 may be based on the extended signal 150.

Figure 12:
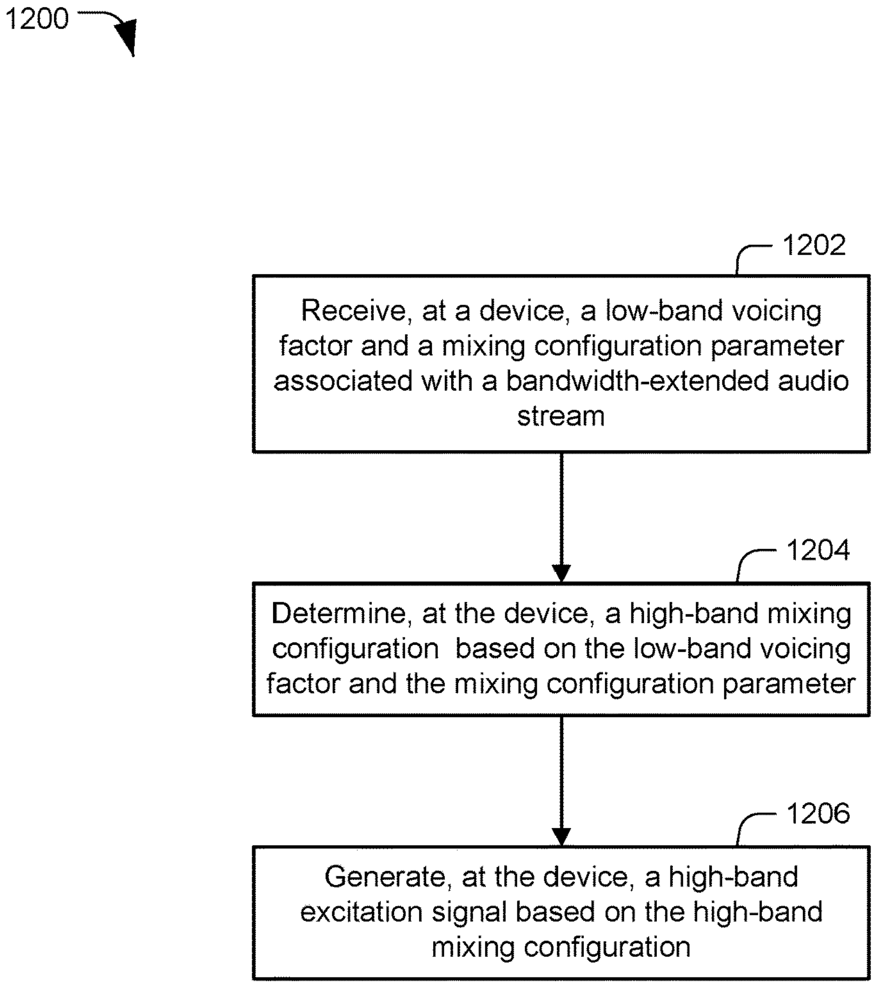
FIG. 12 is a flowchart to illustrate another aspect of a method of high band signal generation.

Referring to FIG. 12, a flowchart of an aspect of a method of high band signal generation is shown and generally designated 1200. The method 1200 may be performed by one or more components of the systems 100-400 of FIGS. 1-4. For example, the method 1200 may be performed by the second device 104, the receiver 192, the HB excitation signal generator 147 of FIG. 1, or a combination thereof.

The method 1200 includes receiving, at a device, a low-band voicing factor and a mixing configuration parameter associated with a bandwidth-extended audio stream, at 1202. For example, the receiver 192 may receive the LB VF 154 and the mix configuration mode 368 associated with the audio data 126, as described with reference to FIG. 1.

The method 1200 also includes determining, at the device, a high-band voicing factor based on the low-band voicing factor and the mixing configuration parameter, at 1204. For example, the HB excitation estimator 414 may determine a HB VF based on the LB VF 154 and the mix configuration mode 368, as described with reference to FIG. 4. In an illustrative aspect, the HB excitation estimator 414 may determine the HB VF based on application of a sigmoid function to the LB VF 154.

The method 1200 further includes generating, at the device, a high-band excitation signal based on the high-band mixing configuration, at 1206. For example, the HB excitation estimator 414 may generate the HB excitation signal 152 based on the HB VF, as described with reference to FIG. 4.

Figure 13:
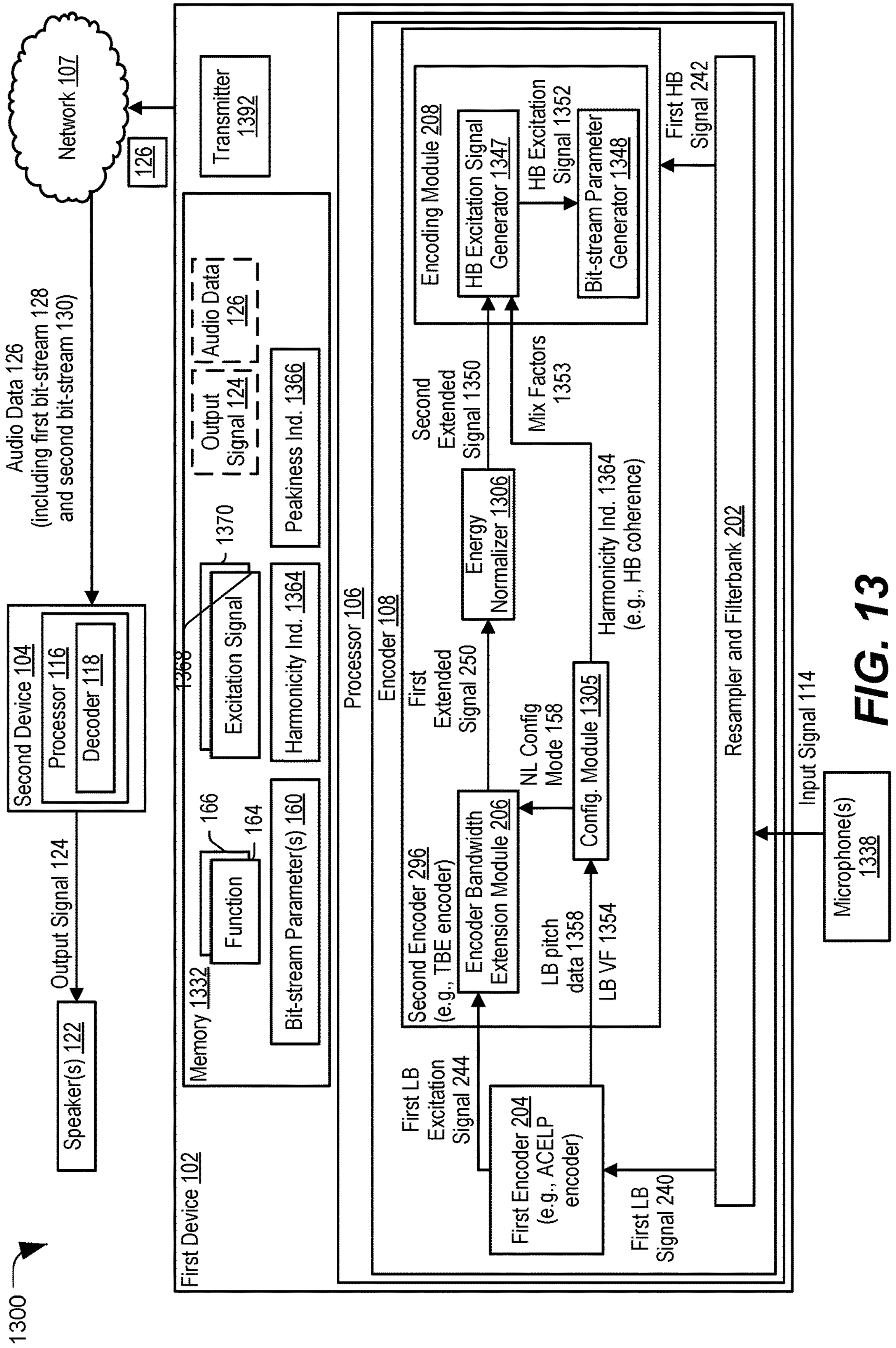
FIG. 13 is a diagram of another aspect of a system that includes devices that are operable to generate a high-band signal.

Referring to FIG. 13, a particular illustrative aspect of a system that includes devices that are operable to generate a high-band signal is disclosed and generally designated 1300.

The system 1300 includes the first device 102 in communication, via the network 107, with the second device 104. The first device 102 may include the processor 106, a memory 1332, or both. The processor 106 may be coupled to or may include the encoder 108, the resampler and filterbank 202, or both. The encoder 108 may include the first encoder 204 (e.g., an ACELP encoder) and the second encoder 296 (e.g., a TBE encoder). The second encoder 296 may include the encoder bandwidth extension module 206, the encoding module 208, or both. The encoding module 208 may include a high-band (HB) excitation signal generator 1347, a bit-stream parameter generator 1348, or both. The second encoder 296 may further include a configuration module 1305, an energy normalizer 1306, or both. The resampler and filterbank 202 may be coupled to the first encoder 204, the second encoder 296, one or more microphones 1338, or a combination thereof.

The memory 1332 may be configured to store instructions to perform one or more functions (e.g., the first function 164, the second function 166, or both). The first function 164 may include a first non-linear function (e.g., a square function) and the second function 166 may include a second non-linear function (e.g., an absolute value function) that is distinct from the first non-linear function. Alternatively, such functions may be implemented using hardware (e.g., circuitry) at the first device 102. The memory 1332 may be configured to store one or more signals (e.g., a first excitation signal 1368, a second excitation signal 1370, or both).

The first device 102 may further include a transmitter 1392. In a particular implementation, the transmitter 1392 may be included in a transceiver.

During operation, the first device 102 may receive (or generate) an input signal 114. For example, the resampler and filterbank 202 may receive the input signal 114 via the microphones 1338. The resampler and filterbank 202 may generate the first LB signal 240 by applying a low-pass filter to the input signal 114 and may provide the first LB signal 240 to the first encoder 204. The resampler and filterbank 202 may generate the first HB signal 242 by applying a high-pass filter to the input signal 114 and may provide the first HB signal 242 to the second encoder 296.

The first encoder 204 may generate the first LB excitation signal 244 (e.g., an LB residual), the first bit-stream 128, or both, based on the first LB signal 240. The first bit-stream 128 may include LB parameter information (e.g., LPC coefficients, LSFs, or both). The first encoder 204 may provide the first LB excitation signal 244 to the encoder bandwidth extension module 206. The first encoder 204 may provide the first bit-stream 128 to the first decoder 134 of FIG. 1. In a particular aspect, the first encoder 204 may store the first bit-stream 128 in the memory 1332. The audio data 126 may include the first bit-stream 128.

The first encoder 204 may determine a LB voicing factor (VF) 1354 (e.g., a value from 0.0 to 1.0) based on the LB parameter information. The LB VF 1354 may indicate a voiced/unvoiced nature (e.g., strongly voiced, weakly voiced, weakly unvoiced, or strongly unvoiced) of the first LB signal 240. The first encoder 204 may provide the LB VF 1354 to the configuration module 1305. The first encoder 204 may determine an LB pitch based on the first LB signal 240. The first encoder 204 may provide LB pitch data 1358 indicating the LB pitch to the configuration module 1305.

The configuration module 1305 may generate estimated mix factors (e.g., mix factors 1353), a harmonicity indicator 1364 (e.g., indicating a high band coherence), a peakiness indicator 1366, the NL configuration mode 158, or a combination thereof, as described with reference to FIG. 14. The configuration module 1305 may provide the NL configuration mode 158 to the encoder bandwidth extension module 206. The configuration module 1305 may provide the harmonicity indicator 1364, the mix factors 1353, or both, to the HB excitation signal generator 1347.

The encoder bandwidth extension module 206 may generate the first extended signal 250 based on the first LB excitation signal 244, the NL configuration mode 158, or both, as described with reference to FIG. 17. The encoder bandwidth extension module 206 may provide the first extended signal 250 to the energy normalizer 1306. The energy normalizer 1306 may generate a second extended signal 1350 based on the first extended signal 250, as described with reference to FIG. 19.

The energy normalizer 1306 may provide the second extended signal 1350 to the encoding module 208. The HB excitation signal generator 1347 may generate an HB excitation signal 1352 based on the second extended signal 1350, as described with reference to FIG. 17. The bit-stream parameter generator 1348 may generate the bit-stream parameters 160 to reduce a difference between the HB excitation signal 1352 and the first HB signal 242. The encoding module 208 may generate the second bit-stream 130 including the bit-stream parameters 160, the NL configuration mode 158, or both. The audio data 126 may include the first bit-stream 128, the second bit-stream 130, or both. The first device 102 may transmit the audio data 126, via the transmitter 1392, to the second device 104. The second device 104 may generate the output signal 124 based on the audio data 126, as described with reference to FIG. 1.

Figure 14:
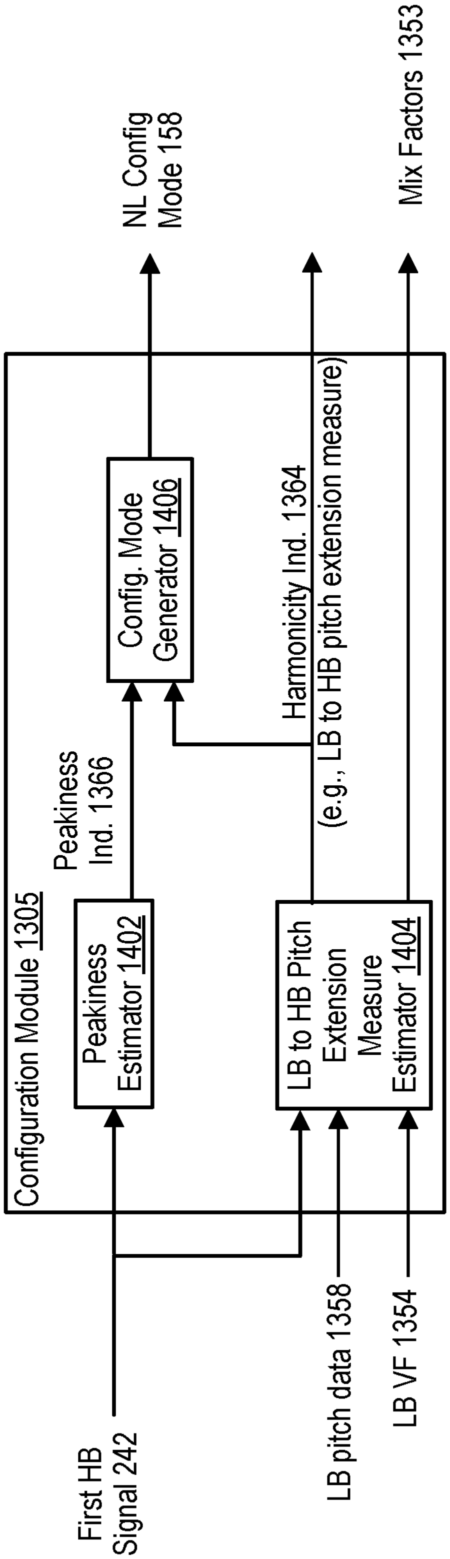
FIG. 14 is a diagram of components of the system of FIG. 13.

Referring to FIG. 14, a diagram of an illustrative aspect of the configuration module 305 is depicted. The configuration module 1305 may include a peakiness estimator 1402, a LB to HB pitch extension measure estimator 1404, a configuration mode generator 1406, or a combination thereof.

The configuration module 1305 may generate a particular HB excitation signal (e.g., an HB residual) associated with the first HB signal 242. The peakiness estimator 1402 may determine the peakiness indicator 1366 based on the first HB signal 242 or the particular HB excitation signal. The peakiness indicator 1366 may correspond to a peak-to-average energy ratio associated with the first HB signal 242 or the particular HB excitation signal. The peakiness indicator 1366 may thus indicate a level of temporal peakiness of the first HB signal 242. The peakiness estimator 1402 may provide the peakiness indicator 1366 to the configuration mode generator 1406. The peakiness estimator 1402 may also store the peakiness indicator 1366 in the memory 1332 of FIG. 13.

The LB to HB pitch extension measure estimator 1404 may determine the harmonicity indicator 1364 (e.g., a LB to HB pitch extension measure) based on the first HB signal 242 or the particular HB excitation signal, as described with reference to FIG. 15. The harmonicity indicator 1364 may indicate a voicing strength of the first HB signal 242 (or the particular HB excitation signal). The LB to HB pitch extension measure estimator 1404 may determine the harmonicity indicator 1364 based on the LB pitch data 1358. For example, the LB to HB pitch extension measure estimator 1404 may determine a pitch lag based on a LB pitch indicated by the LB pitch data 1358 and may determine auto-correlation coefficients corresponding to the first HB signal 242 (or the particular HB excitation signal) based on the pitch lag. The harmonicity indicator 1364 may indicate a particular (e.g., maximum) value of the auto-correlation coefficients. The harmonicity indicator 1364 may thus be distinguished from an indicator of tonal harmonicity. The LB to HB pitch extension measure estimator 1404 may provide the harmonicity indicator 1364 to the configuration mode generator 1406. The LB to HB pitch extension measure estimator 1404 may also store the harmonicity indicator 1364 in the memory 1332 of FIG. 13.

The LB to HB pitch extension measure estimator 1404 may determine the mix factors 1353 based on the LB VF 1354. For example, the HB excitation estimator 414 may determine a HB VF based on the LB VF 1354. The HB VF may correspond to a HB mixing configuration. In a particular aspect, the LB to HB pitch extension measure estimator 1404 determines the HB VF based on application of a sigmoid function to the LB VF 1354. For example, the LB to HB pitch extension measure estimator 1404 may determine the HB VF based on Equation 7, as described with reference to FIG. 4, where $VF_i$ may correspond to a HB VF corresponding to a sub-frame i, and $\alpha_i$ may correspond to a normalized correlation from the LB. In a particular aspect, $\alpha_i$ of Equation 7 may correspond to the LB VF 1354 for the sub-frame i. The LB to HB pitch extension measure estimator 1404 may determine a first weight (e.g., HB VF) and a second weight (e.g., 1−HB VF). The mix factors 1353 may indicate the first weight and the second weight. The LB to HB pitch extension measure estimator 1404 may also store the mix factors 1353 in the memory 1332 of FIG. 13.

The configuration mode generator 1406 may generate the NL configuration mode 158 based on the peakiness indicator 1366, the harmonicity indicator 1364, or both. For example, the configuration mode generator 1406 may generate the NL configuration mode 158 based on the harmonicity indicator 1364, as described with reference to FIG. 16.

In a particular implementation, the configuration mode generator 1406 may generate the NL configuration mode 158 having a first value (e.g., NL_HARMONIC or 0) in response to determining that the harmonicity indicator 1364 satisfies a first threshold, that the peakiness indicator 1366 satisfies a second threshold, or both. The configuration mode generator 1406 may generate the NL configuration mode 158 having a second value (e.g., NL_SMOOTH or 1) in response to determining that the harmonicity indicator 1364 fails to satisfy the first threshold, that the peakiness indicator 1366 fails to satisfy the second threshold, or both. The configuration mode generator 1406 may generate the NL configuration mode 158 having a third value (e.g., NL_HYBRID or 2) in response to determining that the harmonicity indicator 1364 fails to satisfy the first threshold and that the peakiness indicator 1366 satisfies the second threshold. In another aspect, the configuration mode generator 1406 may generate the NL configuration mode 158 having the third value (e.g., NL_HYBRID or 2) in response to determining that the harmonicity indicator 1364 satisfies the first threshold and that the peakiness indicator 1366 fails to satisfy the second threshold.

In a particular implementation, the configuration module 1305 may generate the NL configuration mode 158 having the second value (e.g., NL_SMOOTH or 1) and the mix configuration mode 368 of FIG. 3 having a particular value (e.g., a value greater than 1) in response to determining that the harmonicity indicator 1364 fails to satisfy the first threshold, that the peakiness indicator 1366 fails to satisfy the second threshold, or both. The configuration module 1305 may generate the NL configuration mode 158 having the second value (e.g., NL_SMOOTH or 1) and the mix configuration mode 368 having another particular value (e.g., a value less than or equal to 1) in response to determining that one of the harmonicity indicator 1364 and the peakiness indicator 1366 satisfies a corresponding threshold and the other of the harmonicity indicator 1364 and the peakiness indicator 1366 fails to satisfy a corresponding threshold. The configuration mode generator 1406 may also store the NL configuration mode 158 in the memory 1332 of FIG. 13.

Advantageously, determining the NL configuration mode 158 based on high band parameters (e.g., the peakiness indicator 1366, the harmonicity indicator 1364, or both) may be robust to cases where there is little (e.g., no) correlation between the first LB signal 240 and the first HB signal 242. For example, the high-band signal 142 may approximate the first HB signal 242 when the NL configuration mode 158 is determined based on the high band parameters.

Figure 15:
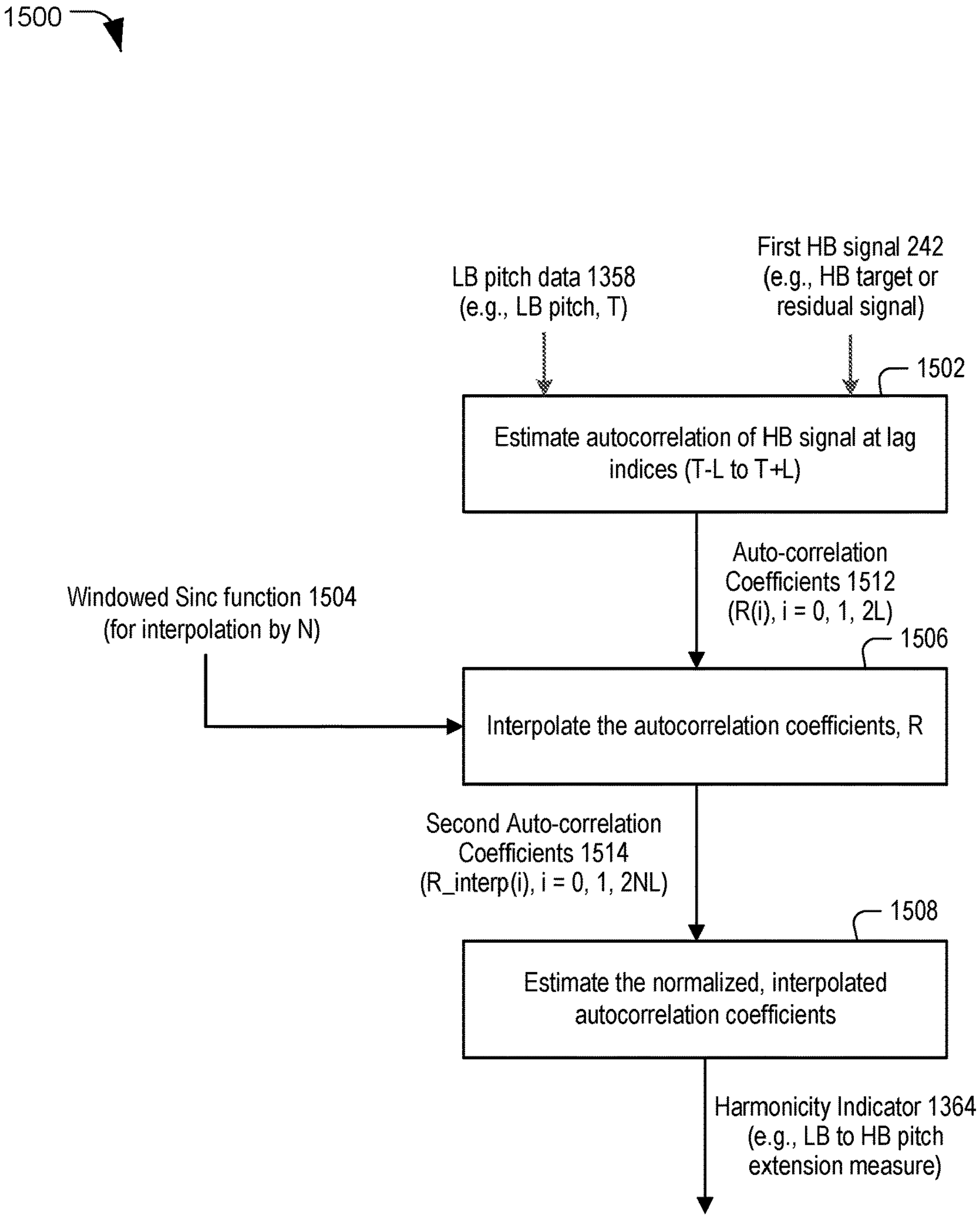
FIG. 15 is a diagram to illustrate another aspect of a method of high-band signal generation.

Referring to FIG. 15, a diagram of an illustrative aspect of a method of high band signal generation is shown and generally designated 1500. The method 1500 may be performed by one or more components of the systems 100-200, 1300-1400 of FIGS. 1-2, 13-14. For example, the method 1500 may be performed by the first device 102, the processor 106, the encoder 108 of FIG. 1, the second encoder 296 of FIG. 2, the configuration module 1305 of FIG. 13, the LB to HB pitch extension measure estimator 1404 of FIG. 14, or a combination thereof.

The method 1500 may include estimating an auto-correlation of a HB signal at lag indices (T−L to T+L), at 1502. For example, the configuration module 1305 of FIG. 13 may generate a particular HB excitation signal (e.g., an HB residual signal) based on the first HB signal 242. The LB to HB pitch extension measure estimator 1404 of FIG. 14 may generate an auto-correlation signal (e.g., auto-correlation coefficients 1512) based on the first HB signal 242 or the particular HB excitation signal. The LB to HB pitch extension measure estimator 1404 may generate the auto-correlation coefficients 1512 (R) based on lag indices within a threshold distance (e.g., T−L to T+L) of an LB pitch (T) indicated by the LB pitch data 1358. The auto-correlation coefficients 1512 may include a first number (e.g., 2L) of coefficients.

The method 1500 may also include interpolating the auto-correlation coefficients (R), at 1506. For example, the LB to HB pitch extension measure estimator 1404 of FIG. 14 may generate second auto-correlation coefficients 1514 (R_interp) by applying a windowed sinc function 1504 to the auto-correlation coefficients 1512 (R). The windowed sinc function 1504 may correspond to a scaling factor (e.g., N). The second auto-correlation coefficients 1514 (R_interp) may include a second number (e.g., 2LN) of coefficients.

The method 1500 includes estimating normalized, interpolated auto-correlation coefficients, at 1508. For example, the LB to HB pitch extension measure estimator 1404 may determine a second auto-correlation signal (e.g., normalized auto-correlation coefficients) by normalizing the second auto-correlation coefficients 1514 (R_interp). The LB to HB pitch extension measure estimator 1404 may determine the harmonicity indicator 1364 based on a particular (e.g., maximum) value of the second auto-correlation signal (e.g., the normalized auto-correlation coefficients). The harmonicity indicator 1364 may indicate a strength of a repetitive pitch component in the first HB signal 242. The harmonicity indicator 1364 may indicate a relative coherence associated with the first HB signal 242. The harmonicity indicator 1364 may indicate an LB pitch to HB pitch extension measure.

Figure 16:
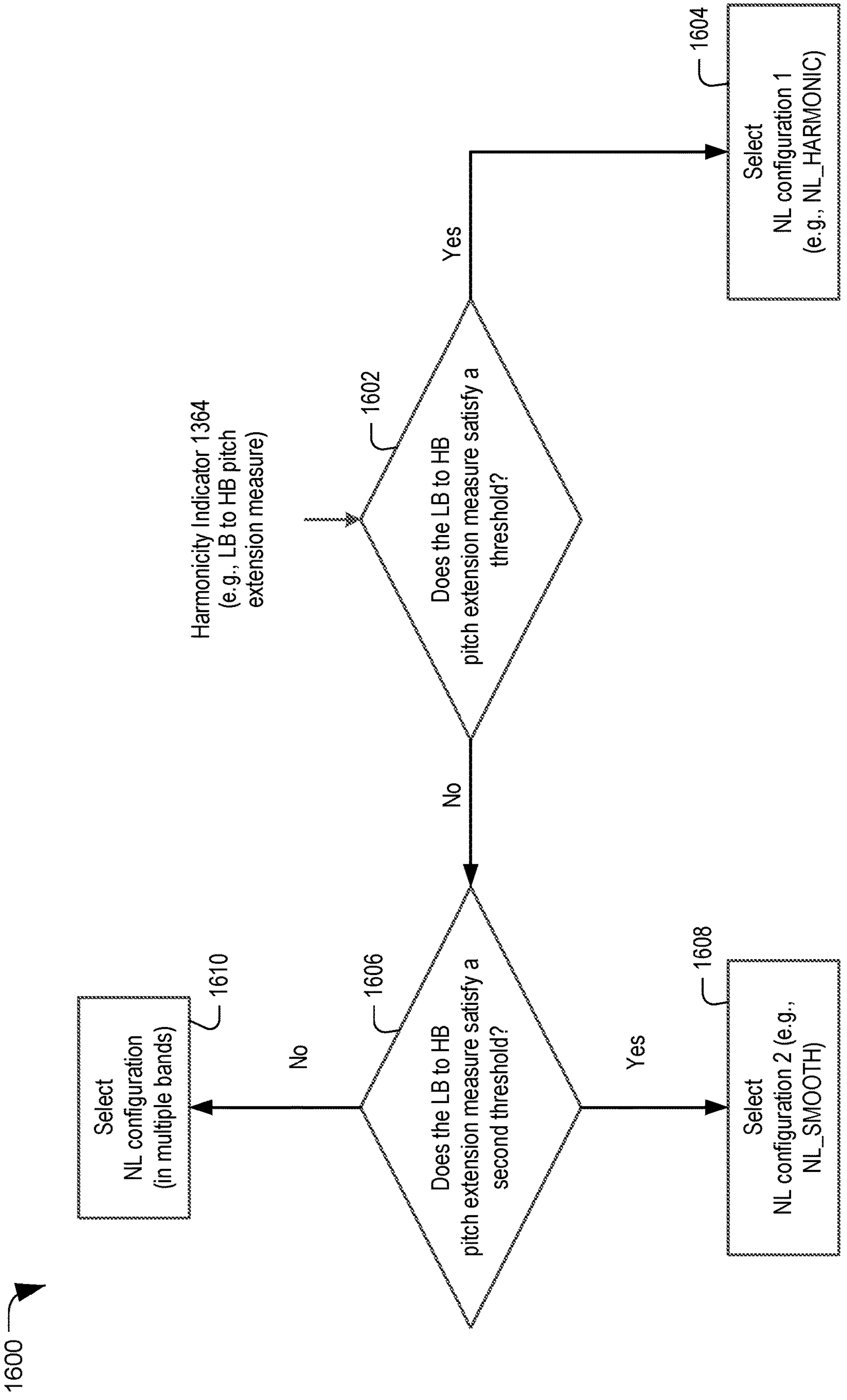
FIG. 16 is a diagram to illustrate another aspect of a method of high-band signal generation.

Referring to FIG. 16, a diagram of an illustrative aspect of a method of high band signal generation is shown and generally designated 1600. The method 1600 may be performed by one or more components of the systems 100-200, 1300-1400 of FIGS. 1-2, 13-14. For example, the method 1600 may be performed by the first device 102, the processor 106, the encoder 108 of FIG. 1, the second encoder 296 of FIG. 2, the configuration module 1305 of FIG. 13, the configuration mode generator 1406 of FIG. 14, or a combination thereof.

The method 1600 includes determining whether an LB to HB pitch extension measure satisfies a threshold, at 1602. For example, the configuration mode generator 1406 of FIG. 14 may determine whether the harmonicity indicator 1364 (e.g., an LB to HB pitch extension measure) satisfies a first threshold.

The method 1600 includes, in response to determining that the LB to HB pitch extension measure satisfies the threshold, at 1602, selecting a first NL configuration mode, at 1604. For example, the configuration mode generator 1406 of FIG. 14 may, in response to determining that the harmonicity indicator 1364 satisfies the first threshold, generate the NL configuration mode 158 having a first value (e.g., NL_HARMONIC or 0).

Alternatively, in response to determining that the LB to HB pitch extension measure fails to satisfy the threshold, at 1602, the method 1600 determining whether the LB to HB pitch extension measure fails to satisfy a second threshold, at 1606. For example, the configuration mode generator 1406 of FIG. 14 may, in response to determining that the harmonicity indicator 1364 fails to satisfy the first threshold, determine whether the harmonicity indicator 1364 satisfies a second threshold.

The method 1600 includes, in response to determining that the LB to HB pitch extension measure satisfies the second threshold, at 1606, selecting a second NL configuration mode, at 1608. For example, the configuration mode generator 1406 of FIG. 14 may, in response to determining that the harmonicity indicator 1364 satisfies the second threshold, generate the NL configuration mode 158 having a second value (e.g., NL_SMOOTH or 1).

In response to determining that the LB to HB pitch extension measure fails to satisfy the second threshold, at 1606, the method 1600 includes selecting a third NL configuration mode, at 1610. For example, the configuration mode generator 1406 of FIG. 14 may, in response to determining that the harmonicity indicator 1364 fails to satisfy the second threshold, generate the NL configuration mode 158 having a third value (e.g., NL_HYBRID or 2).

Figure 17:
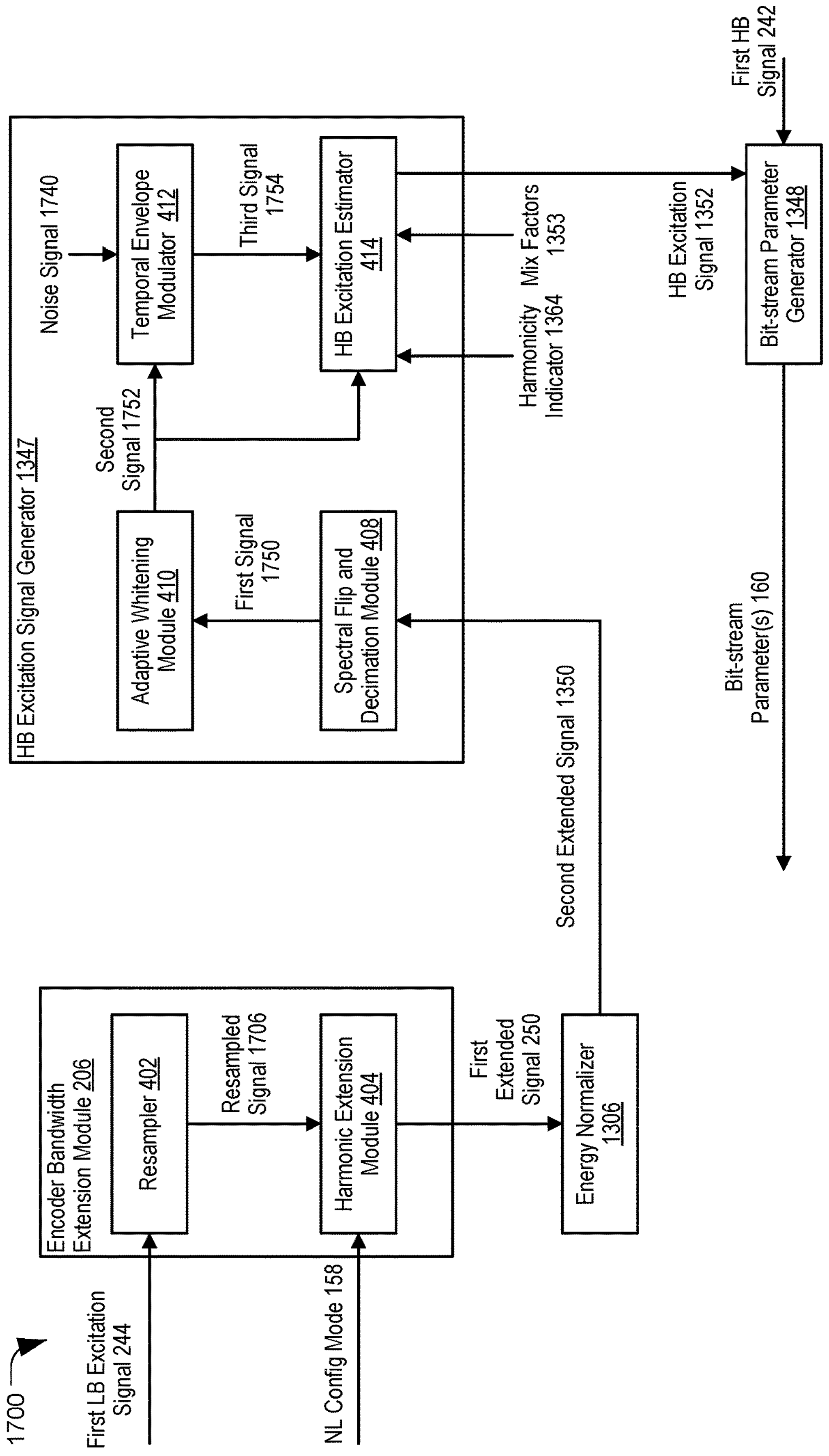
FIG. 17 is a diagram of components of the system of FIG. 13.

Referring to FIG. 17, a system is disclosed and generally designated 1700. In a particular aspect, the system 1700 may correspond to the system 100 of FIG. 1, the system 200 of FIG. 2, the system 1300 of FIG. 13, or a combination thereof. The system 1700 may include the encoder bandwidth extension module 206, the energy normalizer 1306, the HB excitation signal generator 1347, the bit-stream parameter generator 1348, or a combination thereof. The encoder bandwidth extension module 206 may include the resampler 402, the harmonic extension module 404, or both. The HB excitation signal generator 1347 may include the spectral flip and decimation module 408, the adaptive whitening module 410, the temporal envelope modulator 412, the HB excitation estimator 414, or a combination thereof.

During operation, the encoder bandwidth extension module 206 may generate the first extended signal 250 by extending the first LB excitation signal 244, as described herein. The resampler 402 may receive the first LB excitation signal 244 from the first encoder 204 of FIGS. 2 and 13. The resampler 402 may generate a resampled signal 1706 based on the first LB excitation signal 244, as described with reference to FIG. 5. The resampler 402 may provide the resampled signal 1706 to the harmonic extension module 404.

The harmonic extension module 404 may generate the first extended signal 250 (e.g., an HB excitation signal) by harmonically extending the resampled signal 1706 in a time-domain based on the NL configuration mode 158, as described with reference to FIG. 4. The NL configuration mode 158 may be generated by the configuration module 1305, as described with reference to FIG. 14. For example, the harmonic extension module 404 may select the first function 164, the second function 166, or a hybrid function based on a value of the NL configuration mode 158. The hybrid function may include a combination of multiple functions (e.g., the first function 164 and the second function 166). The harmonic extension module 404 may generate the first extended signal 250 based on the selected function (e.g., the first function 164, the second function 166, or the hybrid function).

The harmonic extension module 404 may provide the first extended signal 150 to the energy normalizer 1306. The energy normalizer 1306 may generate the second extended signal 1350 based on the first extended signal 250, as described with reference to FIG. 19. The energy normalizer 1306 may provide the second extended signal 1350 to the spectral flip and decimation module 408.

The spectral flip and decimation module 408 may generate a spectrally flipped signal by performing spectral flipping of the second extended signal 1350 in the time-domain, as described with reference to FIG. 4. The spectral flip and decimation module 408 may generate a first signal 1750 (e.g., a HB excitation signal) by decimating the spectrally flipped signal based on a first all-pass filter and a second all-pass filter, as described with reference to FIG. 4.

The spectral flip and decimation module 408 may provide the first signal 1750 to the adaptive whitening module 410. The adaptive whitening module 410 may generate a second signal 1752 (e.g., an HB excitation signal) by flattening a spectrum of the first signal 1750 by performing fourth-order LP whitening of the first signal 1750, as described with reference to FIG. 4. The adaptive whitening module 410 may provide the second signal 452 to the temporal envelope modulator 412, the HB excitation estimator 414, or both.

The temporal envelope modulator 412 may receive the second signal 1752 from the adaptive whitening module 410, a noise signal 1740 from a random noise generator, or both. The random noise generator may be coupled to or may be included in the first device 102. The temporal envelope modulator 412 may generate a third signal 1754 based on the noise signal 1740, the second signal 1752, or both. For example, the temporal envelope modulator 412 may generate a first noise signal by applying temporal shaping to the noise signal 1740. The temporal envelope modulator 412 may generate a signal envelope based on the second signal 1752 (or the first LB excitation signal 244). The temporal envelope modulator 412 may generate the first noise signal based on the signal envelope and the noise signal 1740. For example, the temporal envelope modulator 412 may combine the signal envelope and the noise signal 1740. Combining the signal envelope and the noise signal 1740 may modulate amplitude of the noise signal 1740. The temporal envelope modulator 412 may generate the third signal 1754 by applying spectral shaping to the first noise signal. In an alternate implementation, the temporal envelope modulator 412 may generate the first noise signal by applying spectral shaping to the noise signal 1740 and may generate the third signal 1754 by applying temporal shaping to the first noise signal. Thus, spectral and temporal shaping may be applied in any order to the noise signal 1740. The temporal envelope modulator 412 may provide the third signal 1754 to the HB excitation estimator 414.

The HB excitation estimator 414 may receive the second signal 1752 from the adaptive whitening module 410, the third signal 1754 from the temporal envelope modulator 412, the harmonicity indicator 1364, the mix factors 1353 from the configuration module 1305, or a combination thereof. The HB excitation estimator 414 may generate the HB excitation signal 1352 by combining the second signal 1752 and the third signal 1754 based on the harmonicity indicator 1364, the mix factors 1353, or both.

The mix factors 1353 may indicate a HB VF, as described with reference to FIG. 14. For example, the mix factors 1353 may indicate a first weight (e.g., HB VF) and a second weight (e.g., 1−HB VF). The HB excitation estimator 414 may adjust the mix factors 1353 based on the harmonicity indicator 1364, as described with reference to FIG. 18. The HB excitation estimator 414 may power normalize the third signal 1754 so that the third signal 1754 has the same power level as the second signal 1752.

The HB excitation estimator 414 may generate the HB excitation signal 1352 by performing a weighted sum of the second signal 1752 and the third signal 1754 based on the adjusted mix factors 1353, where the first weight is assigned to the second signal 1752 and the second weight is assigned to the third signal 1754. For example, the HB excitation estimator 414 may generate sub-frame (i) of the HB excitation signal 1352 by mixing sub-frame (i) of the second signal 1752 that is scaled based on $VF_i$ of Equation 7 (e.g., scaled based on a square root of $VF_i$) and sub-frame (i) of the third signal 1754 that is scaled based on $(1-VF_i)$ of Equation 7 (e.g., scaled based on a square root of $(1-VF_i)$). The HB excitation estimator 414 may provide the HB excitation signal 1352 to the bit-stream parameter generator 1348.

The bit-stream parameter generator 1348 may generate the bit-stream parameters 160. For example, the bit-stream parameters 160 may include the mix configuration mode 368. The mix configuration mode 368 may correspond to the mix factors 1353 (e.g., the adjusted mix factors 1353). As another example, the bit-stream parameters 160 may include the NL configuration mode 158, the filter information 374, the HB LSF data 364, or a combination thereof. The filter information 374 may include an index generated by the energy normalizer 1306, as further described with reference to FIG. 19. The HB LSF data 364 may correspond to a quantized filter (e.g., quantized LSFs) generated by the energy normalizer 1306, as further described with reference to FIG. 19.

The bit-stream parameter generator 1348 may generate target gain information (e.g., the HB target gain data 370, the gain shape data 372, or both) based on a comparison of the HB excitation signal 1352 and the first HB signal 242. The bit-stream parameter generator 1348 may update the target gain information based on the harmonicity indicator 1364, the peakiness indicator 1366, or both. For example, the bit-stream parameter generator 1348 may reduce an HB gain frame indicated by the target gain information when the harmonicity indicator 1364 indicates a strong harmonic component, the peakiness indicator 1366 indicates a high peakiness, or both. To illustrate, the bit-stream parameter generator 1348 may, in response to determining that the peakiness indicator 1366 satisfies a first threshold and the harmonicity indicator 1364 satisfies a second threshold, reduce the HB gain frame indicated by the target gain information.

The bit-stream parameter generator 1348 may update the target gain information to modify a gain shape of a particular sub-frame when the peakiness indicator 1366 indicates spikes of energy in the first HB signal 242. The peakiness indicator 1366 may include sub-frame peakiness values. For example, the peakiness indicator 1366 may indicate a peakiness value of the particular sub-frame. The sub-frame peakiness values may be "smoothed" to determine whether the first HB signal 242 corresponds to a harmonic HB, a non-harmonic HB, or a HB with one or more spikes. For example, the bit-stream parameter generator 1348 may perform smoothing by applying an approximating function (e.g., a moving average) to the peakiness indicator 1366. Additionally, or alternatively, the bit-stream parameter generator 1348 may update the target gain information to modify (e.g., attenuate) a gain shape of the particular sub-frame. The bit-stream parameters 160 may include the target gain information.

Figure 18:
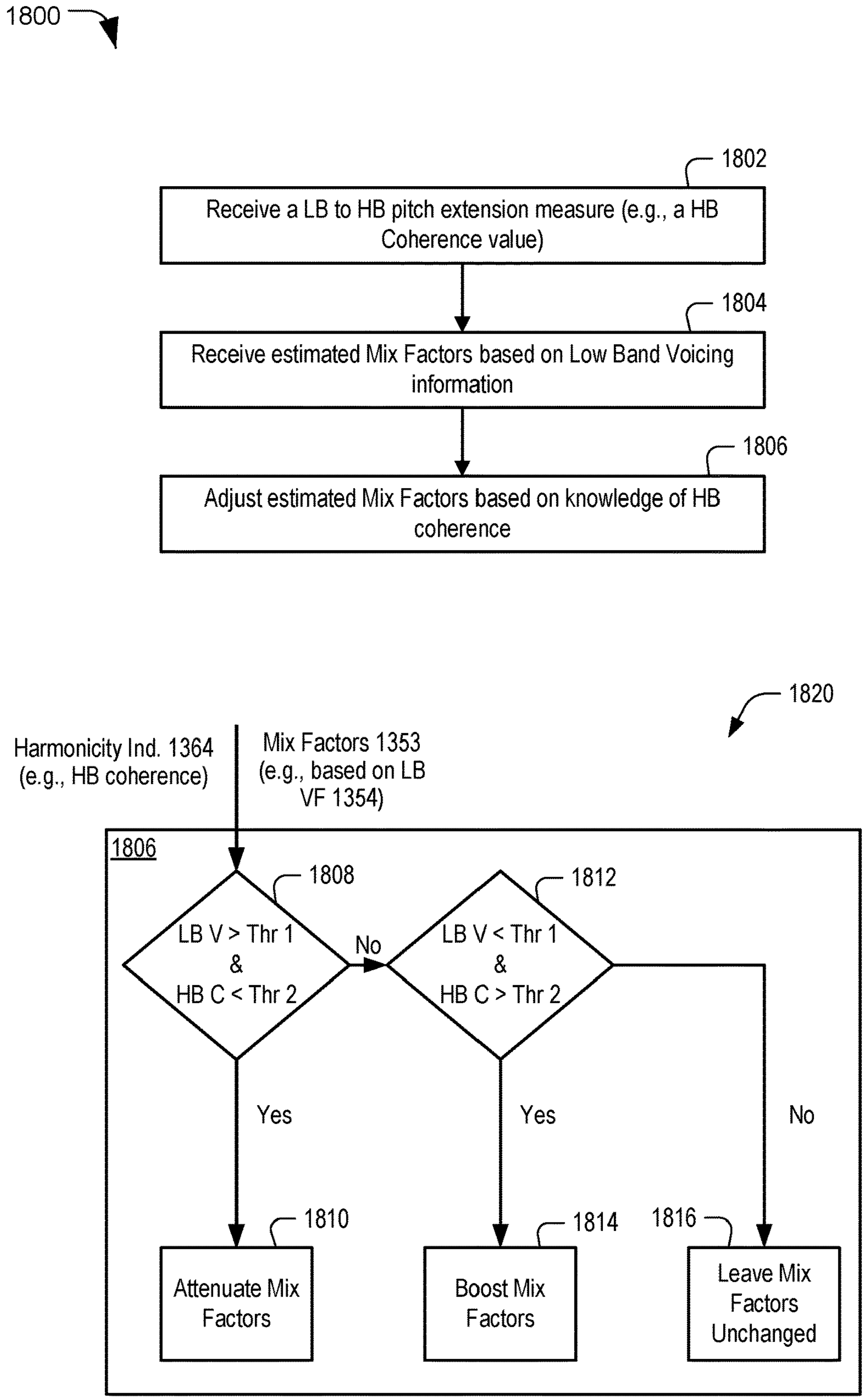
FIG. 18 is a diagram to illustrate another aspect of a method of high-band signal generation.

Referring to FIG. 18, a diagram of an illustrative aspect of a method of high band signal generation is shown and generally designated 1800. The method 1800 may be performed by one or more components of the systems 100-200, 1300-1400 of FIGS. 1-2, 13-14. For example, the method 1800 may be performed by the first device 102, the processor 106, the encoder 108 of FIG. 1, the second encoder 296 of FIG. 2, the HB excitation signal generator 1347 of FIG. 13, the LB to HB pitch extension measure estimator 1404 of FIG. 14, or a combination thereof.

The method 1800 includes receiving a LB to HB pitch extension measure, at 1802. For example, the HB excitation estimator 414 may receive the harmonicity indicator 1364 (e.g., a HB coherence value) from the configuration module 1305, as described with reference to FIGS. 13-14 and 17.

The method 1800 also includes receiving estimated mix factors based on low band voicing information, at 1804. For example, the HB excitation estimator 414 may receive the mix factors 1353 from the configuration module 1305, as described with reference to FIGS. 13-14 and 17. The mix factors 1353 may be based on the LB VF 1354, as described with reference to FIG. 14.

The method 1800 further includes adjusting estimated mix factors based on knowledge of HB coherence (e.g., the LB to HB pitch extension measure), at 1806. For example, the HB excitation estimator 414 may adjust the mix factors 1353 based on the harmonicity indicator 1364, as described with reference to FIG. 17.

FIG. 18 also includes a diagram of an illustrative aspect of a method of adjusting estimated mix factors that is generally designated 1820. The method 1820 may correspond to the step 1806 of the method 1800.

The method 1820 includes determining whether a LB VF is greater than a first threshold and HB coherence is less than a second threshold, at 1808. For example, the HB excitation estimator 414 may determine whether the LB VF 1354 is greater than a first threshold and the harmonicity indicator 1364 is less than a second threshold. In a particular aspect, the mix factors 1353 may indicate the LB VF 1354.

The method 1820 includes, in response to determining that the LB VF is greater than the first threshold and that the HB coherence is less than the second threshold, at 1808, attenuating mix factors, at 1810. For example, the HB excitation estimator 414 may attenuate the mix factors 1353 in response to determining that the LB VF 1354 is greater than the first threshold and that the harmonicity indicator 1364 fails to satisfy is less than the second threshold.

The method 1820 includes, in response to determining that the LB VF is less than or equal to the first threshold or that the HB coherence is greater than or equal to the second threshold, at 1808, determining whether the LB VF is less than the first threshold and that the HB coherence is less than the second threshold, at 1812. For example, the HB excitation estimator 414 may, in response to determining that the LB VF 1354 is less than or equal to the first threshold or that the harmonicity indicator 1364 is greater than or equal to the second threshold, determine whether the LB VF 1354 is less than the first threshold and that the harmonicity indicator 1364 is greater than the second threshold.

The method 1820 includes, in response to determining that the LB VF is less than the first threshold and that the HB coherence is less than the second threshold, at 1812, boosting mix factors, at 1814. For example, the HB excitation estimator 414 may, in response to determining that the LB VF 1354 is less than the first threshold and that the harmonicity indicator 1364 is greater than the second threshold, boost the mix factors 1353.

The method 1820 includes, in response to determining that the LB VF is greater than or equal to the first threshold or that the HB coherence is greater than or equal to the second threshold, at 1812, leaving mix factors unchanged, at 1816. For example, the HB excitation estimator 414 may, in response to determining that the LB VF 1354 is greater than or equal to the first threshold or that the harmonicity indicator 1364 is less than or equal to the second threshold, leave the mix factors 1353 unchanged. To illustrate, the HB excitation estimator 414 may leave the mix factors 1353 unchanged in response to determining that the LB VF 1354 is equal to the first threshold, that the harmonicity indicator 1364 is equal to the second threshold, that the LB VF 1354 is less than the first threshold and the harmonicity indicator 1364 is less than the second threshold, or that the LB VF 1354 is greater than the first threshold and the harmonicity indicator 1364 is greater than the second threshold.

The HB excitation estimator 414 may adjust the mix factors 1353 based on the harmonicity indicator 1364, the LB VF 1354, or both. The mix factors 1353 may indicate the HB VF, as described with reference to FIG. 14. The HB excitation estimator 414 may reduce (or increase) variations in the HB VF based on the harmonicity indicator 1364, the LB VF 1354, or both. Modifying the HB VF based on the harmonicity indicator 1364 and the LB VF 1354 may compensate for a mismatch between the LB VF 1354 and the HB VF.

Lower frequencies of voiced speech signals may generally exhibit a stronger harmonic structure than higher frequencies. An output (e.g., the extended signal 150 of FIG. 1) of non-linear modeling may sometimes over-emphasize harmonics in a high-band portion and may lead to unnatural buzzy-sounding artifacts. Attenuating the mix factors may produce a pleasant sounding high-band signal (e.g., the high-band signal 142 of FIG. 1).

Figure 19:
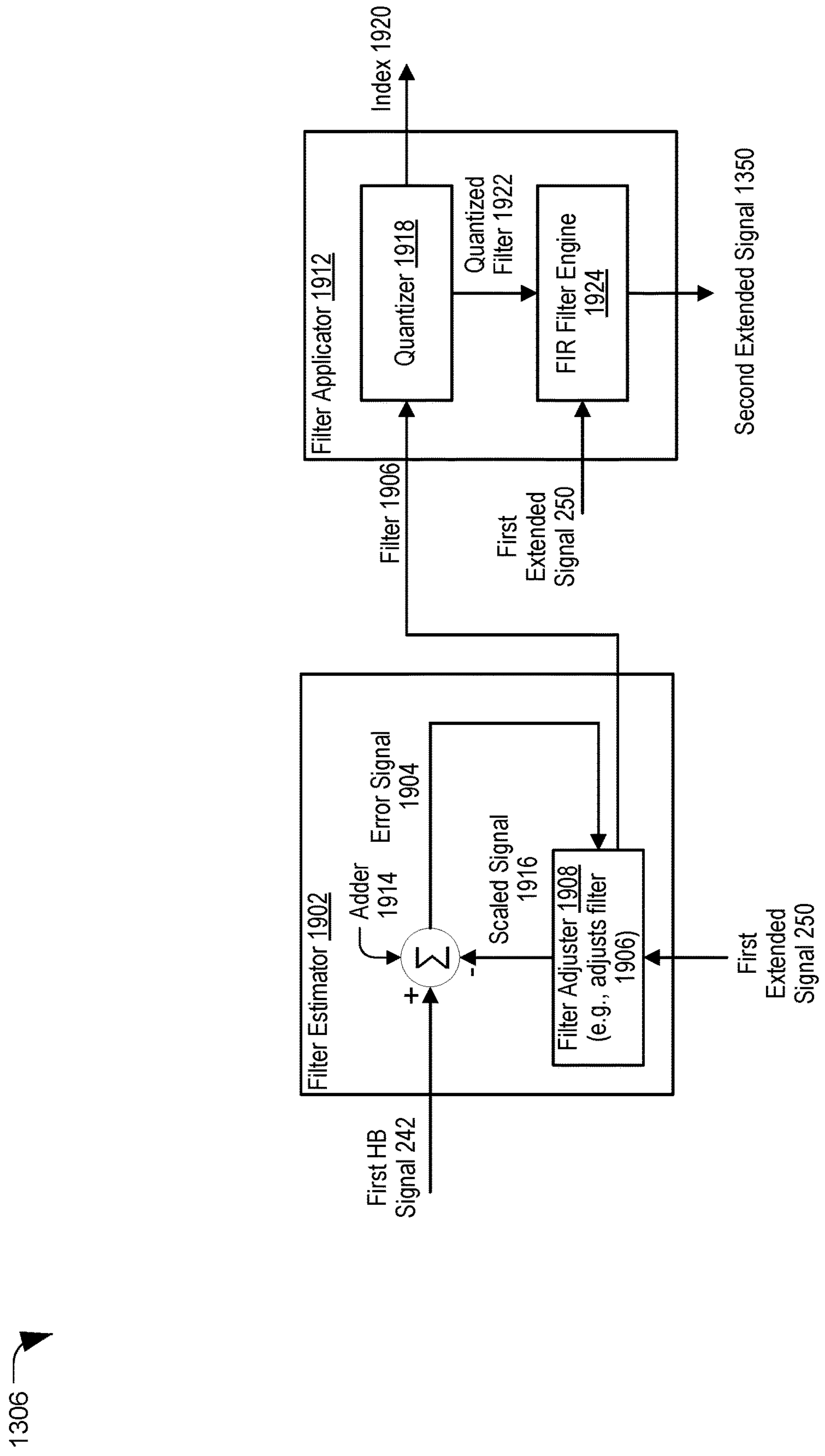
FIG. 19 is a diagram of components of the system of FIG. 13.

Referring to FIG. 19, a diagram of an illustrative aspect of the energy normalizer 1306 is depicted. The energy normalizer 1306 may include a filter estimator 1902, a filter applicator 1912, or both.

The filter estimator 1902 may include a filter adjuster 1908, an adder 1914, or both. The second encoder 296 (e.g., the filter estimator 1902) may generate a particular HB excitation signal (e.g., an HB residual) associated with the first HB signal 242. The filter estimator 1902 may select (or generate) a filter 1906 based on a comparison of the first extended signal 250 and the first HB signal 242 (or the particular HB excitation signal). For example, the filter estimator 1902 may select (or generate) the filter 1906 to reduce (e.g., eliminate) distortion between the first extended signal 250 and the first HB signal 242 (or the particular HB excitation signal), as described herein. The filter adjuster 1908 may generate a scaled signal 1916 by applying the filter 1906 (e.g., a FIR filter) to the first extended signal 250. The filter adjuster 1908 may provide the scaled signal 1916 to the adder 1914. The adder 1914 may generate an error signal 1904 corresponding to a distortion (e.g., a difference) between the scaled signal 1916 and the first HB signal 242 (or the particular HB excitation signal). For example, the error signal 1904 may correspond to a mean-squared error between the scaled signal 1916 and the first HB signal 242 (or the particular HB excitation signal). The adder 1914 may generate the error signal 1904 based on a least mean squares (LMS) algorithm. The adder 1914 may provide the error signal 1904 to the filter adjuster 1908.

The filter adjuster 1908 may select (e.g., adjust) the filter 1906 based on the error signal 1904. For example, the filter adjuster 1908 may iteratively adjust the filter 1906 to reduce a distortion metric (e.g., a mean-squared error metric) between a first harmonic component of the scaled signal 1916 and a second harmonic component of the first HB signal 242 (or the particular HB excitation signal) by reducing (or eliminating) an energy of the error signal 1904. The filter adjuster 1908 may generate the scaled signal 1916 by applying the adjusted filter 1906 to the first extended signal 250. The filter estimator 1902 may provide the filter 1906 (e.g., the adjusted filter 1906) to the filter applicator 1912.

The filter applicator 1912 may include a quantizer 1918, a FIR filter engine 1924, or both. The quantizer 1918 may generate a quantized filter 1922 based on the filter 1906. For example, the quantizer 1918 may generate filter coefficients (e.g., LSP coefficients, or LPCs) corresponding to the filter 1906. The quantizer 1918 may generate quantized filter coefficients by performing a multi-stage (e.g., 2-stage) vector quantization (VQ) on the filter coefficients. The quantized filter 1922 may include the quantized filter coefficients. The quantizer 1918 may provide a quantization index 1920 corresponding to the quantized filter 1922 to the bit-stream parameter generator 1348 of FIG. 13. The bit-stream parameters 160 may include the filter information 374 indicating the quantization index 1920, the HB LSF data 364 corresponding to the quantized filter 1922 (e.g., the quantized LSP coefficients or the quantized LPCs), or both.

The quantizer 1918 may provide the quantized filter 1922 to the FIR filter engine 1924. The FIR filter engine 1924 may generate the second extended signal 1350 by filtering the first extended signal 250 based on the quantized filter 1922. The FIR filter engine 1924 may provide the second extended signal 1350 to the HB excitation signal generator 1347 of FIG. 13.

Figure 20:
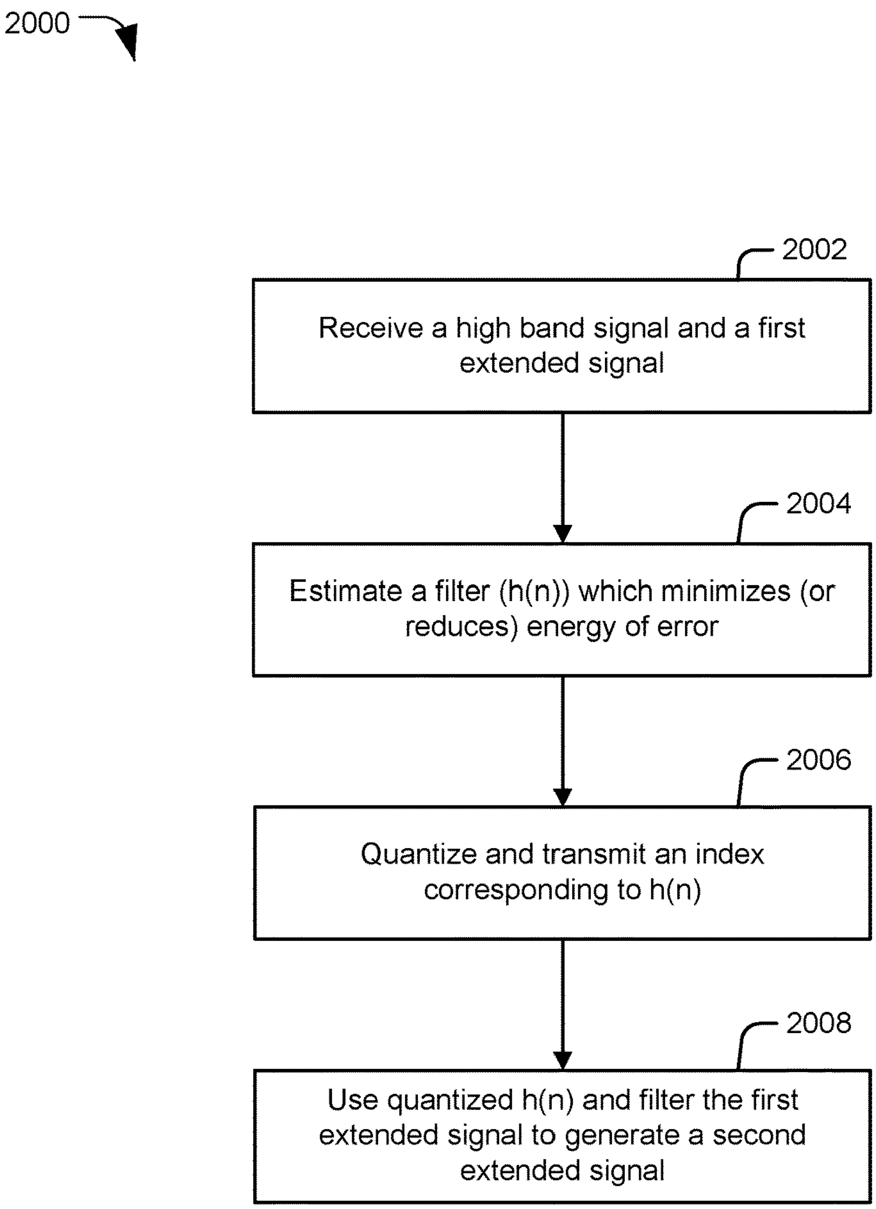
FIG. 20 is a diagram to illustrate another aspect of a method of high-band signal generation.

Referring to FIG. 20, a diagram of an aspect of a method of high band signal generation is shown and generally designated 2000. The method 2000 may be performed by one or more components of the systems 100, 200, or 1300 of FIG. 1, 2 or 13. For example, the method 2000 may be performed by the first device 102, the processor 106, the encoder 108 of FIG. 1, the second encoder 296 of FIG. 2, the energy normalizer 1306 of FIG. 13, the filter estimator 1902, the filter applicator 1912 of FIG. 19, or a combination thereof.

The method 2000 includes receiving a high band signal and a first extended signal, at 2002. For example, the energy normalizer 1306 of FIG. 13 may receive the first HB signal 242 and the first extended signal 250, as described with reference to FIG. 13.

The method 2000 also includes estimating a filter (h(n)) which minimizes (or reduces) energy of error, at 2004. For example, the filter estimator 1902 of FIG. 19 may estimate the filter 1906 to reduce an energy of the error signal 1904, as described with reference to FIG. 19.

The method 2000 further includes quantizing and transmitting an index corresponding to h(n), at 2006. For example, the quantizer 1918 may generate the quantized filter 1922 by quantizing the filter 1906, as described with reference to FIG. 19. The quantizer 1918 may generate the quantization index 1920 corresponding to the filter 1906, as described with reference to FIG. 19.

The method 2000 also includes using the quantized filter and filtering the first extended signal to generate a second extended signal, at 2008. For example, the FIR filter engine 1924 may generate the second extended signal 1350 by filtering the first extended signal 250 based on the quantized filter 1922.

Figure 21:
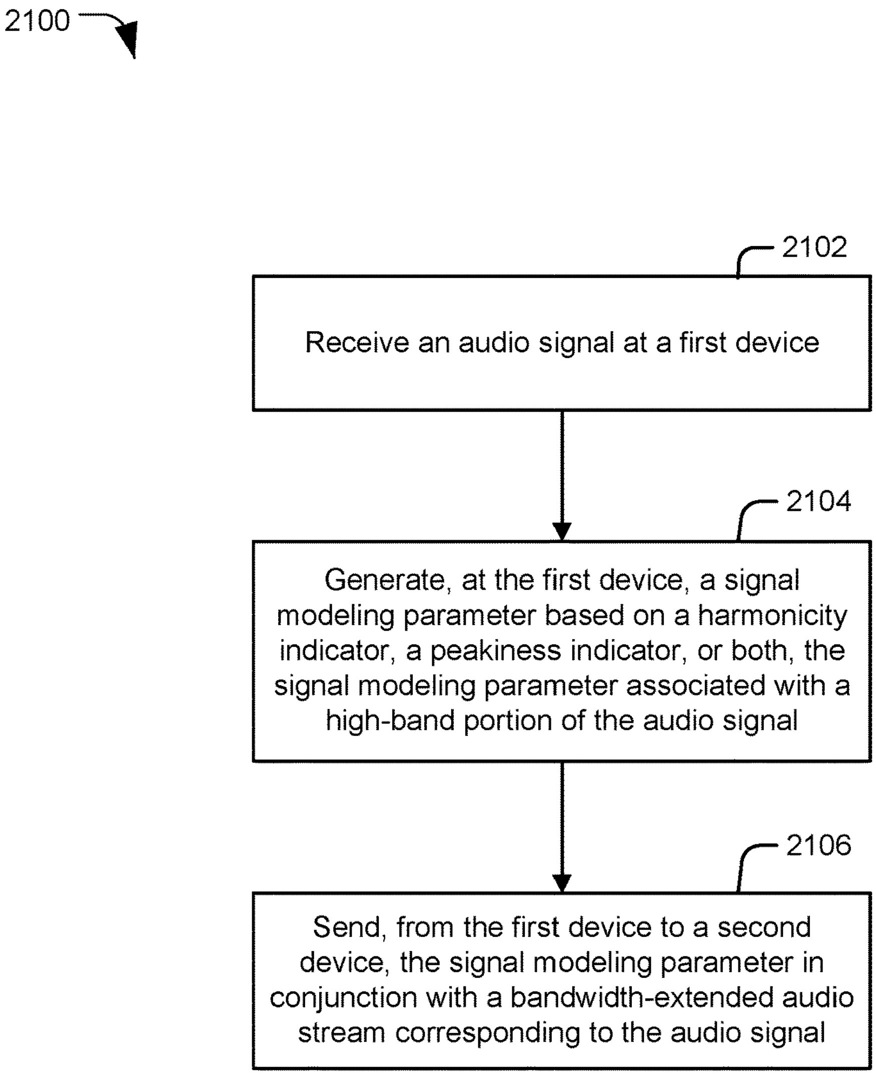
FIG. 21 is a flowchart to illustrate another aspect of a method of high band signal generation.

Referring to FIG. 21, a flowchart of an aspect of a method of high band signal generation is shown and generally designated 2100. The method 2100 may be performed by one or more components of the systems 100, 200, or 1300 of FIG. 1, 2 or 13. For example, the method 2100 may be performed by the first device 102, the processor 106, the encoder 108 of FIG. 1, the first encoder 204, the second encoder 296 of FIG. 2, the bit-stream parameter generator 1348, the transmitter 1392 of FIG. 13, or a combination thereof.

The method 2100 includes receiving an audio signal at a first device, at 2102. For example, the encoder 108 of the second device 104 may receive the input signal 114, as described with reference to FIG. 13.

The method 2100 also includes generating, at the first device, a signal modeling parameter based on a harmonicity indicator, a peakiness indicator, or both, the signal modeling parameter associated with a high-band portion of the audio signal, at 2104. For example, the encoder 108 of the second device 104 may generate the NL configuration mode 158, the mix configuration mode 368, target gain information (e.g., the HB target gain data 370, the gain shape data 372, or both), or a combination thereof, as described with reference to FIGS. 13, 14, 16, and 17. To illustrate, the configuration mode generator 1406 may generate the NL configuration mode 158, as described with reference to FIGS. 14 and 16. The HB excitation estimator 414 may generate the mix configuration mode 368 based on the mix factors 1353, the harmonicity indicator 1364, or both, as described with reference to FIG. 17. The bit-stream parameter generator 1348 may generate the target gain information, as described with reference to FIG. 17.

The method 2100 further includes sending, from the first device to a second device, the signal modeling parameter in conjunction with a bandwidth-extended audio stream corresponding to the audio signal, at 2106. For example, the transmitter 1392 of FIG. 13 may transmit, from the second device 104 to the first device 102, the NL configuration mode 158, the mix configuration mode 368, the HB target gain data 370, the gain shape data 372, or a combination thereof, in conjunction with the audio data 126.

Figure 22:
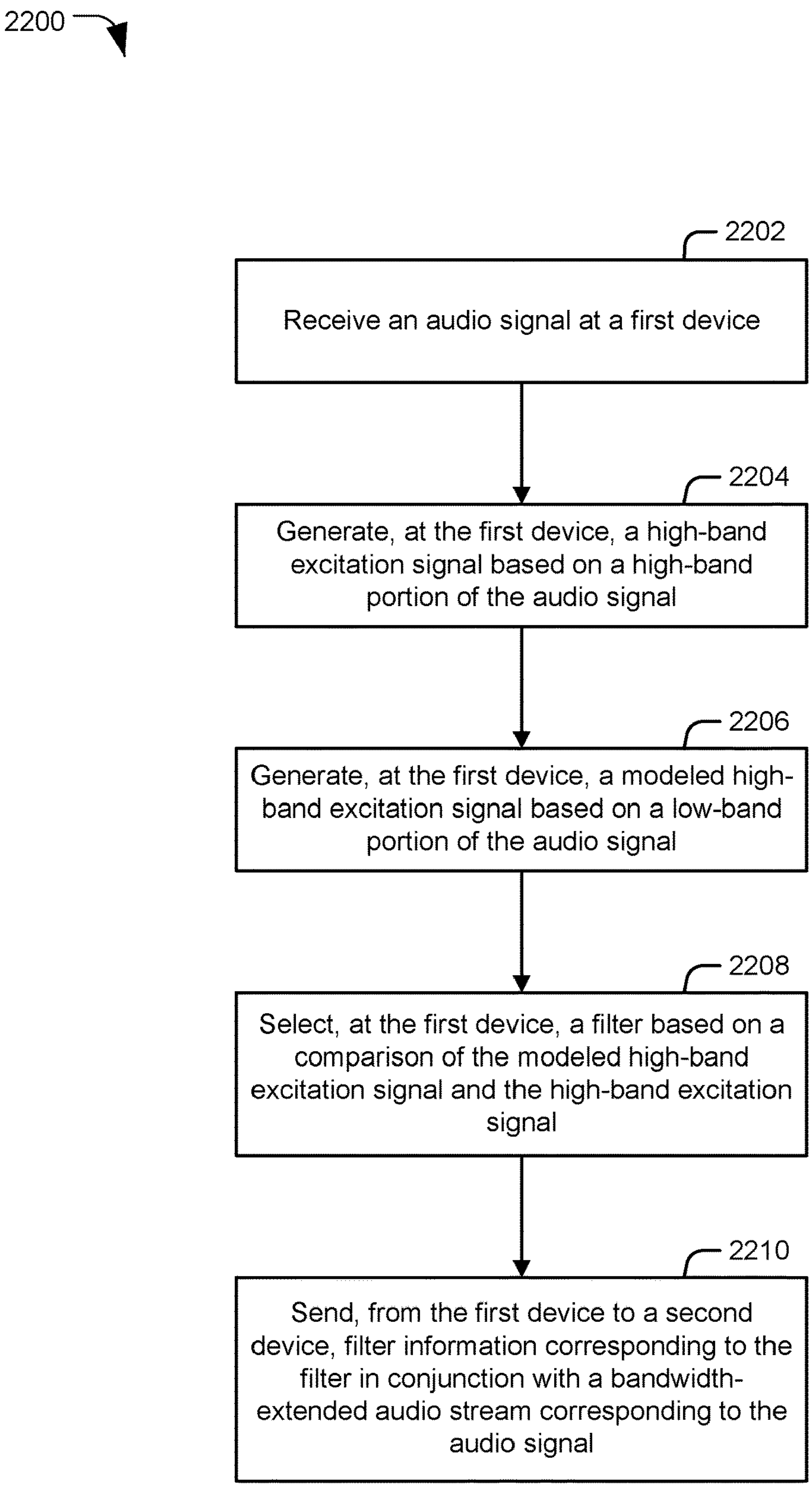
FIG. 22 is a flowchart to illustrate another aspect of a method of high band signal generation.

Referring to FIG. 22, a flowchart of an aspect of a method of high band signal generation is shown and generally designated 2200. The method 2200 may be performed by one or more components of the systems 100, 200, or 1300 of FIG. 1, 2 or 13. For example, the method 2200 may be performed by the first device 102, the processor 106, the encoder 108 of FIG. 1, the first encoder 204, the second encoder 296 of FIG. 2, the bit-stream parameter generator 1348, the transmitter 1392 of FIG. 13, or a combination thereof.

The method 2200 includes receiving an audio signal at a first device, at 2202. For example, the encoder 108 of the second device 104 may receive the input signal 114 (e.g., an audio signal), as described with reference to FIG. 13.

The method 2200 also includes generating, at the first device, a high-band excitation signal based on a high-band portion of the audio signal, at 2204. For example, the resampler and filterbank 202 of the second device 104 may generate the first HB signal 242 based on a high-band portion of the input signal 114, as described with reference to FIG. 13. The second encoder 296 may generate a particular HB excitation signal (e.g., an HB residual) based on the first HB signal 242.

The method 2200 further includes generating, at the first device, a modeled high-band excitation signal based on a low-band portion of the audio signal, at 2206. For example, the encoder bandwidth extension module 206 of the second device 104 may generate the first extended signal 250 based on the first LB signal 240, as described with reference to FIG. 13. The first LB signal 240 may correspond to a low-band portion of the input signal 114.

The method 2200 also includes selecting, at the first device, a filter based on a comparison of the modeled high-band excitation signal and the high-band excitation signal, at 2208. For example, the filter estimator 1902 of the second device 104 may select the filter 1906 based on a comparison of the first extended signal 250 and the first HB signal 242 (or the particular HB excitation signal), as described with reference to FIG. 19.

The method 2200 further includes sending, from the first device to a second device, filter information corresponding to the filter in conjunction with a bandwidth-extended audio stream corresponding to the audio signal, at 2210. For example, the transmitter 1392 may transmit, from the second device 104 to the first device 102, the filter information 374, the HB LSF data 364, or both, in conjunction with the audio data 126 corresponding to the input signal 114, as described with reference to FIGS. 13 and 19.

Figure 23:
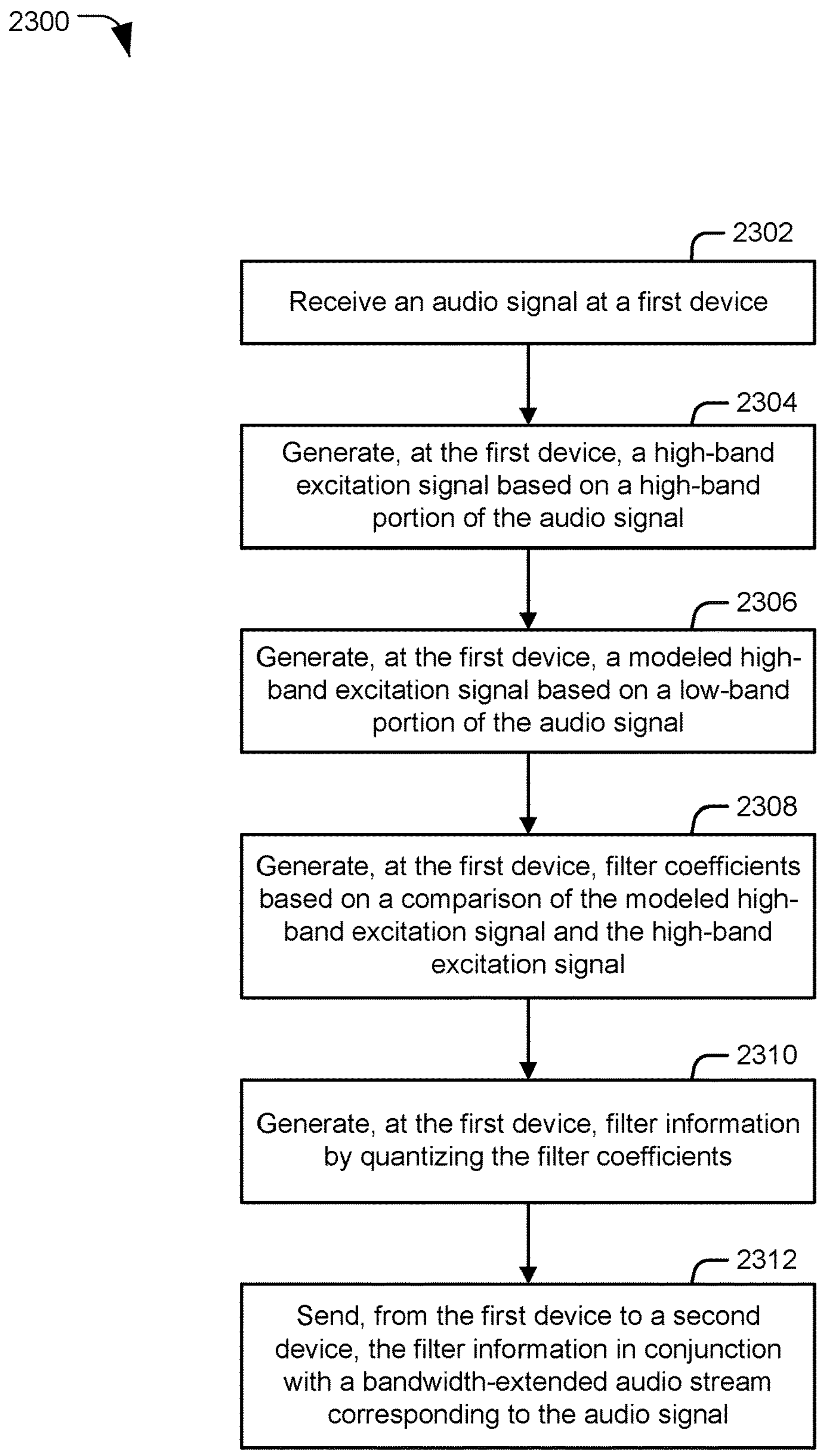
FIG. 23 is a flowchart to illustrate another aspect of a method of high band signal generation.

Referring to FIG. 23, a flowchart of an aspect of a method of high band signal generation is shown and generally designated 2300. The method 2300 may be performed by one or more components of the systems 100, 200, or 1300 of FIG. 1, 2 or 13. For example, the method 2300 may be performed by the first device 102, the processor 106, the encoder 108 of FIG. 1, the first encoder 204, the second encoder 296 of FIG. 2, the bit-stream parameter generator 1348, the transmitter 1392 of FIG. 13, or a combination thereof.

The method 2300 includes receiving an audio signal at a first device, at 2302. For example, the encoder 108 of the second device 104 may receive the input signal 114 (e.g., an audio signal), as described with reference to FIG. 13.

The method 2300 also includes generating, at the first device, a high-band excitation signal based on a high-band portion of the audio signal, at 2304. For example, the resampler and filterbank 202 of the second device 104 may generate the first HB signal 242 based on a high-band portion of the input signal 114, as described with reference to FIG. 13. The second encoder 296 may generate a particular HB excitation signal (e.g., an HB residual) based on the first HB signal 242.

The method 2300 further includes generating, at the first device, a modeled high-band excitation signal based on a low-band portion of the audio signal, at 2306. For example, the encoder bandwidth extension module 206 of the second device 104 may generate the first extended signal 250 based on the first LB signal 240, as described with reference to FIG. 13. The first LB signal 240 may correspond to a low-band portion of the input signal 114.

The method 2300 also includes generating, at the first device, filter coefficients based on a comparison of the modeled high-band excitation signal and the high-band excitation signal, at 2308. For example, the filter estimator 1902 of the second device 104 may generate filter coefficients corresponding to the filter 1906 based on a comparison of the first extended signal 250 and the first HB signal 242 (or the particular HB excitation signal), as described with reference to FIG. 19.

The method 2300 further includes generating, at the first device, filter information by quantizing the filter coefficients, at 2310. For example, the quantizer 1918 of the second device 104 may generate the quantization index 1920 and the quantized filter 1922 (e.g., quantized filter coefficients) by quantizing the filter coefficients corresponding to the filter 1906, as described with reference to FIG. 19. The quantizer 1918 may generate the filter information 374 indicating the quantization index 1920, the HB LSF data 364 indicating the quantized filter coefficients, or both.

The method 2300 also includes sending, from the first device to a second device, the filter information in conjunction with a bandwidth-extended audio stream corresponding to the audio signal, at 2210. For example, the transmitter 1392 may transmit, from the second device 104 to the first device 102, the filter information 374, the HB LSF data 364, or both, in conjunction with the audio data 126 corresponding to the input signal 114, as described with reference to FIGS. 13 and 19.

Figure 24:
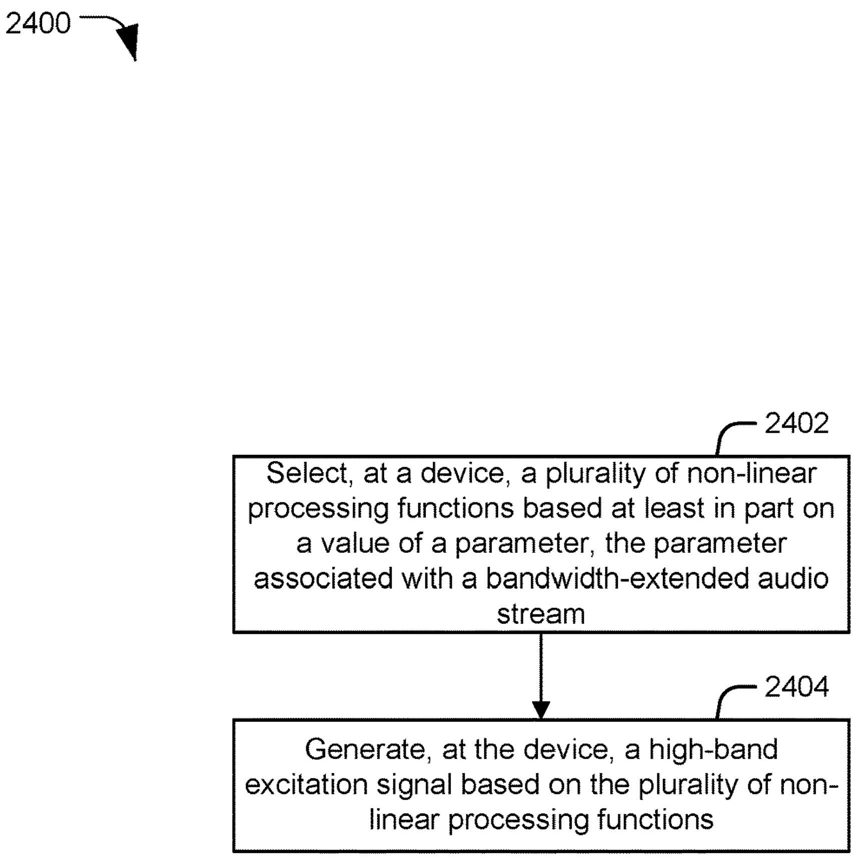
FIG. 24 is a flowchart to illustrate another aspect of a method of high band signal generation.

Referring to FIG. 24, a flowchart of an aspect of a method of high band signal generation is shown and generally designated 2400. The method 2400 may be performed by one or more components of the systems 100, 200, or 1300 of FIG. 1, 2 or 13. For example, the method 2400 may be performed by the first device 102, the processor 106, the encoder 108, the second device 104, the processor 116, the decoder 118, the second decoder 136, the decoding module 162, the HB excitation signal generator 147 of FIG. 1, the second encoder 296, the encoding module 208, the encoder bandwidth extension module 206 of FIG. 2, the system 400, the harmonic extension module 404 of FIG. 4, or a combination thereof.

The method 2400 includes selecting, at a device, a plurality of non-linear processing functions based at least in part on a value of a parameter, at 2402. For example, the harmonic extension module 404 may select the first function 164 and the second function 166 of FIG. 1 based at least in part on a value of the NL configuration mode 158, as described with reference to FIGS. 4 and 17.

The method 2400 also includes generating, at the device, a high-band excitation signal based on the plurality of non-linear processing functions, at 2404. For example, the harmonic extension module 404 may generate the extended signal 150 based on the first function 164 and the second function 166, as described with reference to FIG. 4. As another example, the harmonic extension module 404 may generate the first extended signal 250 based on the first function 164 and the second function 166, as described with reference to FIG. 17.

The method 2400 may thus enable selection of a plurality of non-linear functions based on a value of a parameter. A high-band excitation signal may be generated, at an encoder, a decoder, or both, based on the plurality of non-linear functions.

Figure 25:
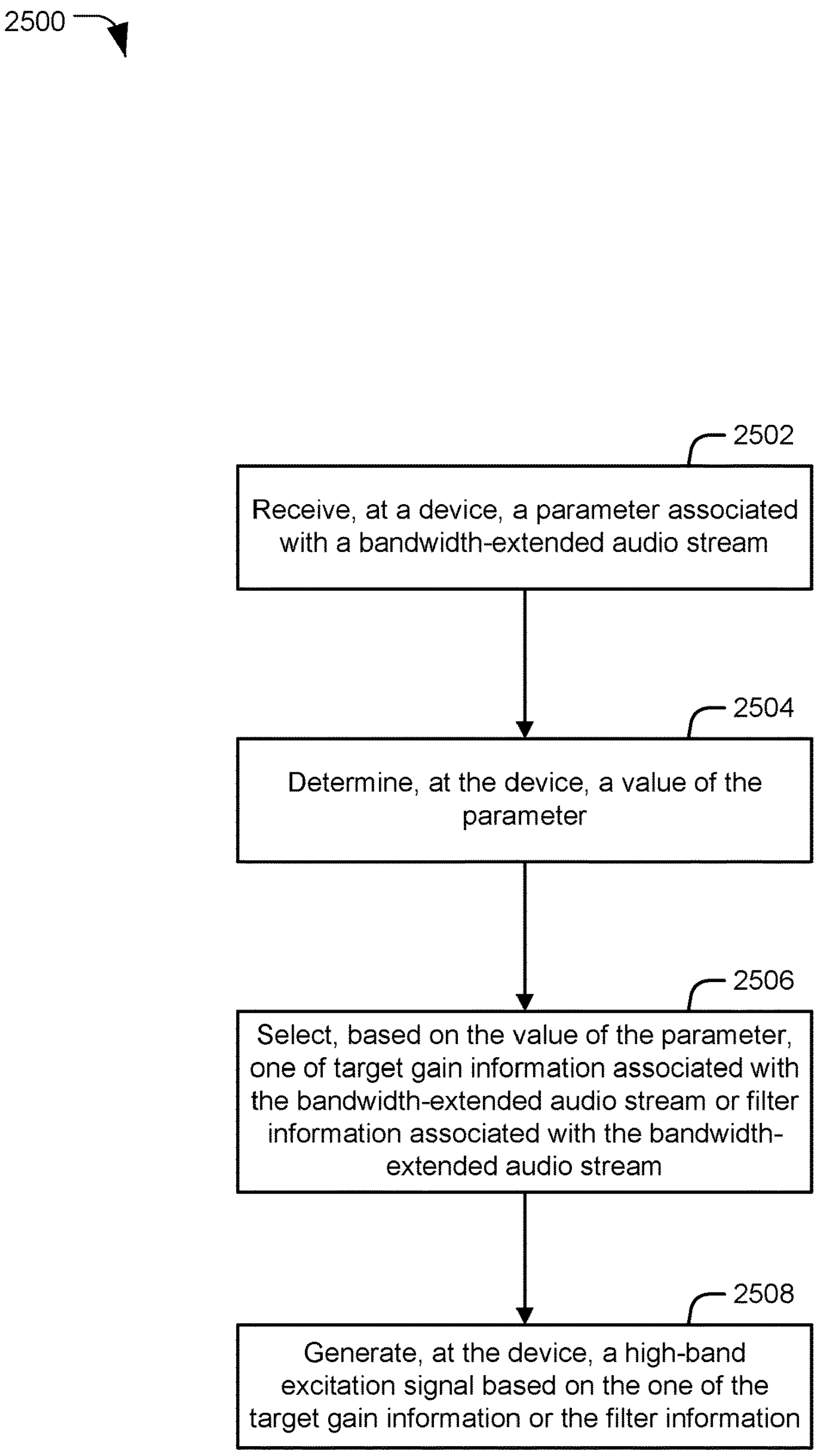
FIG. 25 is a flowchart to illustrate another aspect of a method of high band signal generation.

Referring to FIG. 25, a flowchart of an aspect of a method of high band signal generation is shown and generally designated 2500. The method 2500 may be performed by one or more components of the systems 100, 200, or 1300 of FIG. 1, 2 or 13. For example, the method 2500 may be performed by the second device 104, the receiver 192, the HB excitation signal generator 147, the decoding module 162, the second decoder 136, the decoder 118, the processor 116 of FIG. 1, or a combination thereof.

The method 2500 includes receiving, at a device, a parameter associated with a bandwidth-extended audio stream, at 2502. For example, the receiver 192 may receive the HR configuration mode 366 associated with the audio data 126, as described with reference to FIGS. 1 and 3.

The method 2500 also includes determining, at the device, a value of the parameter, at 2504. For example, the synthesis module 418 may determine a value of the HR configuration mode 366, as described with reference to FIG. 4.

The method 2500 further includes selecting, based on the value of the parameter, one of target gain information associated with the bandwidth-extended audio stream or filter information associated with the bandwidth-extended audio stream, at 2506. For example, when the value of the HR configuration mode 366 is 1, the synthesis module 418 may select target gain information, such as one or more of the gain shape data 372, the HB target gain data 370, or the gain information 362, as described with reference to FIG. 4. When the value of the HR configuration mode 366 is 0, the synthesis module 418 may select the filter information 374, as described with reference to FIG. 4.

The method 2500 also includes generating, at the device, a high-band excitation signal based on the one of the target gain information or the filter information, at 2508. For example, the synthesis module 418 may generate a modified excitation signal based on the selected one of the target gain information or the filter information 374, as described with reference to FIG. 4.

The method 2500 may thus enable selection of target gain information or filter information based on a value of a parameter. A high-band excitation signal may be generated, at a decoder, based on the selected one of the target gain information or the filter information.

Figure 26:
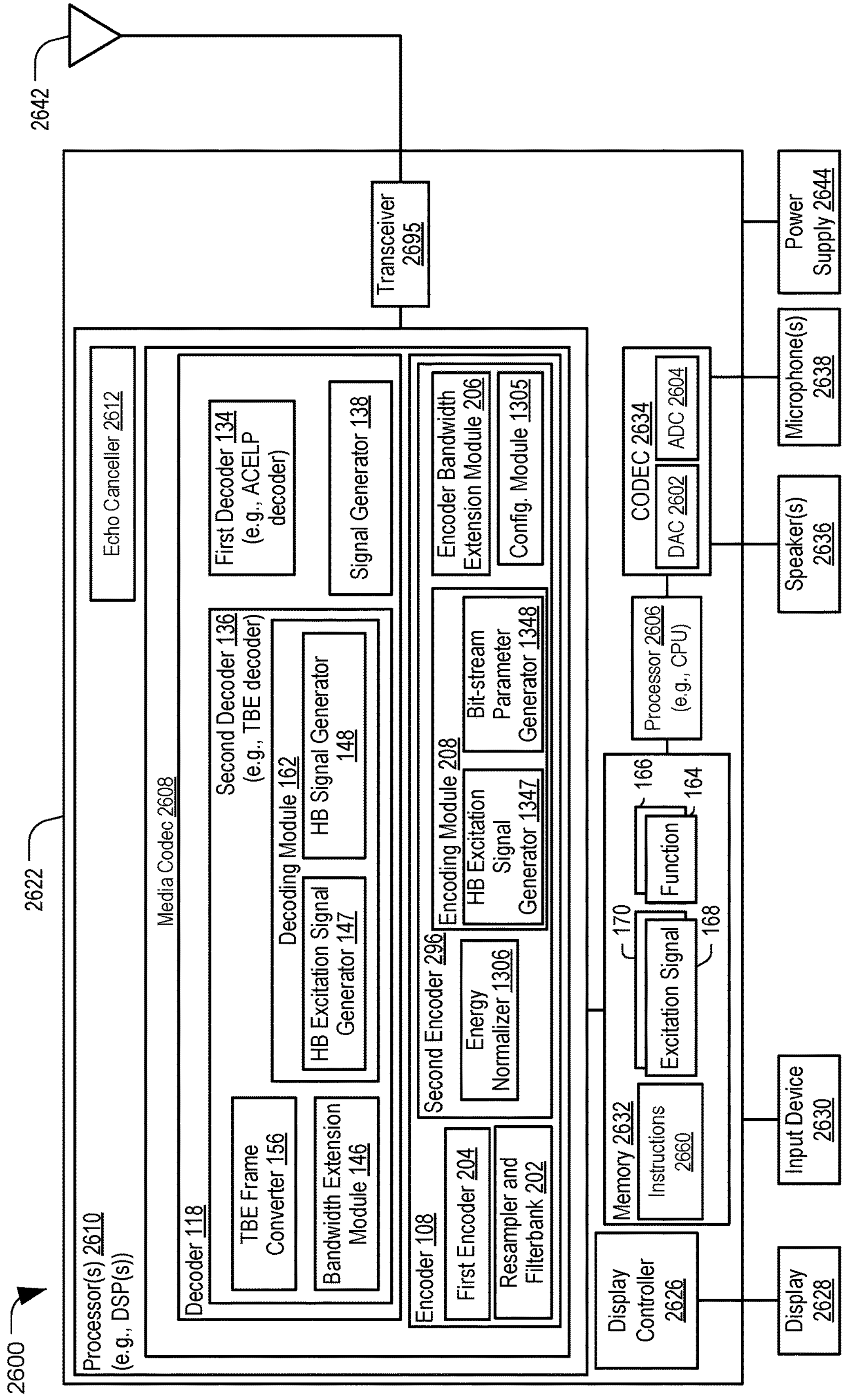
FIG. 26 is a block diagram of a device operable to perform high band signal generation in accordance with the systems and methods of FIGS. 1-25.

Referring to FIG. 26, a block diagram of a particular illustrative aspect of a device (e.g., a wireless communication device) is depicted and generally designated 2600. In various aspects, the device 2600 may have fewer or more components than illustrated in FIG. 26. In an illustrative aspect, the device 2600 may correspond to the first device 102 or the second device 104 of FIG. 1. In an illustrative aspect, the device 2600 may perform one or more operations described with reference to systems and methods of FIGS. 1-25.

In a particular aspect, the device 2600 includes a processor 2606 (e.g., a central processing unit (CPU)). The device 2600 may include one or more additional processors 2610 (e.g., one or more digital signal processors (DSPs)). The processors 2610 may include a media (e.g., speech and music) coder-decoder (CODEC) 2608, and an echo canceller 2612. The media CODEC 2608 may include the decoder 118, the encoder 108, or both. The decoder 118 may include the first decoder 134, the second decoder 136, the signal generator 138, or a combination thereof. The second decoder 136 may include the TBE frame converter 156, the bandwidth extension module 146, the decoding module 162, or a combination thereof. The decoding module 162 may include the HB excitation signal generator 147, the HB signal generator 148, or both. The encoder 108 may include the first encoder 204, the second encoder 296, the resampler and filterbank 202, or a combination thereof. The second encoder 296 may include the energy normalizer 1306, the encoding module 208, the encoder bandwidth extension module 206, the configuration module 1305, or a combination thereof. The encoding module 208 may include the HB excitation signal generator 1347, the bit-stream parameter generator 1348, or both.

Although the media CODEC 2608 is illustrated as a component of the processors 2610 (e.g., dedicated circuitry and/or executable programming code), in other aspects one or more components of the media CODEC 2608, such as the decoder 118, the encoder 108, or both, may be included in the processor 2606, the CODEC 2634, another processing component, or a combination thereof.

The device 2600 may include a memory 2632 and a CODEC 2634. The memory 2632 may correspond to the memory 132 of FIG. 1, the memory 1332 of FIG. 13, or both. The device 2600 may include a transceiver 2650 coupled to an antenna 2642. The transceiver 2650 may include the receiver 192 of FIG. 1, the transmitter 1392 of FIG. 13, or both. The device 2600 may include a display 2628 coupled to a display controller 2626. One or more speakers 2636, one or more microphones 2638, or a combination thereof, may be coupled to the CODEC 2634. In a particular aspect, the speakers 2636 may correspond to the speakers 122 of FIG. 1. The microphones 2638 may correspond to the microphones 1338 of FIG. 13. The CODEC

2634 may include a digital-to-analog converter (DAC) 2602 and an analog-to-digital converter (ADC) 2604.

The memory 2632 may include instructions 2660 executable by the processor 2606, the processors 2610, the CODEC 2634, another processing unit of the device 2600, or a combination thereof, to perform one or more operations described with reference to FIGS. 1-25.

One or more components of the device 2600 may be implemented via dedicated hardware (e.g., circuitry), by a processor executing instructions to perform one or more tasks, or a combination thereof. As an example, the memory 2632 or one or more components of the processor 2606, the processors 2610, and/or the CODEC 2634 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 2660) that, when executed by a computer (e.g., a processor in the CODEC 2634, the processor 2606, and/or the processors 2610), may cause the computer to perform one or more operations described with reference to FIGS. 1-25. As an example, the memory 2632 or the one or more components of the processor 2606, the processors 2610, the CODEC 2634 may be a non-transitory computer-readable medium that includes instructions (e.g., the instructions 2660) that, when executed by a computer (e.g., a processor in the CODEC 2634, the processor 2606, and/or the processors 2610), cause the computer perform one or more operations described with reference to FIGS. 1-25.

In a particular aspect, the device 2600 may be included in a system-in-package or system-on-chip device (e.g., a mobile station modem (MSM)) 2622. In a particular aspect, the processor 2606, the processors 2610, the display controller 2626, the memory 2632, the CODEC 2634, and the transceiver 2650 are included in a system-in-package or the system-on-chip device 2622. In a particular aspect, an input device 2630, such as a touchscreen and/or keypad, and a power supply 2644 are coupled to the system-on-chip device 2622. Moreover, in a particular aspect, as illustrated in FIG. 26, the display 2628, the input device 2630, the speakers 2636, the microphones 2638, the antenna 2642, and the power supply 2644 are external to the system-on-chip device 2622. However, each of the display 2628, the input device 2630, the speakers 2636, the microphones 2638, the antenna 2642, and the power supply 2644 can be coupled to a component of the system-on-chip device 2622, such as an interface or a controller.

The device 2600 may include a wireless telephone a mobile communication device, a smart phone, a cellular phone, a laptop computer, a desktop computer, a computer, a tablet computer, a set top box, a personal digital assistant, a display device, a television, a gaming console, a music player, a radio, a video player, an entertainment unit, a communication device, a fixed location data unit, a personal media player, a digital video player, a digital video disc (DVD) player, a tuner, a camera, a navigation device, a decoder system, an encoder system, a media playback device, a media broadcast device, or any combination thereof.

In a particular aspect, one or more components of the systems described with reference to FIGS. 1-25 and the device 2600 may be integrated into a decoding system or apparatus (e.g., an electronic device, a CODEC, or a processor therein), into an encoding system or apparatus, or both. In other aspects, one or more components of the systems described with reference to FIGS. 1-25 and the device 2600 may be integrated into a wireless telephone, a tablet computer, a desktop computer, a laptop computer, a set top box, a music player, a video player, an entertainment unit, a television, a game console, a navigation device, a communications device, a personal digital assistant (PDA), a fixed location data unit, a personal media player, or another type of device.

It should be noted that various functions performed by the one or more components of the systems described with reference to FIGS. 1-25 and the device 2600 are described as being performed by certain components or modules. This division of components and modules is for illustration only. In an alternate aspect, a function performed by a particular component or module may be divided amongst multiple components or modules. Moreover, in an alternate aspect, two or more components or modules described with reference to FIGS. 1-26 may be integrated into a single component or module. Each component or module illustrated in FIGS. 1-26 may be implemented using hardware (e.g., a field-programmable gate array (FPGA) device, an application-specific integrated circuit (ASIC), a DSP, a controller, etc.), software (e.g., instructions executable by a processor), or any combination thereof.

In conjunction with the described aspects, an apparatus is disclosed that includes means for storing a parameter associated with a bandwidth-extended audio stream. For example, the means for storing may include the second device 104, memory 132 of FIG. 1, the media storage 292 of FIG. 2, the memory 2632 of FIG. 25, one or more devices configured to store a parameter, or a combination thereof.

The apparatus also includes means for generating a high-band excitation signal based on a plurality of non-linear processing functions. For example, the means for generating may include the first device 102, the processor 106, the encoder 108, the second device 104, the processor 116, the decoder 118, the second decoder 136, the decoding module 162 of FIG. 1, the second encoder 296, the encoding module 208, the encoder bandwidth extension module 206 of FIG. 2, the system 400, the harmonic extension module 404 of FIG. 4, the processors 2610, the media codec 2608, the device 2600 of FIG. 25, one or more devices configured to generate a high-band excitation signal based on a plurality of non-linear processing functions (e.g., a processor executing instructions stored at a computer-readable storage device), or a combination thereof. The plurality of non-linear processing functions may be selected based at least in part on a value of the parameter.

Also, in conjunction with the described aspects, an apparatus is disclosed that includes means for receiving a parameter associated with a bandwidth-extended audio stream. For example, the means for receiving may include the receiver 192 of FIG. 1, the transceiver 2695 of FIG. 25, one or more devices configured to receive a parameter associated with a bandwidth-extended audio stream, or a combination thereof.

The apparatus also includes means for generating a high-band excitation signal based on one of target gain information associated with the bandwidth-extended audio stream or filter information associated with the bandwidth-extended audio stream. For example, the means for generating may include the HB excitation signal generator 147, the decoding module 162, the second decoder 136, the decoder 118, the processor 116, the second device 104 of FIG. 1, the synthesis module 418 of FIG. 4, the processors 2610, the media codec 2608, the device 2600 of FIG. 25, one or more devices configured to generate a high-band excitation signal, or a combination thereof. The one of the target gain information or the filter information may be selected based on a value of the parameter.

Further, in conjunction with the described aspects, an apparatus is disclosed that includes means for generating a signal modeling parameter based on a harmonicity indicator, a peakiness indicator, or both. For example, the means for generating may include the first device 102, the processor 106, the encoder 108 of FIG. 1, the second encoder 296, the encoding module 208 of FIG. 2, the configuration module 1305, the energy normalizer 1306, the bit-stream parameter generator 1348 of FIG. 13, one or more devices configured to generate a signal modeling parameter based on the harmonicity indicator, the peakiness indicator, or both (e.g., a processor executing instructions stored at a computer-readable storage device), or a combination thereof. The signal modeling parameter may be associated with a high-band portion of an audio signal.

The apparatus also includes means for transmitting the signal modeling parameter in conjunction with a bandwidth-extended audio stream corresponding to the audio signal. For example, the means for transmitting may include the transmitter 1392 of FIG. 13, the transceiver 2695 of FIG. 25, one or more devices configured to transmit the signal modeling parameter, or a combination thereof.

Also, in conjunction with the described aspects, an apparatus is disclosed that includes means for selecting a filter based on a comparison of a modeled high-band excitation signal and a high-band excitation signal. For example, the means for selecting may include the first device 102, the processor 106, the encoder 108 of FIG. 1, the second encoder 296, the encoding module 208 of FIG. 2, the energy normalizer 1306 of FIG. 13, the filter estimator 1902 of FIG. 19, one or more devices configured to select the filter (e.g., a processor executing instructions stored at a computer-readable storage device), or a combination thereof. The high-band excitation signal may be based on a high-band portion of an audio signal. The modeled high-band excitation signal may be based on a low-band portion of the audio signal.

The apparatus also includes means for transmitting filter information corresponding to the filter in conjunction with a bandwidth-extended audio stream corresponding to the audio signal. For example, the means for transmitting may include the transmitter 1392 of FIG. 13, the transceiver 2695 of FIG. 25, one or more devices configured to transmit the signal modeling parameter, or a combination thereof.

Further, in conjunction with the described aspects, an apparatus includes means for quantizing filter coefficients that are generated based on a comparison of a modeled high-band excitation signal and a high-band excitation signal. For example, the means for quantizing filter coefficients may include the first device 102, the processor 106, the encoder 108 of FIG. 1, the second encoder 296, the encoding module 208 of FIG. 2, the energy normalizer 1306 of FIG. 13, the filter applicator 1912, the quantizer 1918 of FIG. 19, one or more devices configured to quantize filter coefficients (e.g., a processor executing instructions stored at a computer-readable storage device), or a combination thereof. The high-band excitation signal may be based on a high-band portion of an audio signal. The modeled high-band excitation signal may be based on a low-band portion of the audio signal.

The apparatus also includes means for transmitting filter information in conjunction with a bandwidth-extended audio stream corresponding to the audio signal. For example, the means for transmitting may include the transmitter 1392 of FIG. 13, the transceiver 2695 of FIG. 25, one or more devices configured to transmit the signal modeling parameter, or a combination thereof. The filter information may be based on the quantized filter coefficients.

Figure 27:
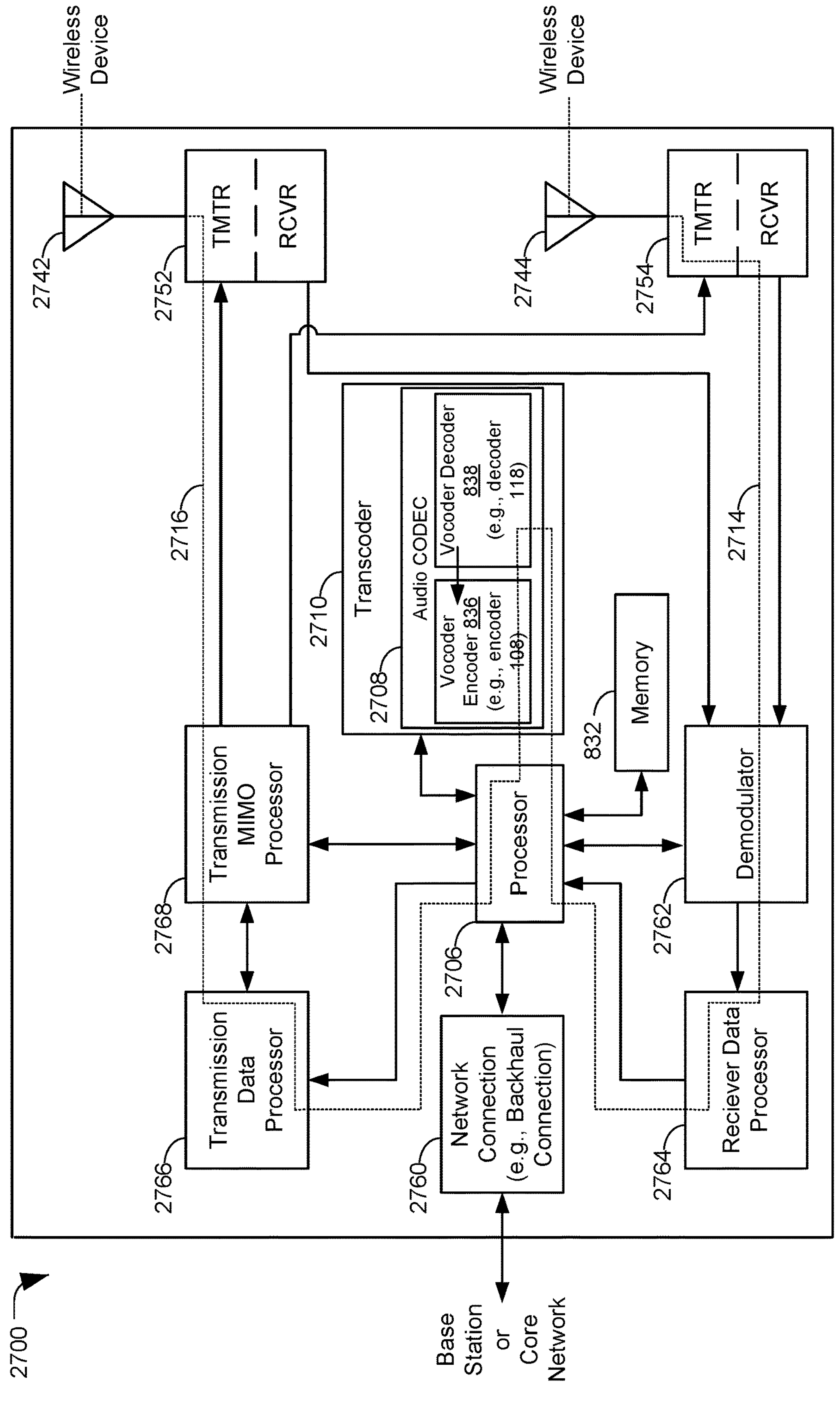
FIG. 27 is a block diagram of a base station operable to perform high band signal generation in accordance with the systems and methods of FIGS. 1-26.

Referring to FIG. 27, a block diagram of a particular illustrative example of a base station 2700 is depicted. In various implementations, the base station 2700 may have more components or fewer components than illustrated in FIG. 27. In an illustrative example, the base station 2700 may include the first device 102, the second device 104 of FIG. 1, or both. In an illustrative example, the base station 2700 may perform one or more operations described with reference to FIGS. 1-26.

The base station 2700 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 2600 of FIG. 26.

Various functions may be performed by one or more components of the base station 2700 (and/or in other components not shown), such as sending and receiving messages and data (e.g., audio data). In a particular example, the base station 2700 includes a processor 2706 (e.g., a CPU). The processor 2706 may correspond to the processor 106, the processor 116 of FIG. 1, or both. The base station 2700 may include a transcoder 2710. The transcoder 2710 may include an audio CODEC 2708. For example, the transcoder 2710 may include one or more components (e.g., circuitry) configured to perform operations of the audio CODEC 2708. As another example, the transcoder 2710 may be configured to execute one or more computer-readable instructions to perform the operations of the audio CODEC 2708. Although the audio CODEC 2708 is illustrated as a component of the transcoder 2710, in other examples one or more components of the audio CODEC 2708 may be included in the processor 2706, another processing component, or a combination thereof. For example, a vocoder decoder 2738 may be included in a receiver data processor 2764. As another example, a vocoder encoder 2736 may be included in a transmission data processor 2766.

The transcoder 2710 may function to transcode messages and data between two or more networks. The transcoder 2710 may be configured to convert message and audio data from a first format (e.g., a digital format) to a second format. To illustrate, the vocoder decoder 2738 may decode encoded signals having a first format and the vocoder encoder 2736 may encode the decoded signals into encoded signals having a second format. Additionally or alternatively, the transcoder 2710 may be configured to perform data rate adaptation. For example, the transcoder 2710 may downconvert a data rate or upconvert the data rate without changing a format the audio data. To illustrate, the transcoder 2710 may downconvert 64 kbit/s signals into 16 kbit/s signals.

The audio CODEC 2708 may include the vocoder encoder 2736 and the vocoder decoder 2738. The vocoder encoder 2736 may include an encoder selector, a speech encoder, and a non-speech encoder. The vocoder encoder 2736 may include the encoder 108. The vocoder decoder 2738 may include a decoder selector, a speech decoder, and a non-speech decoder. The vocoder decoder 2738 may include the decoder 118.

The base station 2700 may include a memory 2732. The memory 2732, such as a computer-readable storage device, may include instructions. The instructions may include one or more instructions that are executable by the processor 2706, the transcoder 2710, or a combination thereof, to perform one or more operations described with reference to FIGS. 1-26. The base station 2700 may include multiple transmitters and receivers (e.g., transceivers), such as a first transceiver 2752 and a second transceiver 2754, coupled to an array of antennas. The array of antennas may include a first antenna 2742 and a second antenna 2744. The array of antennas may be configured to wirelessly communicate with one or more wireless devices, such as the device 2600 of FIG. 26. For example, the second antenna 2744 may receive a data stream 2714 (e.g., a bit stream) from a wireless device. The data stream 2714 may include messages, data (e.g., encoded speech data), or a combination thereof.

The base station 2700 may include a network connection 2760, such as backhaul connection. The network connection 2760 may be configured to communicate with a core network or one or more base stations of the wireless communication network. For example, the base station 2700 may receive a second data stream (e.g., messages or audio data) from a core network via the network connection 2760. The base station 2700 may process the second data stream to generate messages or audio data and provide the messages or the audio data to one or more wireless device via one or more antennas of the array of antennas or to another base station via the network connection 2760. In a particular implementation, the network connection 2760 may be a wide area network (WAN) connection, as an illustrative, non-limiting example.

The base station 2700 may include a demodulator 2762 that is coupled to the transceivers 2752, 2754, the receiver data processor 2764, and the processor 2706, and the receiver data processor 2764 may be coupled to the processor 2706. The demodulator 2762 may be configured to demodulate modulated signals received from the transceivers 2752, 2754 and to provide demodulated data to the receiver data processor 2764. The receiver data processor 2764 may be configured to extract a message or audio data from the demodulated data and send the message or the audio data to the processor 2706.

The base station 2700 may include a transmission data processor 2766 and a transmission multiple input-multiple output (MIMO) processor 2768. The transmission data processor 2766 may be coupled to the processor 2706 and the transmission MIMO processor 2768. The transmission MIMO processor 2768 may be coupled to the transceivers 2752, 2754 and the processor 2706. The transmission data processor 2766 may be configured to receive the messages or the audio data from the processor 2706 and to code the messages or the audio data based on a coding scheme, such as CDMA or orthogonal frequency-division multiplexing (OFDM), as an illustrative, non-limiting examples. The transmission data processor 2766 may provide the coded data to the transmission MIMO processor 2768.

The coded data may be multiplexed with other data, such as pilot data, using CDMA or OFDM techniques to generate multiplexed data. The multiplexed data may then be modulated (i.e., symbol mapped) by the transmission data processor 2766 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 2706.

The transmission MIMO processor 2768 may be configured to receive the modulation symbols from the transmission data processor 2766 and may further process the modulation symbols and may perform beamforming on the data. For example, the transmission MIMO processor 2768 may apply beamforming weights to the modulation symbols. The beamforming weights may correspond to one or more antennas of the array of antennas from which the modulation symbols are transmitted.

During operation, the second antenna 2744 of the base station 2700 may receive a data stream 2714. The second transceiver 2754 may receive the data stream 2714 from the second antenna 2744 and may provide the data stream 2714 to the demodulator 2762. The demodulator 2762 may demodulate modulated signals of the data stream 2714 and provide demodulated data to the receiver data processor 2764. The receiver data processor 2764 may extract audio data from the demodulated data and provide the extracted audio data to the processor 2706. In a particular aspect, the data stream 2714 may correspond to the audio data 126.

The processor 2706 may provide the audio data to the transcoder 2710 for transcoding. The vocoder decoder 2738 of the transcoder 2710 may decode the audio data from a first format into decoded audio data and the vocoder encoder 2736 may encode the decoded audio data into a second format. In some implementations, the vocoder encoder 2736 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 2710, the transcoding operations (e.g., decoding and encoding) may be performed by multiple components of the base station 2700. For example, decoding may be performed by the receiver data processor 2764 and encoding may be performed by the transmission data processor 2766.

The vocoder decoder 2738 and the vocoder encoder 2736 may select a corresponding decoder (e.g., a speech decoder or a non-speech decoder) and a corresponding encoder to transcode (e.g., decode and encode) the frame. Encoded audio data generated at the vocoder encoder 2736, such as transcoded data, may be provided to the transmission data processor 2766 or the network connection 2760 via the processor 2706.

The transcoded audio data from the transcoder 2710 may be provided to the transmission data processor 2766 for coding according to a modulation scheme, such as OFDM, to generate the modulation symbols. The transmission data processor 2766 may provide the modulation symbols to the transmission MIMO processor 2768 for further processing and beamforming. The transmission MIMO processor 2768 may apply beamforming weights and may provide the modulation symbols to one or more antennas of the array of antennas, such as the first antenna 2742 via the first transceiver 2752. Thus, the base station 2700 may provide a transcoded data stream 2716, that corresponds to the data stream 2714 received from the wireless device, to another wireless device. The transcoded data stream 2716 may have a different encoding format, data rate, or both, than the data stream 2714. In other implementations, the transcoded data stream 2716 may be provided to the network connection 2760 for transmission to another base station or a core network.

The base station 2700 may therefore include a computer-readable storage device (e.g., the memory 2732) storing instructions that, when executed by a processor (e.g., the processor 2706 or the transcoder 2710), cause the processor to perform operations including selecting a plurality of non-linear processing functions based at least in part on a value of a parameter. The parameter is associated with a bandwidth-extended audio stream. The operations also include generating a high-band excitation signal based on the plurality of non-linear processing functions.

In a particular aspect, the base station 2700 may include a computer-readable storage device (e.g., the memory 2732) storing instructions that, when executed by a processor (e.g., the processor 2706 or the transcoder 2710), cause the processor to perform operations including receiving a parameter associated with a bandwidth-extended audio stream. The operations also include determining a value of the parameter. The operations further include selecting, based on the value of the parameter, one of target gain information associated with the bandwidth-extended audio stream or filter information associated with the bandwidth-extended audio stream. The operations also include generating a high-band excitation signal based on the one of the target gain information or the filter information.

Those of skill would further appreciate that the various illustrative logical blocks, configurations, modules, circuits, and algorithm steps described in connection with the aspects disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in a memory device, such as random access memory (RAM), magnetoresistive random access memory (MRAIVI), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device for signal processing comprising:

a receiver configured to receive a parameter associated with an encoded audio signal; and a processor configured to:

generate a resampled signal based on a low-band excitation signal;

select a plurality of non-linear processing functions based at least in part on a value of the parameter, wherein the plurality of non-linear processing functions comprise a first non-linear processing function and a second non-linear processing function, and wherein the first non-linear processing function is different from the second non-linear processing function;

generate a first excitation signal based on the first non-linear processing function by applying the first non-linear processing function to the resampled signal;

generate a second excitation signal based on the second non-linear processing function by applying the second non-linear processing function to the resampled signal; and generate a high-band excitation signal based on the first excitation signal and the second excitation signal, wherein the first excitation signal corresponds to a first high-band frequency sub-range that is between approximately 8 kilohertz and 12 kilohertz, and wherein the second excitation signal corresponds to a second high-band frequency sub-range that is between 12 kilohertz and 16 kilohertz.

2. The device of claim 1, wherein the processor is further configured to:

generate a first filtered signal by applying a low-pass filter to the first excitation signal; and generate a second filtered signal by applying a high-pass filter to the second excitation signal, wherein the first filtered signal and the second filtered signal are combined to generate the high-band excitation signal.

3. The device of claim 1, wherein the processor is further configured to generate at least one additional excitation signal for at least one additional high-band frequency range, wherein the at least one additional excitation signal is generated based on application of at least one additional function to the resampled signal, and wherein the high-band excitation signal is generated further based on the at least one additional excitation signal.

4. The device of claim 1, wherein the first non-linear processing function includes a square function, and wherein the second non-linear processing function includes an absolute value function.

5. The device of claim 1, wherein the parameter includes a non-linear configuration mode.

6. The device of claim 1, wherein the first non-linear processing function corresponds to an absolute value function and the second non-linear processing function corresponds to a square function, and wherein the processor is configured to:
select the absolute value function in response to determining that the parameter has a first value, and
select the square function or the plurality of non-linear processing functions in response to determining that the parameter has a second value.

7. The device of claim 1, wherein the receiver is further configured to receive the encoded audio signal, wherein the encoded audio signal comprises the parameter.

8. The device of claim 1, further comprising an antenna coupled to the receiver.

9. The device of claim 1, wherein the processor is integrated into a media playback device or a media broadcast device.

10. The device of claim 1, further comprising a memory configured to store the parameter associated with a bandwidth-extended audio stream, wherein the processor is configured to select the plurality of non-linear processing functions in response to determining that the parameter has a second value and that a second parameter associated with the bandwidth-extended audio stream has a particular value.

11. The device of claim 10, wherein the second parameter includes a mix configuration mode.

12. The device of claim 1, further comprising a demodulator coupled to the receiver, the demodulator configured to demodulate the encoded audio signal.

13. The device of claim 12, further comprising a decoder coupled to the processor, the decoder configured to decode the encoded audio signal, wherein the encoded audio signal corresponds to a bandwidth-extended audio stream, and wherein the processor is coupled to the demodulator.

14. The device of claim 13, wherein the receiver, the demodulator, the processor, and the decoder are integrated into a mobile communication device.

15. The device of claim 13, wherein the receiver, the demodulator, the processor, and the decoder are integrated into a base station, the base station further comprising a transcoder that includes the decoder.

16. A signal processing method comprising:
receiving, at a device, a parameter associated with an encoded audio signal;
generating, at the device, a resampled signal based on a low-band excitation signal;
selecting, at the device, a plurality of non-linear processing functions based at least in part on a value of the parameter, wherein the plurality of non-linear processing functions comprise a first non-linear processing function and a second non-linear processing function, wherein the first non-linear processing function is different from the second non-linear processing function;
generating a first excitation signal based on the first non-linear processing function by applying the first non-linear processing function to a resampled signal;
generating a second excitation signal based on the second non-linear processing function by applying the second non-linear processing function to the resampled signal; and
generating, at the device, a high-band excitation signal based on the first excitation signal and the second excitation signal, wherein the first excitation signal corresponds to a first high-band frequency sub-range that is between approximately 8 kilohertz and 12 kilohertz, and wherein the second excitation signal corresponds to a second high-band frequency sub-range that is between 12 kilohertz and 16 kilohertz.

17. The method of claim 16, wherein the device comprises a media playback device or a media broadcast device.

18. The method of claim 16, wherein the device comprises a mobile communication device.

19. The method of claim 16, wherein the device comprises a base station.

20. The method of claim 16, further comprising receiving, at the device, the encoded audio signal.

21. The method of claim 16, wherein the parameter is associated with a bandwidth-extended audio stream.

22. A computer-readable storage device storing instructions that, when executed by a processor, cause the processor to:
receive a parameter associated with an encoded audio signal;
generate a resampled signal based on a low-band excitation signal;
select a plurality of non-linear processing functions based at least in part on a value of the parameter wherein the plurality of non-linear processing functions comprise a first non-linear processing function and a second non-linear processing function, wherein the first non-linear processing function is different from the second non-linear processing function;
generate a first excitation signal based on the first non-linear processing function by applying the first non-linear processing function to a resampled signal;
generate a second excitation signal based on the second non-linear processing function by applying the second non-linear processing function to the resampled signal; and
generate a high-band excitation signal based on the first excitation signal and the second excitation signal wherein the first excitation signal corresponds to a first high-band frequency sub-range that is between approximately 8 kilohertz and 12 kilohertz, and wherein the second excitation signal corresponds to a second high-band frequency sub-range that is between 12 kilohertz and 16 kilohertz.

23. The computer-readable storage device of claim 22, wherein the instructions, when executed by the processor, cause the processor to select the plurality of non-linear processing functions based at least in part on a first value of a first parameter and a second value of a second parameter, wherein the parameter includes the first parameter, the second parameter, or both, wherein the first parameter and the second parameter are associated with a bandwidth-extended audio stream, and wherein the plurality of non-linear processing functions comprise the first non-linear processing function and the second non-linear processing function.

24. An apparatus comprising:
means for generating a resampled signal based on a low-band excitation signal;
means for selecting a plurality of non-linear processing functions based at least in part on a value of a parameter wherein the plurality of non-linear processing functions comprise a first non-linear processing function and a second non-linear processing function, wherein the first non-linear processing function is different from the second non-linear processing function;

means for generating a first excitation signal based on the first non-linear processing function by applying the first non-linear processing function to a resampled signal;

means for generating a second excitation signal based on the second non-linear processing function by applying the second non-linear processing function to the resampled signal; and means for generating a high-band excitation signal based on the first excitation signal and the second excitation signal, wherein the first excitation signal corresponds to a first high-band frequency sub-range that is between approximately 8 kilohertz and 12 kilohertz, and wherein the second excitation signal corresponds to a second high-band frequency sub-range that is between 12 kilohertz and 16 kilohertz.

25. The apparatus of claim 24, wherein the means for generating the first excitation signal, the means for generating the second excitation signal, and the means for generating the high-band excitation signal are integrated into at least one of a mobile communication device, a base station, a computer, a set top box, a personal digital assistant, a display device, a television, a gaming console, a music player, a radio, a video player, an entertainment unit, a communication device, a fixed location data unit, a personal media player, a digital video player, a tuner, a camera, a navigation device, a decoder system, an encoder system, a media playback device, or a media broadcast device.

* * * * *